(12) United States Patent
Izukawa

(10) Patent No.: US 6,352,378 B1
(45) Date of Patent: Mar. 5, 2002

(54) ACCESSORY, APPARATUS TO WHICH THE ACCESSORY IS CONNECTED, ACCESSORY SYSTEM, AND LENS ADAPTER SYSTEM COMPOSED OF OPTICAL APPARATUS AND A PLURALITY OF LENS ADAPTERS

(75) Inventor: Kazuhiro Izukawa, Misato (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/434,298

(22) Filed: Nov. 5, 1999

(30) Foreign Application Priority Data

| Nov. 12, 1998 | (JP) | ................................ 10-322664 |
| Feb. 25, 1999 | (JP) | ................................ 11-047670 |
| May 17, 1999 | (JP) | ................................ 11-136257 |
| Jul. 19, 1999 | (JP) | ................................ 11-204189 |

(51) Int. Cl.[7] .......................... G03B 17/00; G03B 17/14
(52) U.S. Cl. ...................... 396/529; 396/530; 396/532
(58) Field of Search ................ 396/71, 91, 92, 396/93, 529, 532, 530, 531

(56) References Cited

U.S. PATENT DOCUMENTS

| 4,560,267 A | * | 12/1985 | Nakai et al. ................... 396/64 |
| 4,921,422 A | * | 5/1990 | Tanaka et al. ................... 396/93 |
| 4,945,376 A | * | 7/1990 | Kawasaki et al. ................ 396/93 |
| 5,313,236 A | | 5/1994 | Izukawa ....................... 354/106 |
| 5,416,546 A | | 5/1995 | Izukawa ....................... 354/106 |
| 5,671,455 A | | 9/1997 | Nagata et al. ............... 396/390 |
| 5,754,904 A | | 5/1998 | Izukawa ....................... 396/390 |

* cited by examiner

Primary Examiner—David M. Gray
Assistant Examiner—Arthur A Smith
(74) Attorney, Agent, or Firm—Fitzpatrick, Cella, Harper & Scinto

(57) ABSTRACT

An apparatus to which an accessory is connected includes a plurality of connection terminals at which the accessory is connected. With the accessory connected to the apparatus, the apparatus first detects states of the plurality of connection terminals by setting at least one connection terminal of the plurality of connection terminals for signal outputting, and then detects states of the plurality of connection terminals by setting at least one connection terminal of the plurality of connection terminals for signal outputting, the connection terminal set for signal outputting for the second time being different from the connection terminal set for signal outputting for the first time. Then, the apparatus determines a kind of the accessory mounted to the apparatus, on the basis of results of detection obtained for the first time and for the second time.

30 Claims, 52 Drawing Sheets

FIG. 3

| NAME OF CONTROL PIN | MODE 0 | MODE 1 | MODE 2 | MODE 3 |
|---|---|---|---|---|
| - EXT0RON | 1 | 0 | 1 | 1 |
| EXT0IN | 0 | 1/0 | 0 | 0 |
| EXT0GND | 1 | 0 | 1 | 1 |
| STATE OF EXT0 | GND (0) | PULL-UP | GND (0) | GND (0) |
| - EXT1RON | 1 | 0 | 0 | 0 |
| EXT1IN | 0 | 1/0 | 1/0 | 1/0 |
| EXT1GND | 1 | 0 | 0 | 0 |
| STATE OF EXT1 | GND (0) | PULL-UP | PULL-UP | PULL-UP |
| - COMRON | 1 | 1 | 1 | 0 |
| COMIN | 0 | 0 | 0 | 1/0 |
| COMGND | 1 | 1 | 1 | 0 |
| STATE OF COM | GND (0) | GND (0) | GND (0) | PULL-UP |

FIG. 4

|  | MODE 1 | | | | | MODE 2 | | | | |
|---|---|---|---|---|---|---|---|---|---|---|
|  | NONE | 5a | 5b | 5c | 5d | NONE | 5a | 5b | 5c | 5d |
| EXT0 | 1 | 0 | 1 | 0 | 1 | 0 | 0 | 0 | 0 | 0 |
| EXT1 | 1 | 0 | 0 | 1 | 1 | 1 | 0 | 0 | 1 | 0 |
| COM  | 0 | 0 | 0 | 0 | 0 | 0 | 0 | 0 | 0 | 0 |

|  | MODE 3 | | | | |
|---|---|---|---|---|---|
|  | NONE | 5a | 5b | 5c | 5d |
| EXT0 | 0 | 0 | 0 | 0 | 0 |
| EXT1 | 1 | 0 | 1 | 1 | 0 |
| COM  | 1 | 0 | 1 | 0 | 1 |

FIG. 16

| NAME OF CONTROL PIN | MODE 0 | MODE 1 | MODE 2 | MODE 3 | MODE 4 |
|---|---|---|---|---|---|
| -EXT0RON<br>EXT0IN<br>EXT0GND<br>STATE OF EXT0 | 1<br>0<br>1<br>GND (0) | 0<br>1/0<br>0<br>PULL-UP | 1<br>0<br>1<br>GND (0) | 1<br>0<br>1<br>GND (0) | 0<br>1/0<br>0<br>PULL-UP |
| -EXT1RON<br>EXT1IN<br>EXT1GND<br>STATE OF EXT1 | 1<br>0<br>1<br>GND (0) | 0<br>1/0<br>0<br>PULL-UP | 0<br>1/0<br>0<br>PULL-UP | 0<br>1/0<br>0<br>PULL-UP | 1<br>0<br>1<br>GND (0) |
| -COMRON<br>COMIN<br>COMGND<br>STATE OF COM | 1<br>0<br>1<br>GND (0) | 1<br>0<br>1<br>GND (0) | 1<br>0<br>1<br>GND (0) | 0<br>1/0<br>0<br>PULL-UP | 0<br>1/0<br>0<br>PULL-UP |

FIG. 17

| | | 155o (NONE) | 155a | 155b | 155c | 155d | 155e | 155f | 155g | 155h | 155i | |
|---|---|---|---|---|---|---|---|---|---|---|---|---|
| MODE 1 | EXT0 | 1 | 0 | 1 | 0 | 1 | 0 | 1 | 1 | 0 | 1 | (EXT0,EXT1)<br>(0,0) = 155a = 155e = 155f<br>(0,1) = 155c = 155h<br>(1,0) = 155b = 155g<br>(1,1) = 155o = 155d = 155i |
| | EXT1 | 1 | 0 | 0 | 1 | 1 | 0 | 0 | 0 | 1 | 1 | |
| | COM | 0 | 0 | 0 | 0 | 0 | 0 | 0 | 0 | 0 | 0 | |
| MODE 2 | EXT0 | 0 | 0 | 0 | 0 | 0 | 0 | 0 | 0 | 0 | 0 | (EXT1)<br>(0) = 155a = 155b = 155d = 155e = 155g<br>(1) = 155o = 155c = 155h = 155i |
| | EXT1 | 1 | 0 | 0 | 1 | 0 | 0 | 0 | 0 | 1 | 1 | |
| | COM | 0 | 0 | 0 | 0 | 0 | 0 | 0 | 0 | 0 | 0 | |
| MODE 3 | EXT0 | 0 | 0 | 0 | 0 | 0 | 0 | 0 | 0 | 0 | 0 | (EXT1,COM)<br>(0,0) = 155a<br>(0,1) = 155d = 155e<br>(1,0) = 155c<br>(1,1) = 155o = 155b = 155f = 155g = 155h = 155i |
| | EXT1 | 1 | 0 | 1 | 1 | 0 | 0 | 1 | 1 | 1 | 1 | |
| | COM | 1 | 0 | 1 | 0 | 1 | 1 | 1 | 1 | 1 | 1 | |
| MODE 4 | EXT0 | 1 | 0 | 1 | 1 | 0 | 0 | 1 | 1 | 0 | 0 | (EXT0,COM)<br>(0,0) = 155a<br>(0,1) = 155d = 155e = 155i<br>(1,0) = 155b<br>(1,1) = 155o = 155c = 155f = 155g = 155h |
| | EXT1 | 0 | 0 | 0 | 0 | 0 | 0 | 0 | 0 | 0 | 0 | |
| | COM | 1 | 0 | 0 | 1 | 1 | 1 | 1 | 1 | 1 | 1 | |

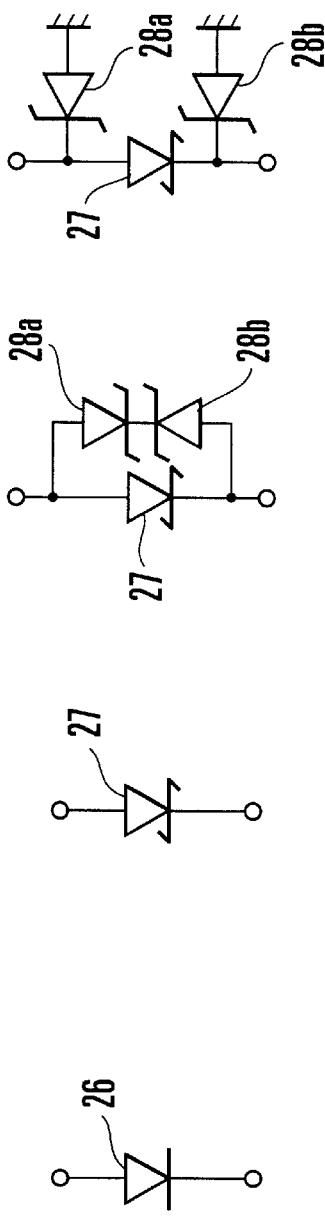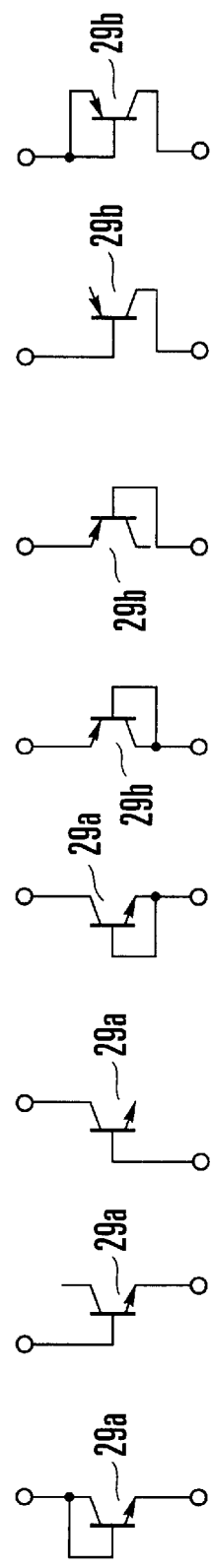

FIG. 33

| NAME OF CONTROL PIN | MODE 0 | MODE 1 | MODE 2 | MODE 3 | MODE 4 |
|---|---|---|---|---|---|
| - EXT0RON | 1 | 0 | 1 | 1 | 0 |
| EXT0IN | 0 | 1/0 | 0 | 0 | 1/0 |
| EXT0GND | 1 | 0 | 1 | 1 | 0 |
| STATE OF EXT0 | GND (0) | PULL-UP | GND (0) | GND (0) | PULL-UP |
| - EXT1RON | 1 | 0 | 0 | 0 | 1 |
| EXT1IN | 0 | 1/0 | 1/0 | 1/0 | 0 |
| EXT1GND | 1 | 0 | 0 | 0 | 1 |
| STATE OF EXT1 | GND (0) | PULL-UP | PULL-UP | PULL-UP | GND (0) |
| - COMRON | 1 | 1 | 1 | 0 | 0 |
| COMIN | 0 | 0 | 0 | 1/0 | 1/0 |
| COMGND | 1 | 1 | 1 | 0 | 0 |
| STATE OF COM | GND (0) | GND (0) | GND (0) | PULL-UP | PULL-UP |

FIG. 34

| | 155o (NONE) | 155a | 155b | 155c | 155d | 155e | 155f | 155g | 155h | 155i | |
|---|---|---|---|---|---|---|---|---|---|---|---|
| MODE 1 EXT0 | 1 | 0 | 1 | 0 | 0 | 1 | 1 | 0 | 0 | 1 | (EXT0,EXT1) |
| MODE 1 EXT1 | 1 | 0 | 0 | 1 | 1 | 0 | 0 | 1 | 1 | 0 | (0,0) = 155a = 155b = 155e = 155f |
| MODE 1 COM | 0 | 0 | 0 | 0 | 0 | 0 | 0 | 0 | 0 | 0 | (0,1) = 155c = 155h |
| | | | | | | | | | | | (1,0) = 155b = 155g |
| | | | | | | | | | | | (1,1) = 155o = 155d = 155i |
| MODE 2 EXT0 | 0 | 0 | 0 | 0 | 0 | 0 | 0 | 0 | 0 | 0 | (EXT1) |
| MODE 2 EXT1 | 1 | 1 | 0 | 1 | 0 | 0 | 0 | 0 | 1 | 1 | (0) = 155a = 155b = 155d = 155e |
| MODE 2 COM | 0 | 0 | 0 | 0 | 0 | 0 | 0 | 0 | 0 | 0 |     = 155f = 155g |
| | | | | | | | | | | | (1) = 155o = 155c = 155h = 155i |
| MODE 3 EXT0 | 0 | 1 | 0 | 0 | 0 | 0 | 0 | 0 | 0 | 0 | (EXT1,COM) |
| MODE 3 EXT1 | 1 | 0 | 1 | 1 | 1 | 1 | 1 | 1 | 1 | 1 | (0,0) = 155a |
| MODE 3 COM | 1 | 0 | 1 | 0 | 1 | 1 | 1 | 1 | 1 | 1 | (0,1) = 155d = 155e |
| | | | | | | | | | | | (1,0) = 155c |
| | | | | | | | | | | | (1,1) = 155o = 155b = 155f = 155g = 155h = 155i |
| MODE 4 EXT0 | 1 | 1 | 0 | 0 | 0 | 0 | 0 | 0 | 0 | 0 | (EXT0,COM) |
| MODE 4 EXT1 | 0 | 0 | 1 | 1 | 1 | 1 | 1 | 0 | 1 | 1 | (0,0) = 155a |
| MODE 4 COM | 1 | 0 | 1 | 1 | 1 | 1 | 1 | 1 | 0 | 1 | (0,1) = 155d = 155e = 155i |
| | | | | | | | | | | | (1,0) = 155b |
| | | | | | | | | | | | (1,1) = 155o = 155c = 155f = 155g = 155h |

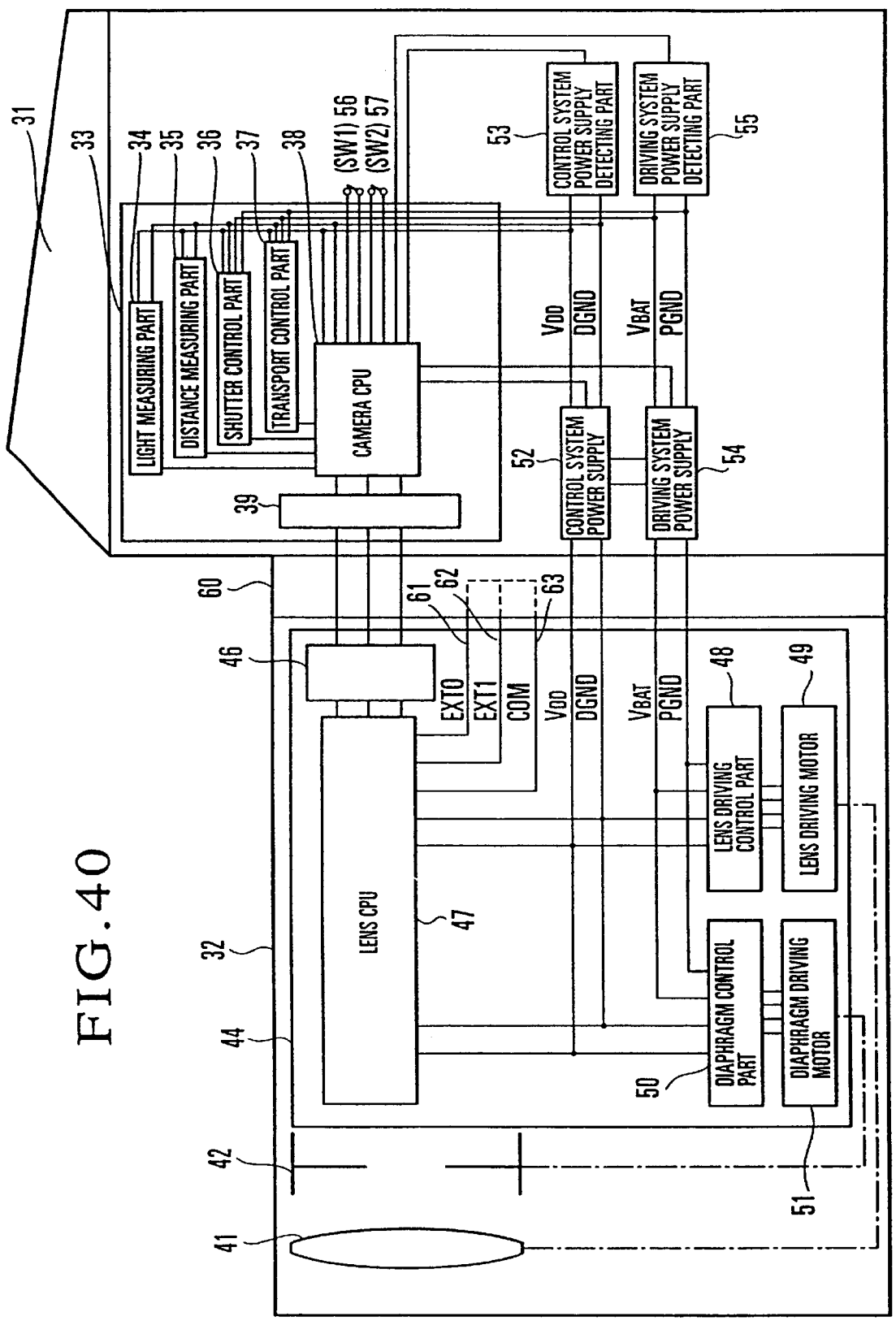

FIG. 46

| NAME OF CONTROL PIN | MODE 0 | MODE 1 | MODE 2 |
|---|---|---|---|
| - EXT0RON<br>EXT0IN<br>EXT0GND<br>STATE OF EXT0 | 1<br>0<br>1<br>GND (0) | 0<br>1/0<br>0<br>PULL-UP | 1<br>0<br>0<br>OPEN |
| - EXT1RON<br>EXT1IN<br>EXT1GND<br>STATE OF EXT1 | 1<br>0<br>1<br>GND (0) | 0<br>1/0<br>0<br>PULL-UP | 1<br>1/0<br>0<br>Vreg |
| - COMRON<br>COMIN<br>COMGND<br>STATE OF COM | 1<br>0<br>1<br>GND (0) | 1<br>0<br>1<br>GND (0) | 1<br>0<br>0<br>Vdet |
| Rdeton | 0 | 0 | 1 |

FIG. 47

|  |  | NONE 5o | 5a | 5b | 5c | 5d | 5e |
|---|---|---|---|---|---|---|---|
| MODE 1 | EXT0 | 1 | 0 | 1 | 0 | 0 | 1 |
|  | EXT1 | 1 | 0 | 0 | 1 | 0 | 0 |
|  | COM | 0 | 0 | 0 | 0 | 0 | 0 |

FIG. 48

| SIDE NUMBER OF ACCESSORY | Rext | Vdetmax | Vdetmin | DETECTION VOLTAGE |
|---|---|---|---|---|
| -4 | 1500 Ω | 2.43V | 2.08V | 2.52V |
| -3 | 820 Ω | 2.95V | 2.61V | 3.01V |
| -2 | 430 Ω | 3.37V | 3.07V | 3.41V |
| -1 | 180 Ω | 3.71V | 3.45V | 3.75V |
|  | 0 Ω | 4.00V | 3.79V |  |

# ACCESSORY, APPARATUS TO WHICH THE ACCESSORY IS CONNECTED, ACCESSORY SYSTEM, AND LENS ADAPTER SYSTEM COMPOSED OF OPTICAL APPARATUS AND A PLURALITY OF LENS ADAPTERS

BACKGROUND OF THE INVENTION

1. Field of the Invention

The present invention relates to improvements on an accessory which is connected to a control apparatus having control means, such as a microcomputer, a control apparatus to which the accessory is connected, a camera accessory, and a camera to which the camera accessory is connected.

2. Description of Related Art

Heretofore, there have been a variety of systems each of which is composed of a combination of an apparatus having a control circuit, such as a microcomputer, and an accessory having no control circuit, such as a microcomputer. For example, one of such systems is a camera system composed of a combination of a camera and a photo-taking lens which is mounted on the camera (the photo-taking lens being supposed to be the old type having no control circuit, such as a microcomputer), or a camera system composed of a combination of a photo-taking lens and a telephoto converter which is mounted between the photo-taking lens and a camera body to change the photo-taking magnification (or an extender, such as an intermediate ring, used for close-up photo-taking).

In such a system, when the accessory is connected to the apparatus, it is necessary to detect what kind of accessory it is, in order to enable a control operation of the apparatus with the accessory connected thereto. An example of a circuit arrangement for detecting the kind of accessory connected to the apparatus is shown in FIG. 26.

In FIG. 26, reference numeral 101 denotes an apparatus having a control circuit, such as a microcomputer, reference numeral 102 denotes the control circuit, such as a microcomputer, reference numeral 103 denotes a controlled circuit which is to be controlled by the control circuit 102, and reference numeral 104 denotes a battery serving as a power supply. Reference numeral 105 denotes an accessory which is connected to the apparatus 101. The apparatus 101 and the accessory 105 are connected to each other at two terminals EXT0 and COM.

FIG. 27 is a circuit diagram showing the details of the control circuit 102. In FIG. 27, reference numeral 106 denotes a control part of the control circuit 102, and reference numerals 107, 108, 109 and 110 denote diodes for protecting the terminals EXT0 and COM. Reference numeral 111 denotes a resistor connected to a power supply $V_{DD}$ to pull up the terminal EXT0, and reference numeral 112 denotes an input circuit. Reference numeral 113 denotes an N-channel FET (field-effect transistor) arranged to connect the terminal COM to the ground GND. Reference numeral 114 denotes a connection line for connecting the control part 106 to another circuit, and reference numerals 105x and 105y denote two kinds of the accessory 105, which are usable with the apparatus 101.

In the above-described construction, when the accessory 105x is connected to the apparatus 101, since two terminals of the accessory 105x are in no short-circuited relation, an input voltage Vin of the input circuit 112 is pulled up by the pull-up resistor 111, so that the logic of the input voltage Vin of the input circuit 112 becomes "1". On the other hand, when the accessory 105y is connected to the apparatus 101, since two terminals of the accessory 105y are in a short-circuited relation, the terminals COM and EXT0 are short-circuited, so that the logic of the input voltage Vin of the input circuit 112 becomes "0". Thus, the control part 106 is able to know whether the accessory 105 which is now mounted on the apparatus 101 is the accessory 105x or the accessory 105y, according to whether the logic is "1" or "0".

In the above manner, it becomes possible to accurately detect the kind of accessory connected to the apparatus. Accordingly, it becomes possible to appropriately change the operation of the photo-taking lens according to the kind of an extender mounted between the camera body and the photo-taking lens.

BRIEF SUMMARY OF THE INVENTION

In accordance with one aspect of the invention, there is provided an apparatus to which an accessory is connected, the apparatus comprising a plurality of connection terminals at which the accessory is connected, first detection means for detecting states of the plurality of connection terminals by setting at least one connection terminal of the plurality of connection terminals for signal outputting, second detection means for detecting states of the plurality of connection terminals by setting at least one connection terminal of the plurality of connection terminals for signal outputting, the connection terminal set for signal outputting by the second detection means being different from the connection terminal set for signal outputting by the first detection means, and determination means for determining a kind of the accessory mounted to the apparatus, on the basis of results of detection provided by the first detection means and the second detection means. Accordingly, the states of the plurality of terminals are detected twice while changing over the connection terminals set for signal outputting, so that it is possible to increase the number of kinds of accessories which are determinable by the apparatus, without increasing the number of connection terminals of the apparatus.

The above and further aspects and features of the invention will become apparent from the following detailed description of preferred embodiments thereof taken in conjunction with the accompanying drawings.

BRIEF DESCRIPTION OF THE SEVERAL VIEWS OF THE DRAWING

FIG. 3 is a diagram showing a list of setting modes in the first embodiment of the invention.

FIG. 4 is a diagram showing the logic of each of the terminals in each of the setting modes shown in FIG. 3.

FIG. 16 is a diagram showing the relation between each control pin and each mode shown in FIG. 15.

FIG. 17 is a diagram showing the relation between each mode and each accessory in the fourth embodiment of the invention.

FIGS. 20(a) to 20(d) are diagrams showing examples of replacement of a diode shown in FIG. 15.

FIGS. 21(a) to 21(h) are diagrams showing other examples of replacement of the diode shown in FIG. 15.

FIG. 33 is a diagram for explaining modes for detecting the kind of accessories in the control apparatus shown in FIG. 32.

FIG. 34 is a diagram showing the relationships between the modes shown in FIG. 33 and the accessories.

FIG. 40 is a block diagram showing the arrangement of a camera system or a lens system according to an eighth embodiment of the invention.

FIG. 46 is a diagram showing relationships between control pins shown in FIG. 45 and various modes.

FIG. 47 is a diagram showing relationships between the terminals and the accessories when the apparatus is in mode 1 in the ninth embodiment of the present invention.

FIG. 48 is a diagram showing detection voltages to be used when each of various accessories which are similar in characteristics is connected to the apparatus in the ninth embodiment of the present invention.

DETAILED DESCRIPTION OF THE INVENTION

Hereinafter, preferred embodiments of the invention will be described in detail with reference to the drawings.
(First Embodiment)

Figure 1:
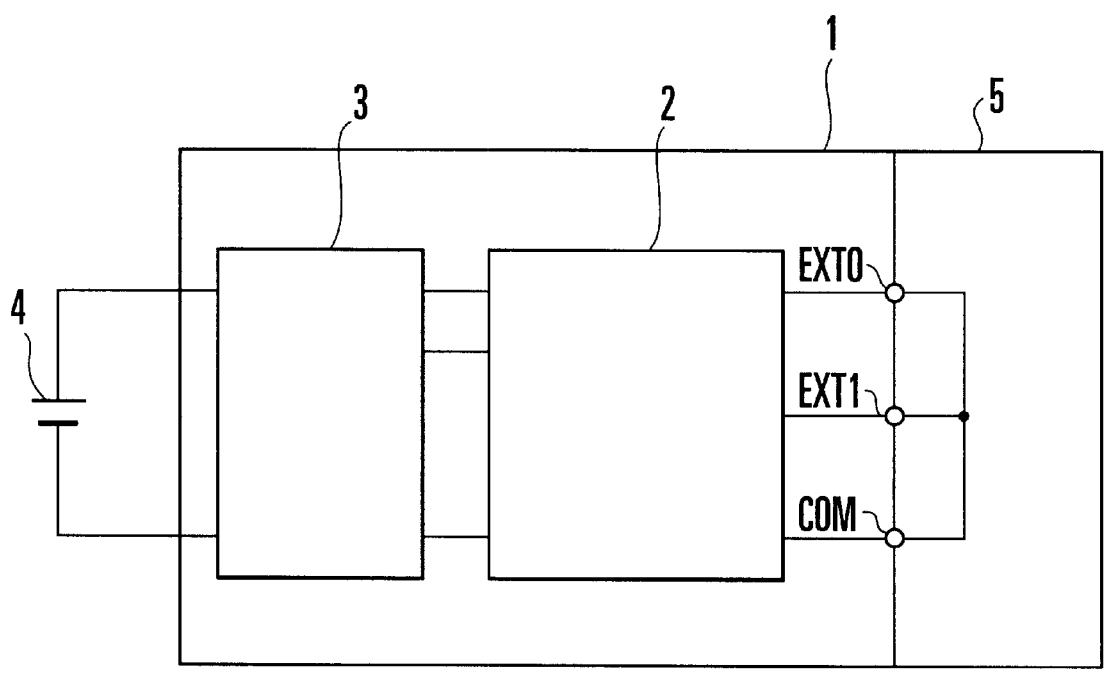
FIG. 1 is a block diagram showing the electric circuitry according to a first embodiment of the invention.
Figure 2:
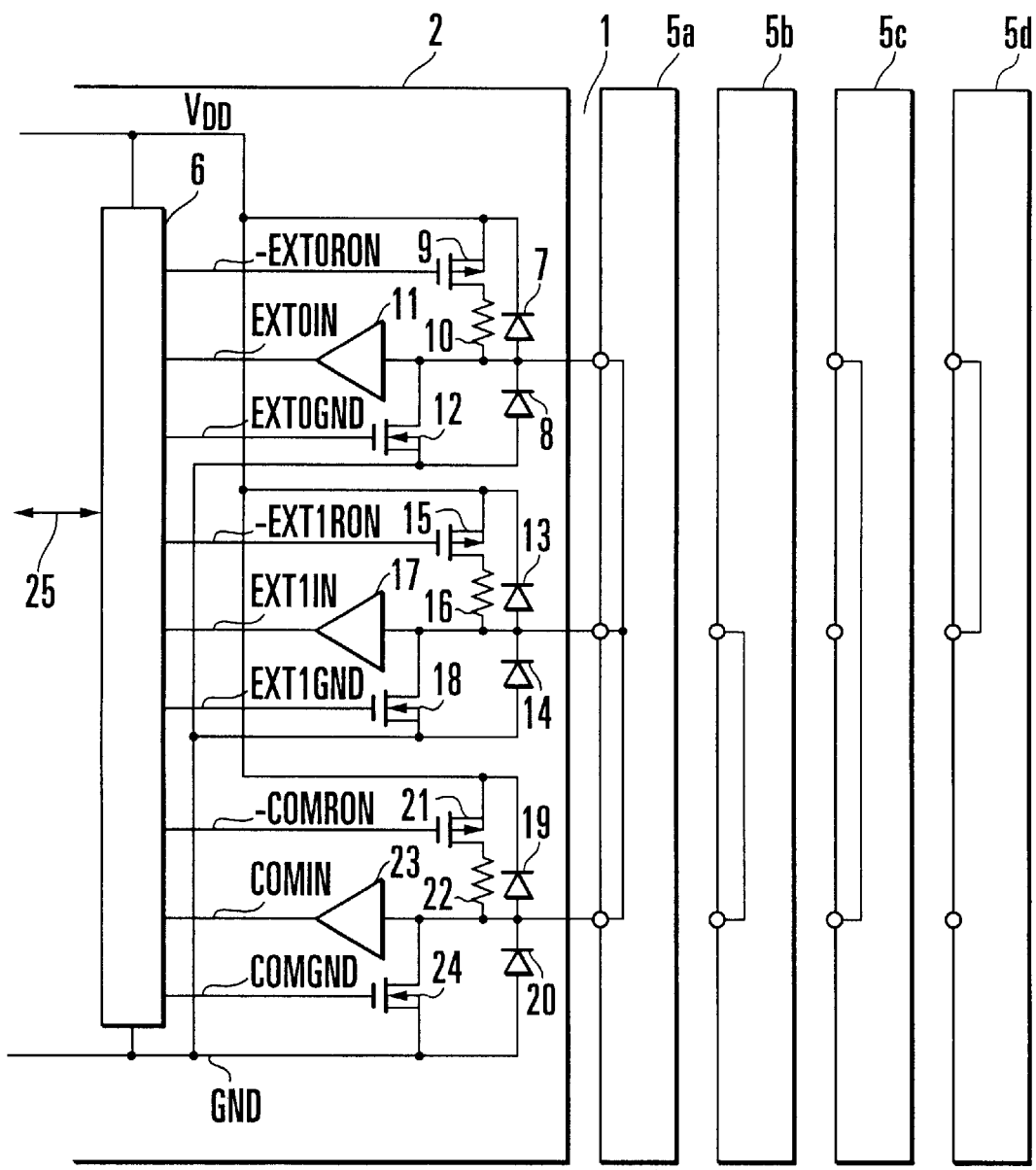
FIG. 2 is an electric circuit diagram for explaining the connection state in the first embodiment of the invention.

FIGS. 1 to 3 show a first embodiment of the invention. FIG. 1 is a block diagram showing the electric circuitry of the first embodiment. In FIG. 1, there are illustrated a main apparatus 1 having a control circuit 2, such as a microcomputer, a controlled circuit 3 to be controlled by the control circuit 2, a battery 4, and an accessory 5 to be connected to the main apparatus 1. The control circuit 2 and the accessory 5 are connected to each other at three terminals EXT0, EXT1 and COM.

FIG. 2 is an electric circuit diagram for explaining the condition of connection between the control circuit 2 and the accessory 5 shown in the block diagram of FIG. 1. Referring to FIG. 2, in the control circuit 2, there are included a control part 6, diodes 7, 8, 13, 14, 19 and 20 for protecting the terminals EXT0, EXT1 and COM, P-channel FETs 9, 15 and 21 for pulling up the terminals EXT0, EXT1 and COM by connecting the terminals EXT0, EXT1 and COM to a power supply VDD via resistors 10, 16 and 22, respectively, input circuits 11, 17 and 23, N-channel FETs 12, 18 and 24 for connecting the terminals EXT0, EXT1 and COM to the ground GND, and a connection line 25 for connecting the control part 6 to another circuit.

Further, in FIG. 2, reference numerals 5a to 5d denote various kinds of the accessory 5.

Referring to FIG. 2, the relationships in electrical connection between the terminals EXT0, EXT1 and COM and the various kinds of the accessory 5 are as follows:

| Terminal | EXT0 | EXT1 | COM |
|---|---|---|---|
| No accessory | X | X | X |
| Accessory 5a | ○ | ○ | ○ |
| Accessory 5b | X | ○ | ○ |
| Accessory 5c | ○ | X | ○ |
| Accessory 5d | ○ | ○ | X |

○: connected
X: unconnected

FIG. 3 shows a list of the setting states of control pins of the control part 6 and modes to be set thereby.

When the control pin –EXT0RON is set to "0", the FET 9 is turned on, so that the terminal EXT0 is connected to the pull-up resistor 10.

The control pin EXT0IN indicates the state of the terminal EXT0.

When the control pin EXT0GND is set to "1", the terminal EXT0 is set to the ground (logic "0").

Accordingly, "STATE OF EXT0" in FIG. 3 indicates whether the terminal EXT0 is connected to the ground GND (logic "0") so as to be used as an output terminal or whether the terminal EXT0 is connected to the pull-up resistor 10 so as to be used as an input terminal.

The function of each of the control pin –EXT1RON and the control pin –COMRON is the same as that of the control pin –EXT0RON.

The function of each of the control pin EXT1IN and the control pin COMIN is the same as that of the control pin EXT0IN.

The function of each of the control pin EXT1GND and the control pin COMGND is the same as that of the control pin EXT0GND.

"STATE OF EXT1" in FIG. 3 indicates whether the terminal EXT1 is connected to the ground GND (logic "0") so as to be used as an output terminal or whether the terminal EXT1 is connected to the pull-up resistor 16 so as to be used as an input terminal.

"STATE OF COM" in FIG. 3 indicates whether the terminal COM is connected to the ground GND (logic "0") so as to be used as an output terminal or whether the terminal COM is connected to the pull-up resistor 22 so as to be used as an input terminal.

In the case of a mode 0, each of the terminals EXT0, EXT1 and COM is connected to the ground GND (logic "0") so as to be used as an output terminal.

In the case of a mode 1, each of the terminals EXT0 and EXT1 is connected to the pull-up resistor so as to be used as an input terminal, while the terminal COM is connected to the ground GND so as to be used as an output terminal.

In the case of a mode 2, the terminal EXT1 is connected to the pull-up resistor so as to be used as an input terminal, while each of the terminals EXT0 and COM is connected to the ground GND so as to be used as an output terminal.

In the case of a mode 3, each of the terminals EXT1 and COM is connected to the pull-up resistor so as to be used as an input terminal, while the terminal EXT0 is connected to the ground GND so as to be used as an output terminal.

FIG. 4 shows the logic of each of the terminals EXT0, EXT1 and COM in the cases of "no accessory", "accessory 5a", "accessory 5b", "accessory 5c" and "accessory 5d" in each of the modes 1, 2 and 3.

In the mode 1, the logic of (EXT0, EXT1) in each of the cases of "no accessory" and "accessory 5d" becomes (1, 1), so that it is impossible to discriminate between "no accessory" and "accessory 5d", while it is possible to discriminate among the accessories 5a, 5b and 5c.

In the mode 2, the logic of (EXT1) in each of the cases of "no accessory" and "accessory 5c" becomes (1), so that it is impossible to discriminate between "no accessory" and "accessory 5c", and the logic of (EXT1) in each of the cases of "accessory 5a", "accessory 5b" and "accessory 5d" becomes (0), so that it is impossible to discriminate among the accessories 5a, 5b and 5d.

In the mode 3, the logic of (EXT0, COM) in each of the cases of "no accessory" and "accessory 5b" becomes (1, 1), so that it is impossible to discriminate between "no accessory" and "accessory 5b", while it is possible to discriminate among the accessories 5a, 5c and 5d.

Figure 5:
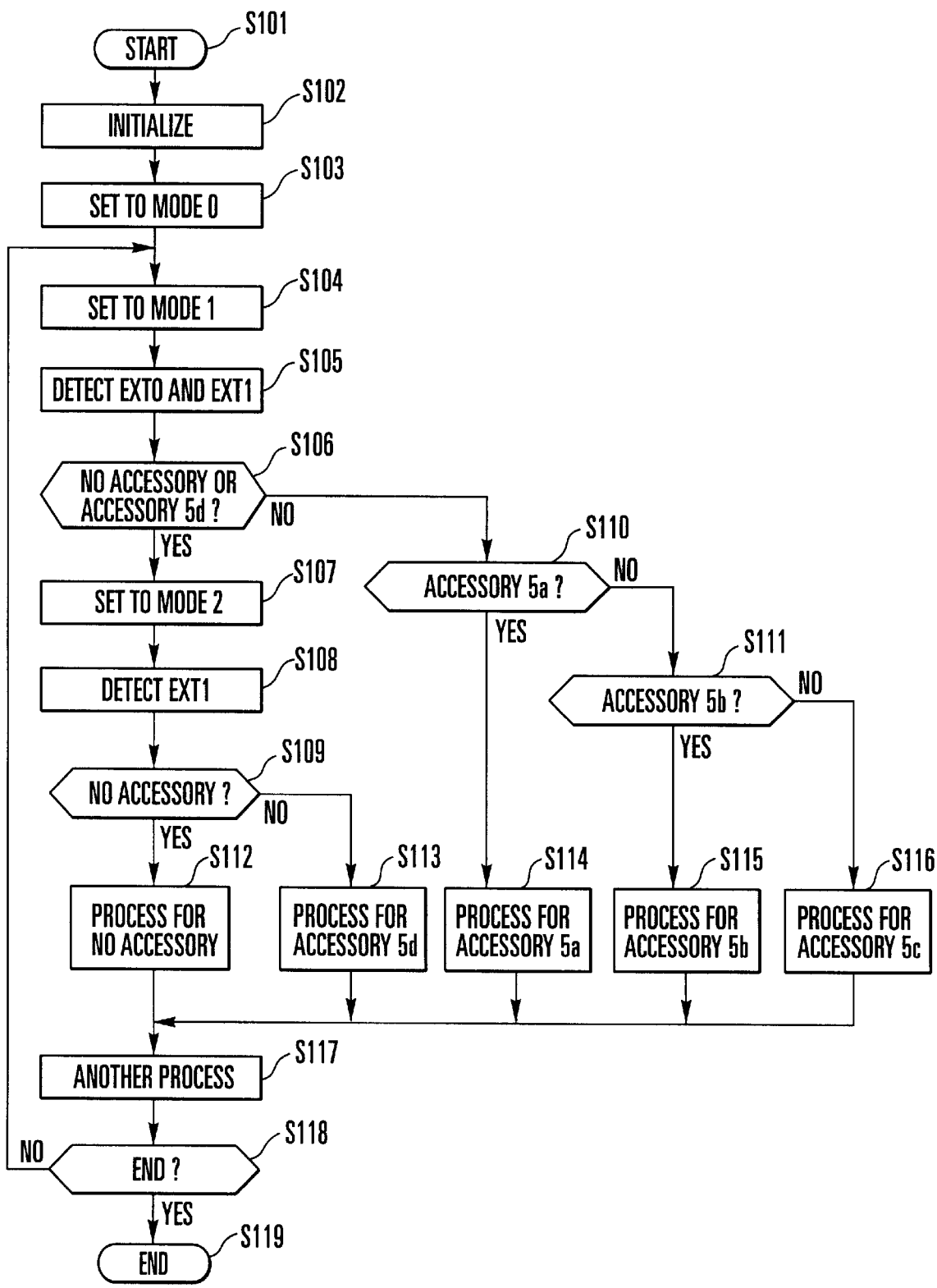
FIG. 5 is a flow chart showing the operation in the first embodiment of the invention.

FIG. 5 is a flow chart showing the operation of the control circuit 2.

In step S101, the flow is started.

In step S102, an initializing operation upon turning-on of the power supply is performed.

In step S103, the terminals EXT0, EXT1 and COM are set to the mode 0, as a part related to the first embodiment of the initializing operation upon turning-on of the power supply.

In step S104, next, the terminals EXT0, EXT1 and COM are set to the mode 1.

In step S105, the logic of each of the terminals EXT0 and EXT1 is detected. The details of the step S105 will be described later with reference to the flow chart of FIG. 6.

In step S106, a check is made to find if the logic of (EXT0, EXT1) is (1, 1). If so, the flow proceeds to step S107. If not, the flow proceeds to step S110.

In step S107, since, in the mode 1, it is impossible to discriminate between "no accessory" and "accessory 5d", the terminals EXT0, EXT1 and COM are set to the mode 2.

In step S108, the logic of the terminal EXT1 is detected. The details of the step S108 will be described later with reference to the flow chart of FIG. 7.

In step S109, a check is made to find if the logic of (EXT1) is (1). If so, indicating "no accessory", the flow proceeds to step S112. If not, indicating "accessory 5d", the flow proceeds to step S113.

In step S110, a check is made to find if the logic of (EXT0, EXT1) is (0, 0). If so, indicating "accessory 5a", the flow proceeds to step S114. If not, the flow proceeds to step S111.

In step S111, a check is made to find if the logic of (EXT0, EXT1) is (1, 0). If so, indicating "accessory 5b", the flow proceeds to step S115. If not, indicating "accessory 5c", the flow proceeds to step S116.

In step S112, a process corresponding to "no accessory" is performed.

In step S113, a process corresponding to the accessory 5d is performed.

In step S114, a process corresponding to the accessory 5a is performed.

In step S115, a process corresponding to the accessory 5b is performed.

In step S116, a process corresponding to the accessory 5c is performed.

In step S117, a process unrelated to any accessory is performed.

In step S118, a check is made to find if the flow is to be ended, on the basis of time, communication from the outside, or the like. If so, the flow proceeds to step S119 to be brought to an end. If not, the flow returns to step S104, continuing the process.

Figure 6:
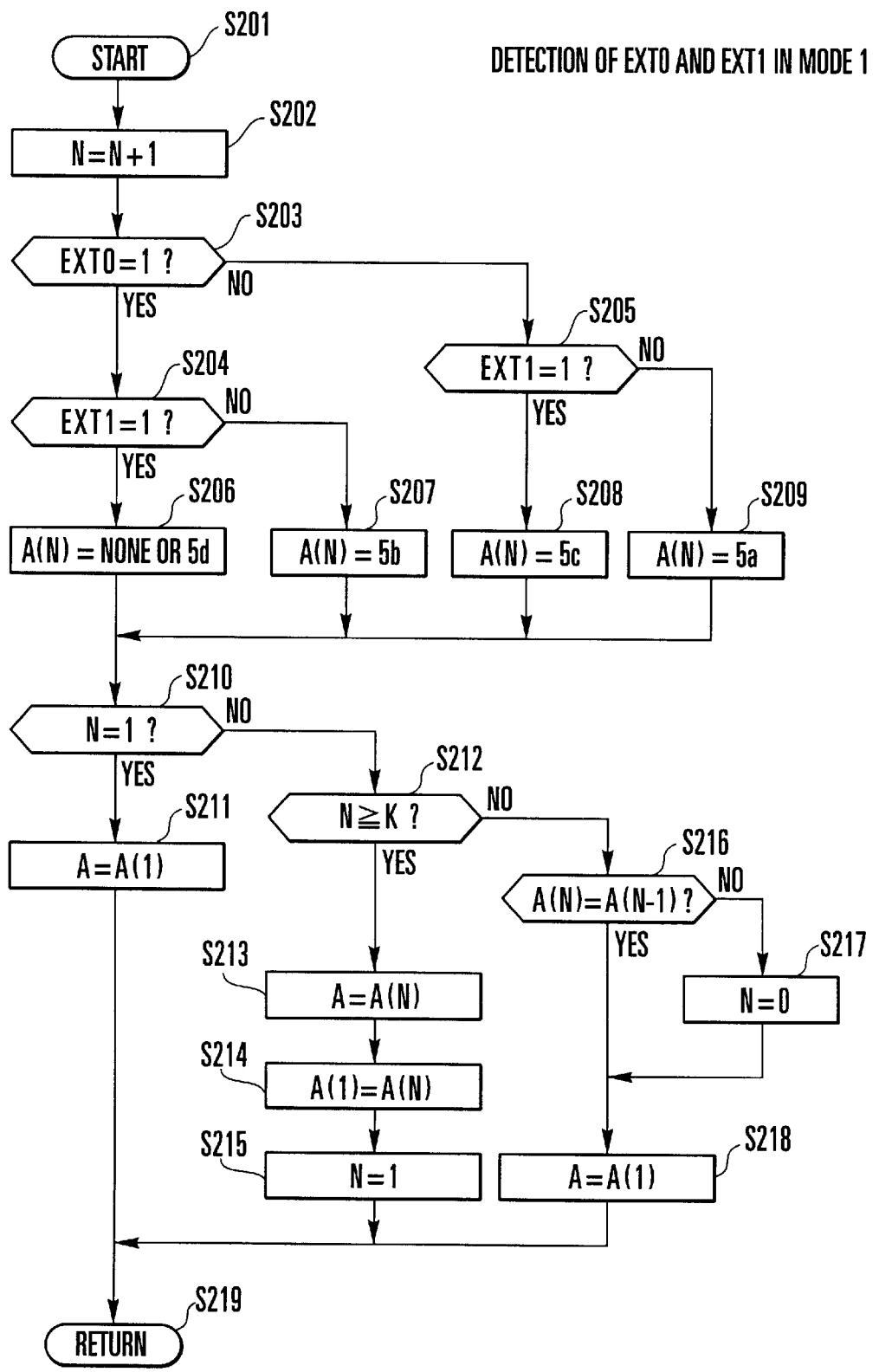
FIG. 6 is a flow chart for explaining the operation of step S105 shown in FIG. 5.

FIG. 6 is a flow chart for explaining the details of the step S105 shown in the flow chart of FIG. 5.

In step S201, the flow is started.

In order to eliminate any detection errors caused by the failure of contact of the accessory 5 or the like, such an arrangement is made that, only when the same detection result has been obtained continuously K times, that detection result is accepted. Therefore, in step S202, the value of N, which indicates the number of times of detection, is incremented by one. It is to be noted that the value of N has been initialized to "0" in step S102 shown in the flow chart of FIG. 5.

In step S203, a check is made to find if the logic of the terminal EXT0 is "1". If the logic of the terminal EXT0 is "1", the flow proceeds to step S204, and if the logic of the terminal EXT0 is "0", the flow proceeds to step 205, for the next check of the logic of the terminal EXT1.

In step S204, a check is made to find if the logic of the terminal EXT1 is "1". If the logic of the terminal EXT1 is "1", as (EXT0, EXT1)=(1, 1), which indicates that "a detection result A(N) for the N-th time"="no accessory" or "accessory 5d", the flow proceeds to step S206. If the logic of the terminal EXT1 is "0", as (EXT0, EXT1)=(1, 0), which indicates that "a detection result A(N) for the N-th time"= "accessory 5b", the flow proceeds to step S207.

In step S205, a check is made to find if the logic of the terminal EXT1 is "1". If the logic of the terminal EXT1 is "1", as (EXT0, EXT1)=(0, 1), which indicates that "a detection result A(N) for the N-th time"="accessory 5c", the flow proceeds to step S208. If the logic of the terminal EXT1 is "0", as (EXT0, EXT1)=(0, 0), which indicates that "a detection result A(N) for the N-th time"="accessory 5a", the flow proceeds to step S209.

In order to detect whether a detection result A(N) for the N-th time has been found K times to be equal to a detection result A(N−1) for the (N−1)-th time, the following steps S210 to S218 are executed. In step S210, a check is made to find if N=1. If so, the flow proceeds to step S211. In step S211, since there is no data to be compared with the detection result for the first time, that detection result is used as A=A(1).

In step S212, since the detection result is for the second time or the subsequent time, a check is made to find if the detection result is for the K-th time. If so, as the same detection result has been found K times, the flow proceeds to step S213 to set "A=A(N)".

Further, in order to detect that the same detection result next continues K times, "A(1)=A(N)" is set in step S214, and "N=1" is set in step S215.

In step S216, a check is made to find if a detection result A(N−1) for the preceding time is equal to a detection result A(N) for the present time. If so, the flow proceeds to step S218 to set "A=A(1)". If not, as the detection has to be started from the first time, the flow proceeds to step S217 to set "N=0", and then proceeds to step S218.

In step S219, the flow returns.

Figure 7:
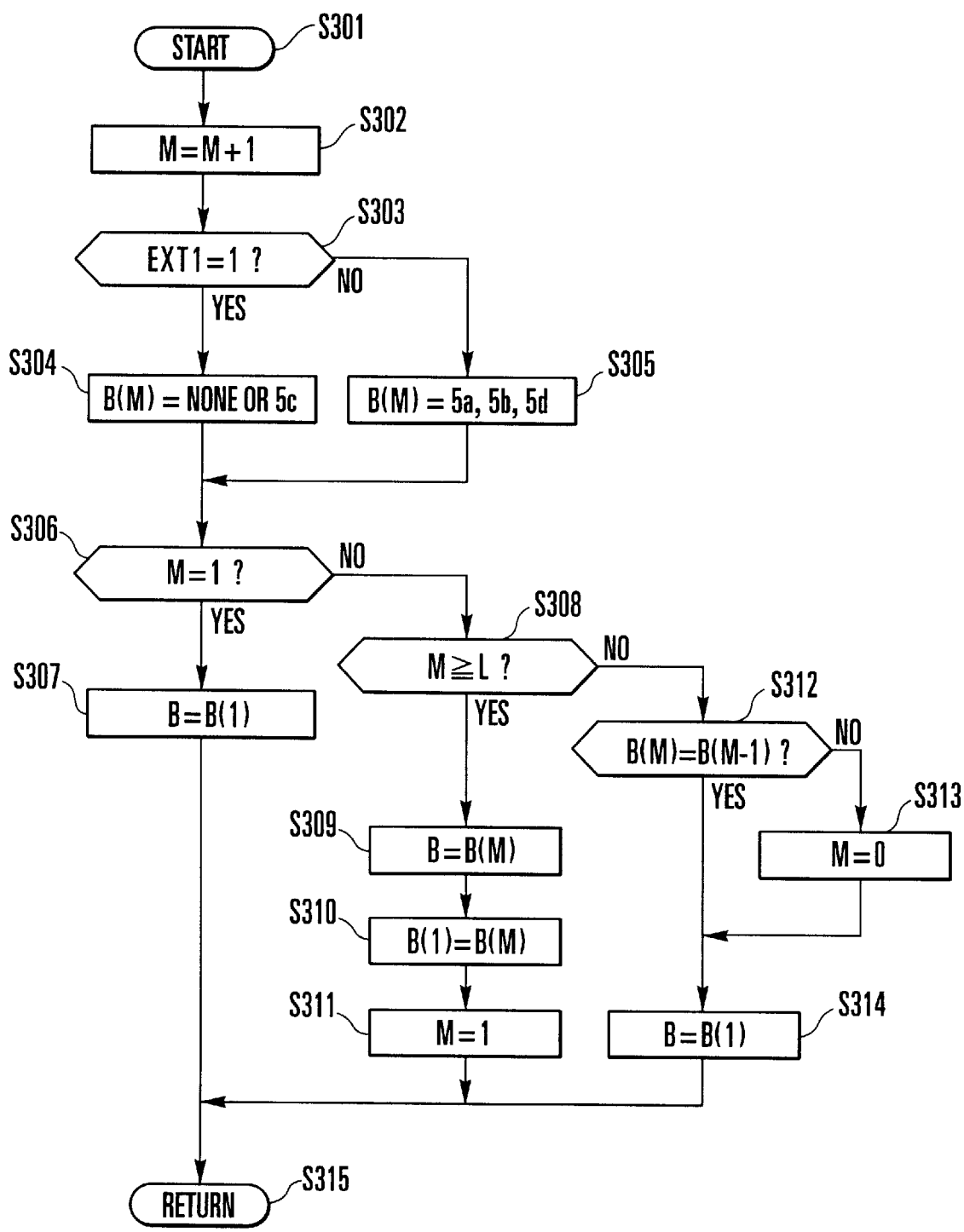
FIG. 7 is a flow chart for explaining the operation of step S108 shown in FIG. 5.

FIG. 7 is a flow chart for explaining the details of the step S108 shown in the flow chart of FIG. 5.

In step S301, the flow is started.

In order to eliminate any detection errors caused by the failure of contact of the accessory 5 or the like, such an arrangement is made that, only when the same detection result has been obtained continuously L times, that detection result is accepted. Therefore, in step S302, the value of M, which indicates the number of times of detection, is incremented by one. It is to be noted that the value of M has been initialized to "0" in step S102 shown in the flow chart of FIG. 5.

In step S303, a check is made to find if the logic of the terminal EXT1 is "1". If the logic of the terminal EXT1 is "1", as a detection result B(M) for the M-th time indicates "no accessory" or "accessory 5c", the flow proceeds to step S304. If the logic of the terminal EXT1 is "0", as a detection result B(M) for the M-th time indicates "accessory 5a", "accessory 5b" or "accessory 5d", the flow proceeds to step S305.

In order to detect whether a detection result B(M) for the M-th time has been found L times to be equal to a detection result B(M−1) for the (M−1)-th time, the following steps S307 to S314 are executed. In step S306, a check is made to find if M=1. If so, the flow proceeds to step S307. In step S307, since there is no data to be compared with the detection result for the first time, that detection result is used as "B=B(1)".

In step S308, since the detection result is for the second time or the subsequent time, a check is made to find if the detection result is for the L-th time. If so, as the same detection result has been found L times, the flow proceeds to step S309 to set "B=B(M)".

Further, in order to detect that the same detection result next continues L times, "B(1)=B(M)" is set in step S310, and "M=1" is set in step S311.

In step S312, a check is made to find if a detection result B(M−1) for the preceding time is equal to a detection result B(M) for the present time. If so, the flow proceeds to step S314 to set "B=B(1)". If not, as the detection has to be started from the first time, the flow proceeds to step S313 to set "M=0", and then proceeds to step S314.

In step S315, the flow returns.

(Second Embodiment)

FIGS. 8 to 11 show a second embodiment of the invention.

The second embodiment is concerned with a camera system composed of a camera body (main apparatus) and an interchangeable lens (accessory) which are capable of communicating with each other.

Figure 8:
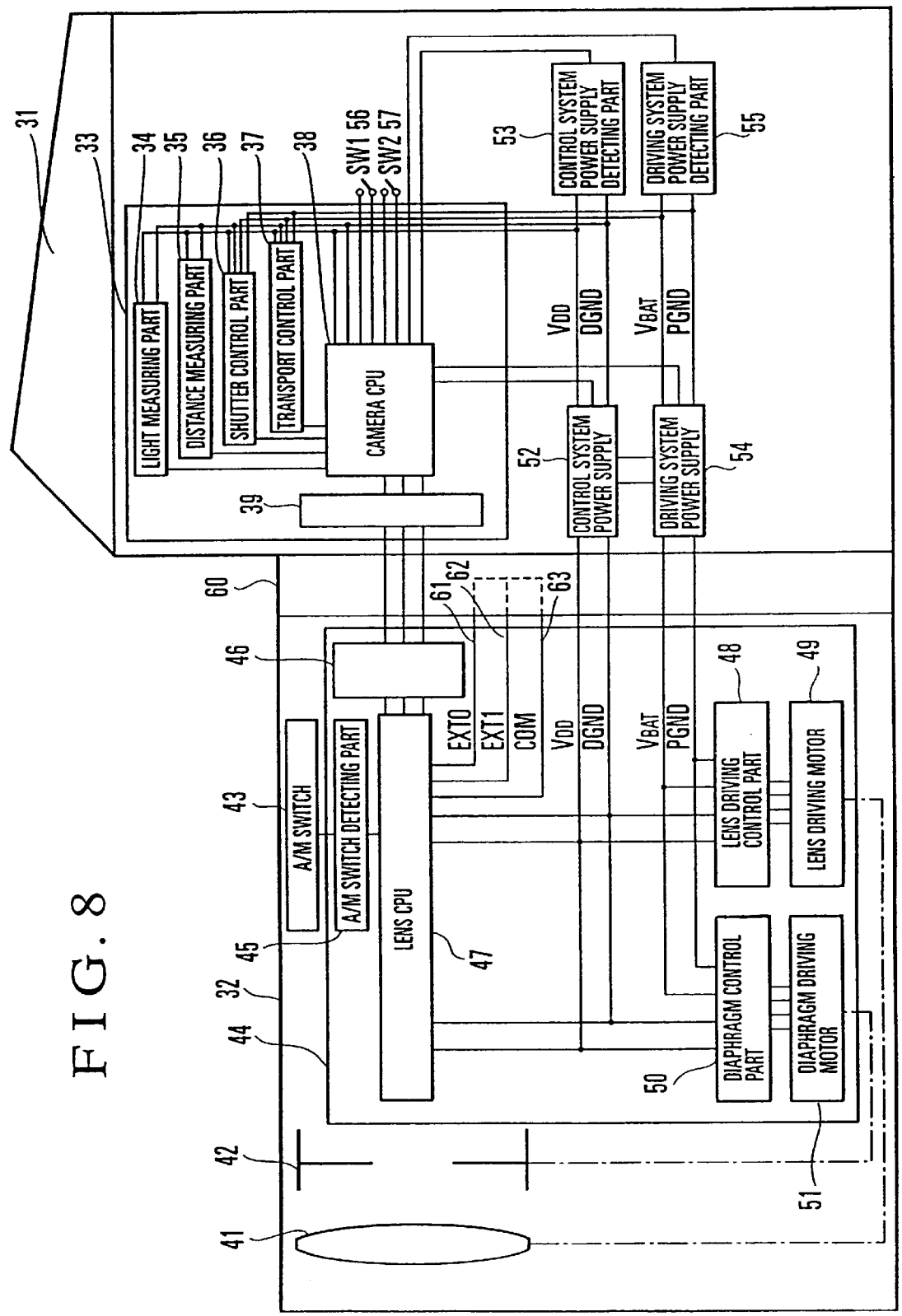
FIG. 8 is block diagram showing the electric circuitry according to a second embodiment of the invention.

FIG. 8 is a block diagram showing the arrangement of the camera system according to the second embodiment.

In FIG. 8, reference numeral 31 denotes the camera body and reference numeral 32 denotes the interchangeable lens in the camera system according to the second embodiment.

There is an electric circuit part 33 within the camera body 31. The electric circuit part 33 includes a light measuring part 34 for measuring the amount of light having passed through the interchangeable lens 32, a distance measuring part 35 for measuring the distance from a surface of film to an object to be photographed, a shutter control part 36 for exposing the film for an appropriate period of time, a transport control part 37 for winding or rewinding the film, a camera CPU 38 for controlling the various parts of the camera body 31, and a communication means 39 for performing serial communication with the interchangeable lens 32.

Further, in the interchangeable lens 32, there are disposed a focusing lens 41, a diaphragm 42 and an electric circuit part 44. The electric circuit part 44 of the interchangeable lens 32 includes a communication means 46 for performing serial communication with the camera body 31, a lens CPU 47 for controlling the various parts of the interchangeable lens 32, a lens driving control part 48 for controlling the driving of the focusing lens 41, a lens driving motor 49 for driving the focusing lens 41, a diaphragm control part 50 for controlling the driving of the diaphragm 42, and a diaphragm driving motor 51 for driving the diaphragm 42.

Reference numeral 52 denotes a control system power supply for supplying, in accordance with the output of the camera CPU 38, electric power to circuits of the control system, such as the light measuring part 34, the distance measuring part 35, the camera CPU 38 and the lens CPU 47, the amount of consumption of electric power of which is relatively small and which require stable output voltages.

Reference numeral 53 denotes a control system power supply detecting part for detecting the voltage and electric power of the control system power supply 52.

Reference numeral 54 denotes a driving system power supply for supplying, in accordance with the output of the camera CPU 38, electric power to circuits of the driving system, such as the shutter control part 36, the transport control part 37, the lens driving control part 48 and the diaphragm control part 50, the amount of consumption of electric power of which is relatively large.

Reference numeral 55 denotes a driving system power supply detecting part for detecting the voltage and electric power of the driving system power supply 54.

Reference numeral 56 denotes a switch (SW1) for starting the operation of the light measuring part 34, and reference numeral 57 denotes a switch (SW2) for starting the operation of the distance measuring part 35 and the shutter opening/closing operation of the shutter control part 36.

Reference numeral 60 denotes a lens adapter, such as an extender or an intermediate tube, reference numeral 61 denotes a lens-adapter detecting terminal (EXT0) of the lens CPU 47, reference numeral 62 denotes a lens-adapter detecting terminal (EXT1) of the lens CPU 47, and reference numeral 63 denotes a lens-adapter detecting terminal (COM) of the lens CPU 47.

Figure 9:
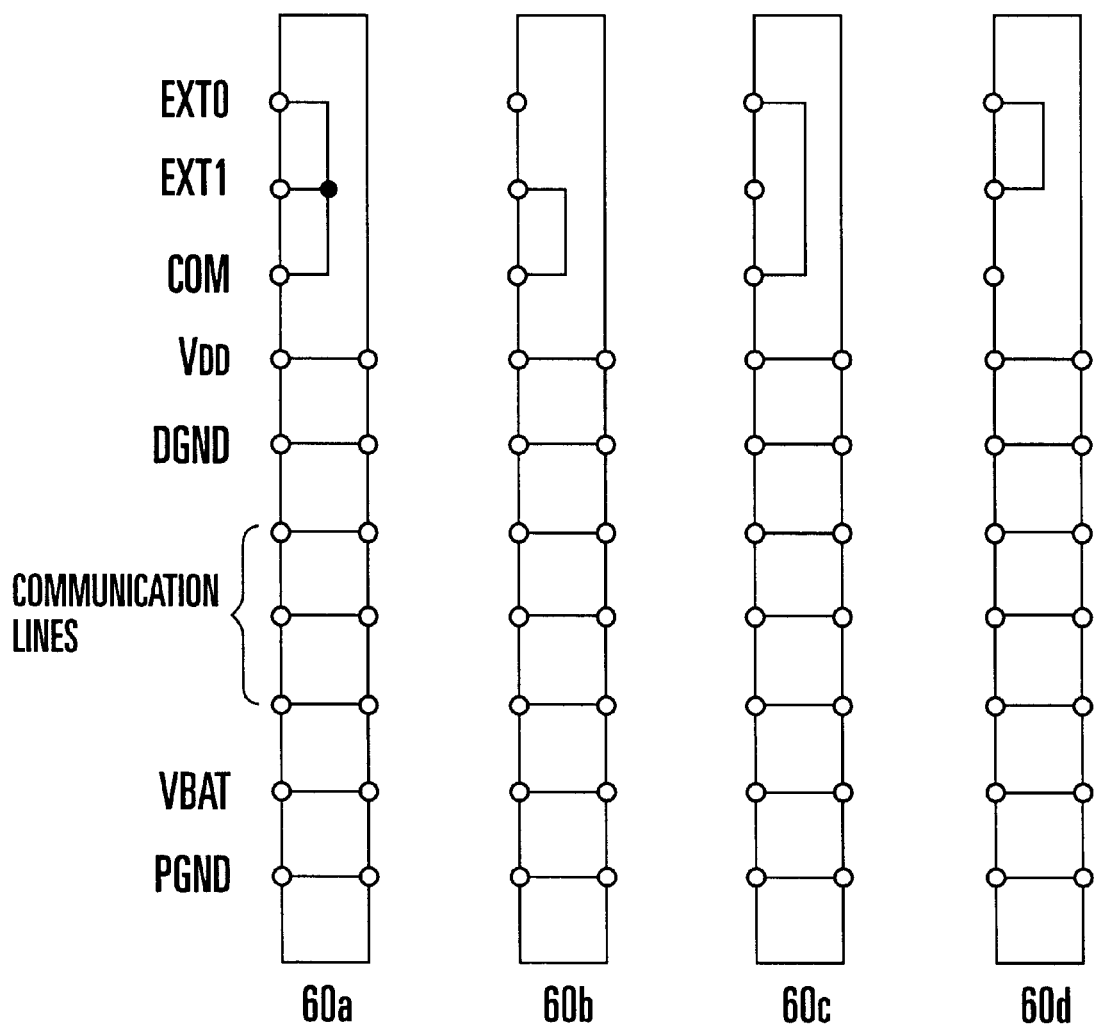
FIG. 9 is a diagram showing the electrical connections in the second embodiment of the invention.

FIG. 9 is a diagram showing the electrical connection of each of various kinds 60a to 60d of lens adapter 60.

The various kinds 60a to 60d of lens adapter 60 are respectively the same in electrical connection as the various kinds 5a to 5d of accessory 5 shown in FIG. 2.

The lens adapter of the kind 60a is assumed to be a 1.4× extender, the lens adapter of the kind 60b is assumed to be a 2.0× extender, the lens adapter of the kind 60c is assumed to be an intermediate tube, and the lens adapter of the kind 60d is assumed to be a new-type lens adapter.

The operation of the second embodiment is described below with reference to the flow charts of FIGS. 10 and 11.

Figure 10:
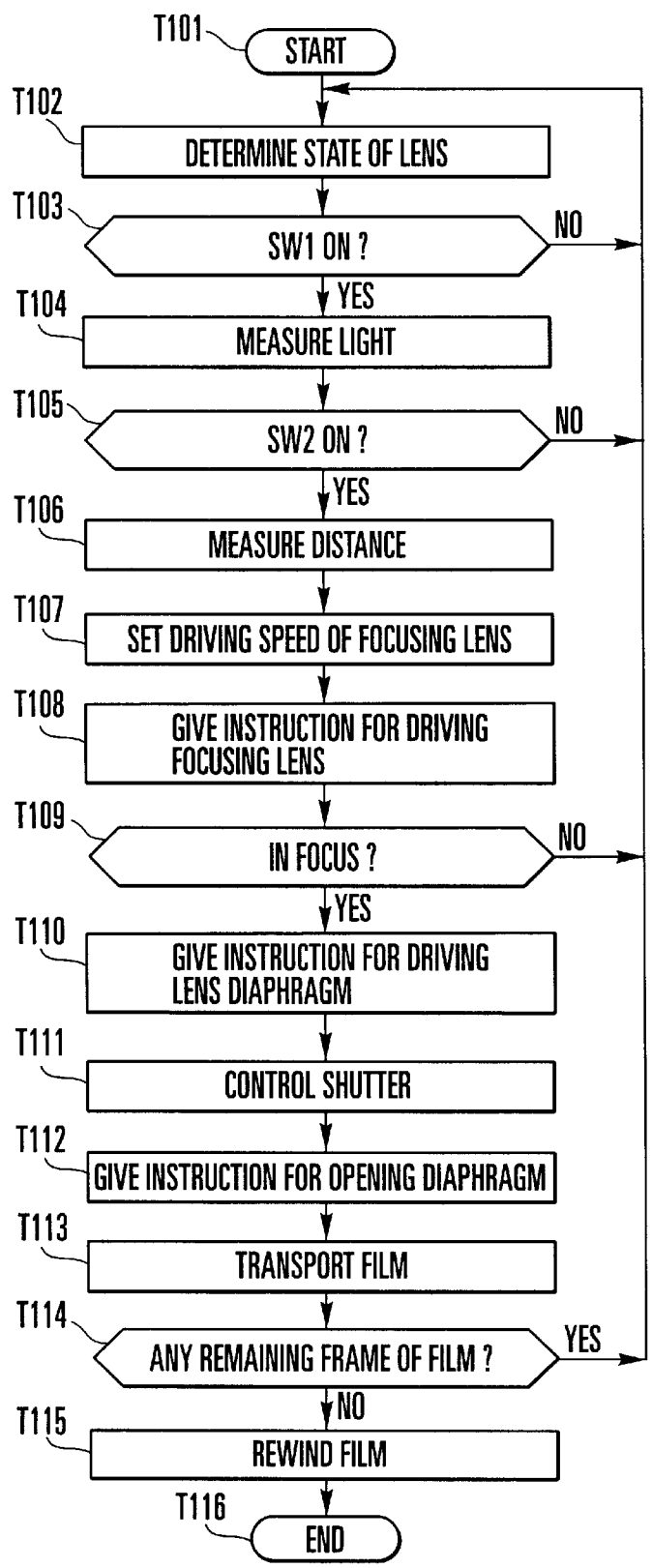
FIG. 10 is a flow chart showing the operation of a camera body in the second embodiment of the invention.
Figure 11:
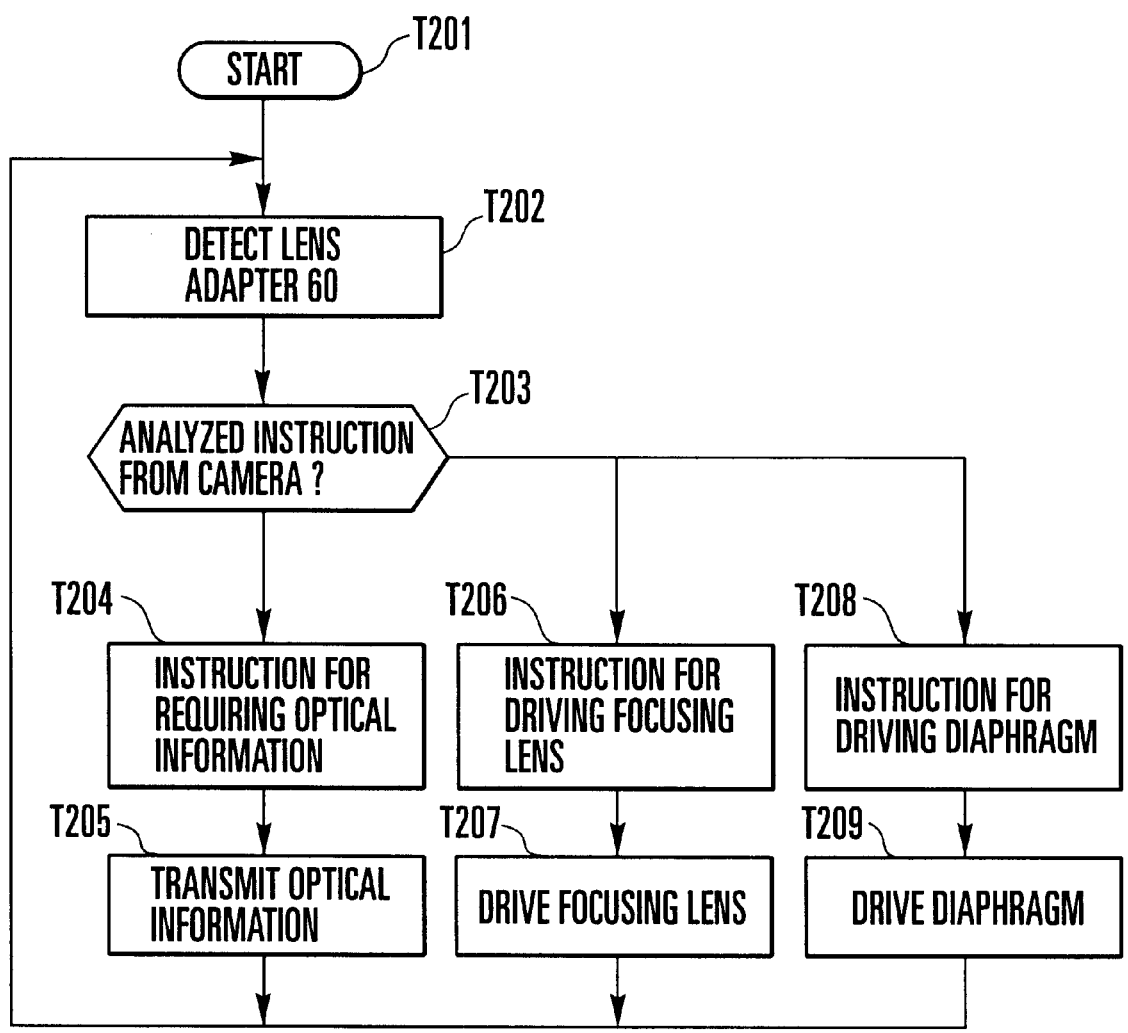
FIG. 11 is a flow chart showing the operation of an accessory (interchangeable lens) in the second embodiment of the invention.

FIG. 10 shows the flow chart concerned with the camera body 31, and FIG. 11 shows the flow chart concerned with the interchangeable lens 32.

In step T101 of FIG. 10, with a power supply switch (not shown) turned on, the control operation starts.

In step T102, the camera body 31 and the interchangeable lens 32 start eight-bit serial communication through the communication means 39 and the communication means 46. In synchronism with a serial clock signal, which is supplied from the side of the camera body 31, a communication instruction is transmitted from the camera body 31 to the interchangeable lens 32, and data responsive to the communication instruction received at the time of the preceding communication is transmitted from the interchangeable lens 32 to the camera body 31. Here, data to be transmitted from the interchangeable lens 32 is varied according to the presence or absence of the lens adapter 60.

In step T103, a check is made to find if the switch SW1 (56) is turned on. If so, the flow proceeds to step T104.

In step T104, a shutter speed and an aperture value are decided on the basis of the output of the light measuring part 34 and the F-number of the interchangeable lens 32. It is to be noted that the F-number of the interchangeable lens 32 varies according to the kind of lens adapter 60.

In step T105, a check is made to find if the switch SW2 (57) is turned on. If so, the flow proceeds to step T106.

In step T106, the amount of movement of the focusing lens 41 of the interchangeable lens 32 is decided on the basis of the output of the distance measuring part 35 and optical information of the interchangeable lens 32, and is then transmitted to the interchangeable lens 32. It is to be noted that the optical information of the interchangeable lens 32 varies according to the kind of lens adapter 60.

In step T107, the maximum driving speed of the focusing lens 41 is decided on the basis of the output of the distance measuring part 35 and the optical information of the interchangeable lens 32, and is then transmitted to the interchangeable lens 32.

In step T108, an instruction is transmitted to the interchangeable lens 32 for starting the movement of the focusing lens 41 by the amount of movement of the focusing lens 41 decided in step T106 and within the maximum driving speed of the focusing lens 41 decided in step T107.

In step T109, a check is made to find if the focusing lens 41 of the interchangeable lens 32 mounted on the camera body 31 is in an in-focus position, on the basis of the output of the distance measuring part 35 and the optical information of the interchangeable lens 32. If so, the flow proceeds to step T110. If not, the flow returns to step T102 to perform light measuring and distance measuring operations again.

In step T110, an instruction is transmitted to the interchangeable lens 32 for driving the diaphragm 42 up to the aperture value decided in step T104.

In step T111, the shutter is opened and closed by the shutter control part 36 at the shutter speed decided in step T104.

In step T112, an instruction is transmitted to the interchangeable lens 32 for driving the diaphragm 42 up to the full-opened state.

In step T113, a film (not shown) is transported for one frame portion thereof by the transport control part 37.

In step T114, a check is made to find if there is any remaining frame of the film (not shown). If not, i.e., if it is impossible for the transport control part 37 to transport the film in step T113, as it is determined that there remains no exposable frame, the flow proceeds to step T115. If there remains any exposable frame, the flow returns to step T102.

In step T115, the film is rewound. Then, the flow is brought to an end in step T116.

Next, the flow chart of FIG. 11 showing the operation of the interchangeable lens 32 is described.

In step T201 of FIG. 11, the operation of the interchangeable lens 32 starts in association with the mounting thereof on the camera body 31, or starts in response to an instruction from the camera body 31 through communication.

In step T202, the kind of lens adapter 60 attached to the interchangeable lens 32 is detected. The method for this detection is the same as that described in the first embodiment with reference to FIGS. 2 to 7. For example with respect to the kind of lens adapter 60, as in the same manner as the kinds shown in FIG. 2, the lens adapter of the kind 60a is assumed to be a 1.4× extender, the lens adapter of the kind 60b is assumed to be a 2.0× extender, the lens adapter of the kind 60c is assumed to be an intermediate tube, and the lens adapter of the kind 60d is assumed to be a new-type lens adapter. If the lens adapter of the kind 60a is connected to the interchangeable lens 32, an operation corresponding to the 1.4× extender is performed. If the lens adapter of the kind 60b is connected to the interchangeable lens 32, an operation corresponding to the 2.0× extender is performed. If the lens adapter of the kind 60c is connected to the interchangeable lens 32, an operation corresponding to the intermediate tube is performed. If the lens adapter of the kind 60d is connected to the interchangeable lens 32, an operation corresponding to the new-type lens adapter is performed.

In step T203, an instruction from the camera body 31 is analyzed. For example, if the instruction from the camera body 31 is an instruction for driving the focusing lens 41, the flow proceeds to step T206. If the instruction from the camera body 31 is an instruction for driving the diaphragm 42, the flow proceeds to step T208. If the instruction from the camera body 31 is an instruction for requiring optical information, the flow proceeds to step T204.

In step T204, the instruction for requiring optical information is received.

In step T205, in response to the instruction for requiring optical information, optical information corresponding to the lens adapter 60 connected to the interchangeable lens 32 is transmitted to the camera body 31.

In step T206, the instruction for driving the focusing lens 41 is received.

In step T207, the focusing lens 41 is driven in accordance with the instruction, from the camera body 31, indicative of the amount of movement and the direction of movement of the focusing lens 41.

In step T208, the instruction for driving the diaphragm 42 is received.

In step T209, the diaphragm 42 is driven in accordance with the instruction, from the camera body 31, indicative of the amount of aperture reduction and the direction of aperture change of the diaphragm 42.

(Third Embodiment)

Figure 12:
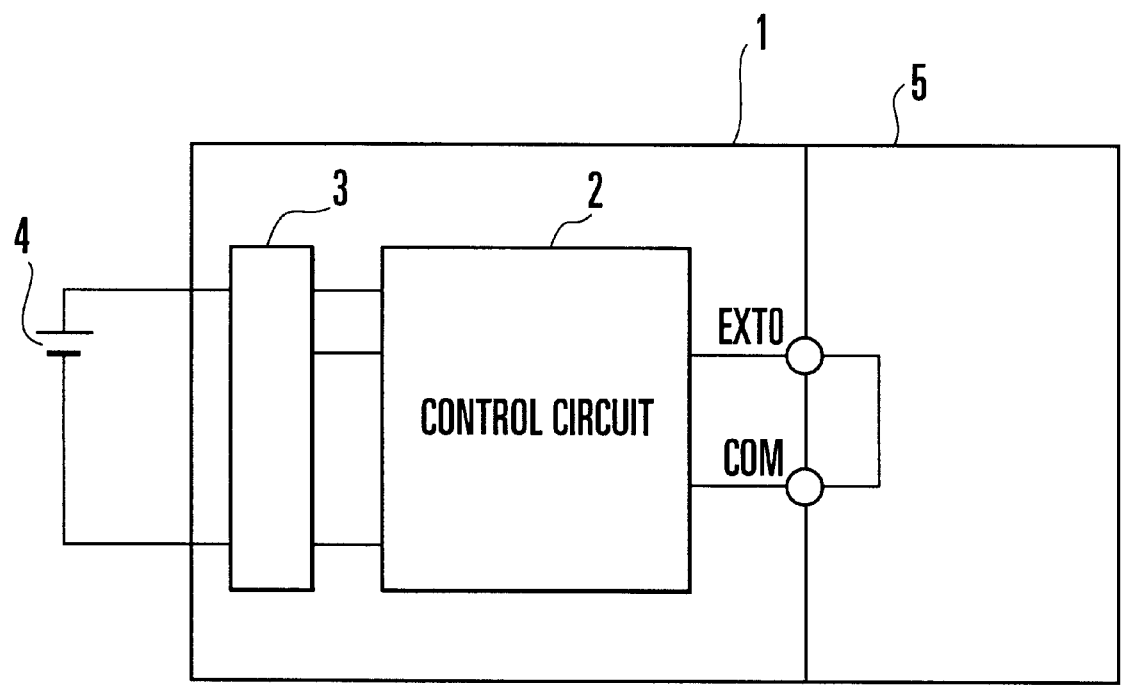
FIG. 12 is a block diagram showing the arrangement of an apparatus and an accessory according to a third embodiment of the invention.

FIG. 12 is a diagram showing in outline the arrangement of a system composed of a combination of an apparatus having a control circuit such as a microcomputer and an accessory having no control circuit and connected to the apparatus, according to a third embodiment of the invention.

In FIG. 12, reference numeral 1 denotes an apparatus having a control circuit, such as a microcomputer, reference numeral 2 denotes the control circuit, such as a microcomputer, reference numeral 3 denotes a controlled circuit which is to be controlled by the control circuit 2, and reference numeral 4 denotes a battery serving as a power supply. Reference numeral 5 denotes an accessory which is connected to the apparatus 1. The apparatus 1 and the accessory 5 are connected to each other at two terminals EXT0 and COM.

Figure 13:
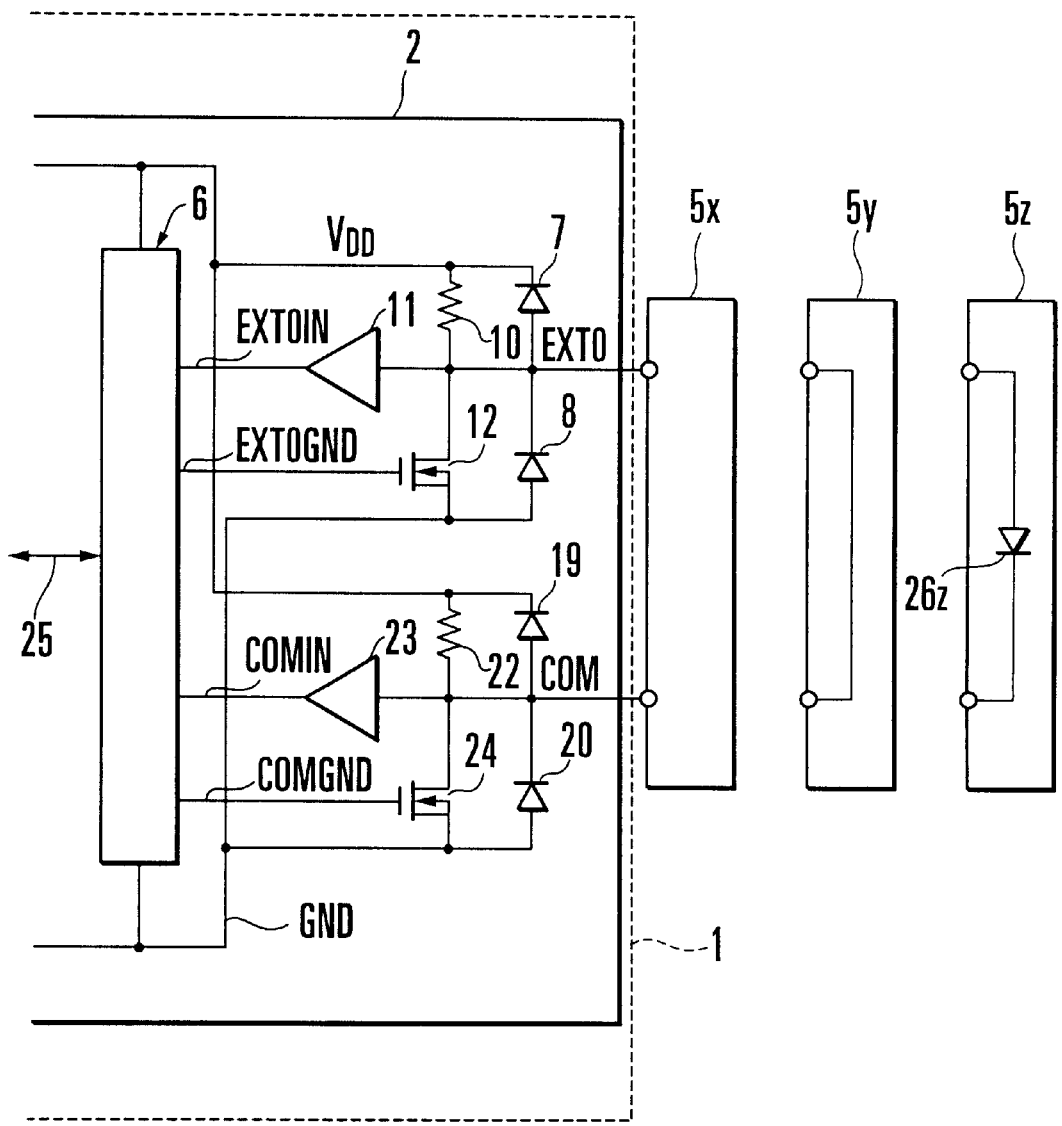
FIG. 13 is a circuit diagram showing the details of the arrangement of an essential portion of the apparatus shown in FIG. 12 and the arrangement of each of a plurality of kinds of accessories.

FIG. 13 is a circuit diagram showing the details of the control circuit 2. In FIG. 13, reference numeral 6 denotes a control part of the control circuit 2, and reference numerals 7, 8, 19 and 20 denote diodes for protecting the terminals EXT0 and COM. Reference numerals 10 and 22 denote resistors connected to a power supply $V_{DD}$ to pull up the terminals EXT0 and COM, respectively, and reference numerals 11 and 23 denote input circuits. Reference numerals 12 and 24 denote N-channel FETs (field-effect transistors) arranged to connect the terminals EXT0 and COM to the ground GND, respectively. Reference numeral 25 denotes a connection line for connecting the control part 6 to another circuit.

Reference numerals 5x, 5y and 5z denote three kinds of accessory 5, which are connectable to the apparatus 1. The accessories 5x and 5y are assumed to be the same as the accessories 105x and 105y shown in FIG. 27. On the other hand, the accessory 5z has an arrangement such that a diode 26z which allows a current to flow only in one direction is connected between two terminals of the accessory 5z.

With the system arranged as described above, when the accessory 5x is connected to the apparatus 1, as two terminals of the accessory 5x are in no short-circuited state, if the terminal EXT0 is used as an input terminal and the terminal COM is used as an output terminal, the logic of (EXT0, COM) becomes (1, 0), and, next, if the terminal EXT0 is used as an output terminal and the terminal COM is used as an input terminal, the logic of (EXT0, COM) becomes (0, 1).

When the accessory 5y is connected to the apparatus 1, as two terminals of the accessory 5y are in a short-circuited state, if the terminal EXT0 is used as an input terminal and the terminal COM is used as an output terminal, the logic of (EXT0, COM) becomes (0, 0), and, next, if the terminal EXT0 is used as an output terminal and the terminal COM is used as an input terminal, the logic of (EXT0, COM) becomes also (0, 0).

Further, when the accessory 5z in which the diode 26z allowing a current to flow only in one direction is connected between two terminals thereof is connected to the apparatus 1, if the terminal EXT0 is used as an input terminal and the terminal COM is used as an output terminal, the logic of (EXT0, COM) becomes (0, 0), and, next, if the terminal EXT0 is used as an output terminal and the terminal COM is used as an input terminal, the logic of (EXT0, COM) becomes (1, 0).

As is apparent from the foregoing description, by changing the relation in input and output terminals between the terminal EXT0 and the terminal COM and examining the results of detection of the logic of the terminal EXT0 and the terminal COM, even if there are three kinds of accessories, it is possible to discriminate which accessory has been connected to the apparatus 1, so that the apparatus 1 becomes able to change its subsequent operation to the operation corresponding to the accessory connected to the apparatus 1.

(Fourth Embodiment)

While, in the case of the third embodiment described above, there are three kinds of accessories connectable to the apparatus, a fourth embodiment of the invention is described below concerning an apparatus capable of detecting which accessory has been connected to the apparatus in a case where the number of kinds of accessories connectable as a system is increased (for example, in a case where there are nine kinds of accessories).

Figure 14:
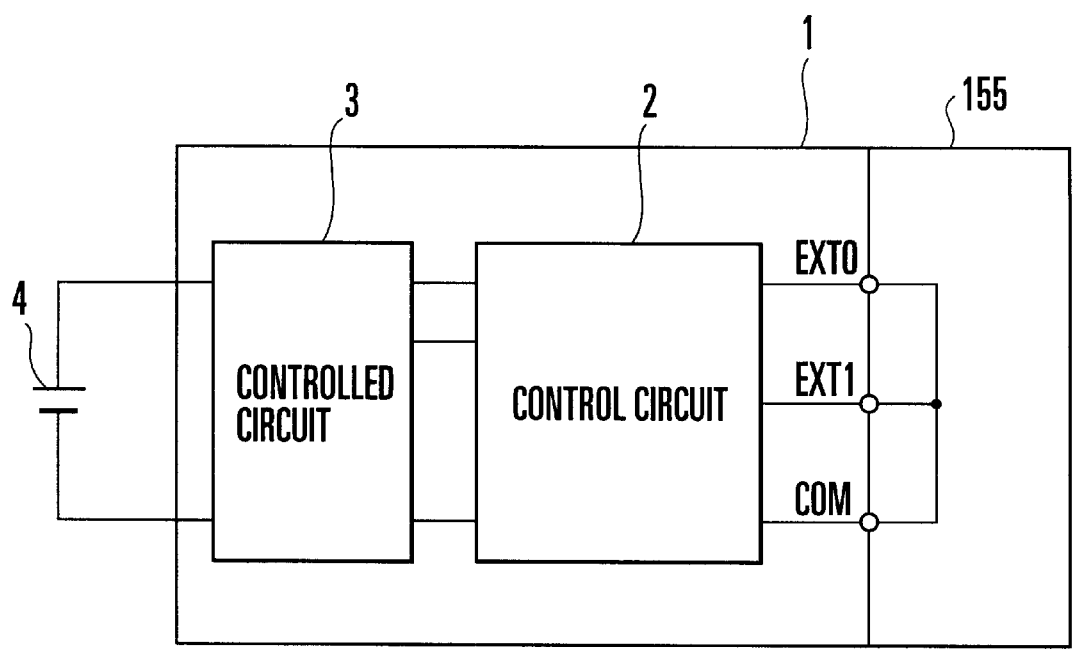
FIG. 14 is a block diagram showing the arrangement of an apparatus and an accessory according to a fourth embodiment of the invention.

FIG. 14 is a diagram showing in outline the arrangement of a system composed of a combination of an apparatus having a control circuit such as a microcomputer and an accessory having no control circuit and connected to the apparatus, according to the fourth embodiment of the invention. In FIG. 14, parts similar to those shown in FIG. 12 are denoted by the same reference numerals as in FIG. 12, and the description thereof is omitted here.

In FIG. 14, reference numeral 155 denotes an accessory to be connected to the apparatus 1. The accessory 155 is connected to a control circuit 2 at three terminals EXT0, EXT1 and COM.

Figure 15:
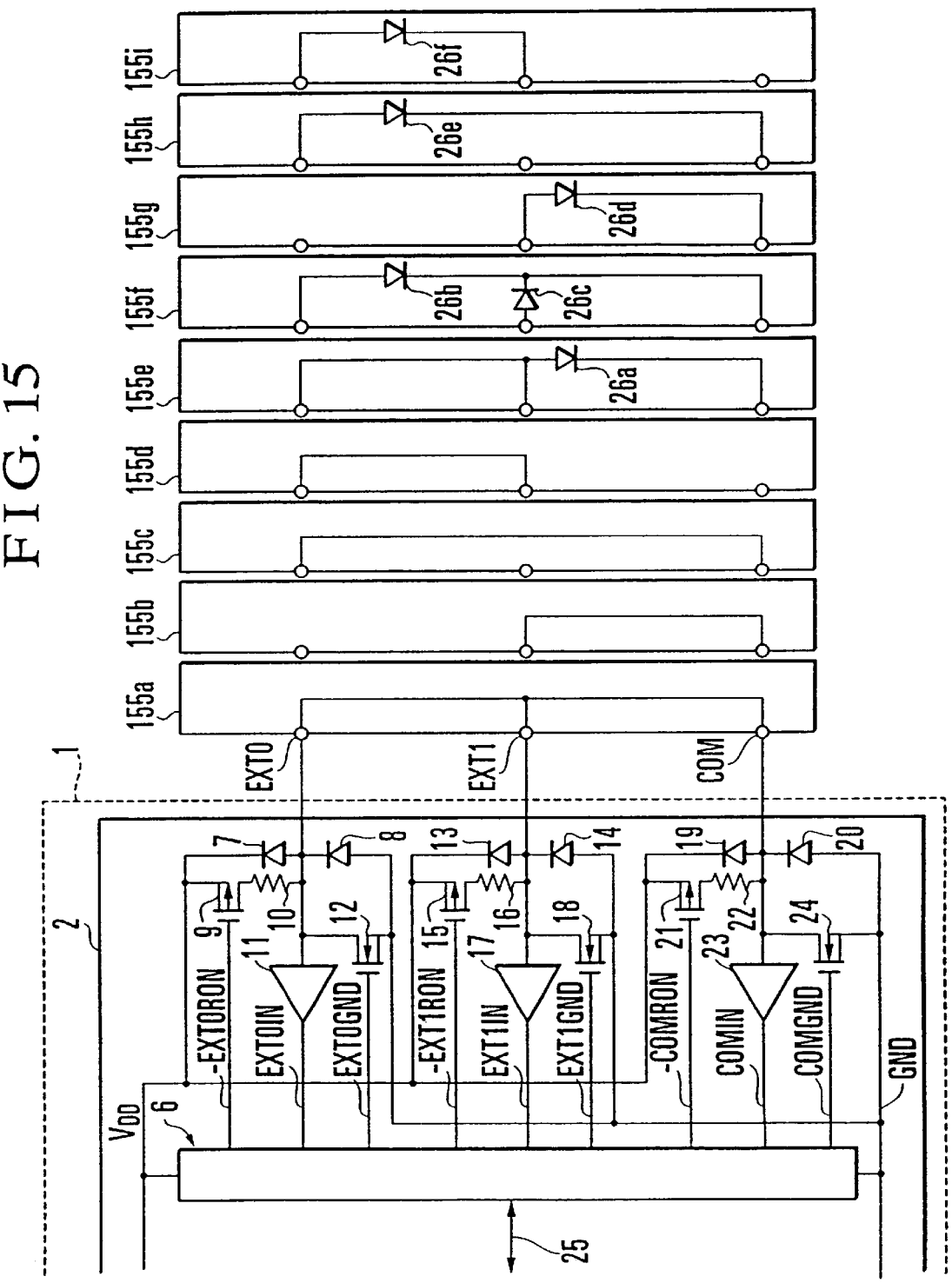
FIG. 15 is a circuit diagram showing the details of the arrangement of an essential portion of the apparatus shown in FIG. 14 and the arrangement of each of a plurality of kinds of accessories.

FIG. 15 is an electric circuit diagram for explaining the condition of connection between the control circuit 2 and the accessory 155 shown in the block diagram of FIG. 14. In FIG. 15, the same parts as those shown in FIG. 14 are denoted by the same reference numerals as in FIG. 14.

Referring to FIG. 15, in the control circuit 2, there are included a control part 6, diodes 7, 8, 13, 14, 19 and 20 for protecting the terminals EXT0, EXT1 and COM, P-channel FETs 9, 15 and 21, pull-up resistors 10, 16 and 22 for pulling up the terminals EXT0, EXT1 and COM by connecting the terminals EXT0, EXT1 and COM to a power supply $V_{DD}$, respectively, input circuits 11, 17 and 23, N-channel FETs 12, 18 and 24 for connecting the terminals EXT0, EXT1 and COM to the ground GND, respectively, and a connection line 25 for connecting the control part 6 to another circuit.

Reference numerals 155a to 155i respectively denote the different kinds of accessories connectable to the apparatus 1. In each of the accessories 155e to 155i, one or two of diodes 26a to 26f each of which allows a current to flow only in one direction are connected between terminals thereof, as shown in FIG. 15.

FIG. 16 shows a list of the setting states of control pins of the control part 6 and modes to be set thereby.

When the control pin –EXT0RON is set to "0", the FET 9 is turned on, so that the terminal EXT0 is connected to the pull-up resistor 10.

The control pin EXT0IN indicates the state of the terminal EXT0.

When the control pin EXT0GND is set to "1", the terminal EXT0 is set to the ground (logic "0").

Accordingly, "STATE OF EXT0" in FIG. 16 indicates whether the terminal EXT0 is connected to the ground GND (logic "0") so as to be used as an output terminal or whether the terminal EXT0 is connected to the pull-up resistor 10 so as to be used as an input terminal.

The function of each of the control pin –EXT1RON and the control pin –COMRON is the same as that of the control pin –EXT0RON.

The function of each of the control pin EXT1IN and the control pin COMIN is the same as that of the control pin EXT0IN.

The function of each of the control pin EXT1GND and the control pin COMGND is the same as that of the control pin EXT0GND.

"STATE OF EXT1" in FIG. 16 indicates whether the terminal EXT1 is connected to the ground GND (logic "0") so as to be used as an output terminal or whether the terminal EXT1 is connected to the pull-up resistor 16 so as to be used as an input terminal.

"STATE OF COM" in FIG. 16 indicates whether the terminal COM is connected to the ground GND (logic "0") so as to be used as an output terminal or whether the terminal COM is connected to the pull-up resistor 22 so as to be used as an input terminal.

In the case of a mode 0, each of the terminals EXT0, EXT1 and COM is connected to the ground GND (logic "0") to be used as an output terminal.

In the case of a mode 1, each of the terminals EXT0 and EXT1 is connected to the pull-up resistor to be used as an input terminal, while the terminal COM is connected to the ground GND to be used as an output terminal.

In the case of a mode 2, the terminal EXT1 is connected to the pull-up resistor to be used as an input terminal, while each of the terminals EXT0 and COM is connected to the ground GND to be used as an output terminal.

In the case of a mode 3, each of the terminals EXT1 and COM is connected to the pull-up resistor to be used as an input terminal, while the terminal EXT0 is connected to the ground GND to be used as an output terminal.

In the case of a mode 4, each of the terminals EXT0 and COM is connected to the pull-up resistor to be used as an input terminal, while the terminal EXT1 is connected to the ground GND to be used as an output terminal.

FIG. 17 shows the logic of each of the terminals EXT0, EXT1 and COM in the cases of "no accessory" (hereinafter referred to as accessory 155o), "accessory 155a", "accessory 155b", "accessory 155c", "accessory 155d", "accessory 155e", "accessory 155f", "accessory 155g", "accessory 155h" and "accessory 155i", in each of the modes 1, 2, 3 and 4.

In the mode 1, the logic of (EXT0, EXT1) becomes (0, 0) in each of the cases of "accessory 155a", "accessory 155e" and "accessory 155f", the logic of (EXT0, EXT1) becomes (0, 1) in each of the cases of "accessory 155c" and "accessory 155h", the logic of (EXT0, EXT1) becomes (1, 0) in each of the cases of "accessory 155b" and "accessory 155g", and the logic of (EXT0, EXT1) becomes (1, 1) in each of the cases of accessory 155o", "accessory 155d" and "accessory 155i".

In the mode 2, the logic of (EXT1) becomes (0) in each of the cases of "accessory 155a", "accessory 155b", "accessory 155d", "accessory 155e", "accessory 155f" and "accessory 155g", and the logic of (EXT1) becomes (1) in each of the cases of "accessory 155o", "accessory 155c", "accessory 155h" and "accessory 155i".

In the mode 3, the logic of (EXT1, COM) becomes (0, 0) in the case of "accessory 155a", the logic of (EXT1, COM) becomes (0, 1) in each of the cases of "accessory 155d" and "accessory 155e", the logic of (EXT1, COM) becomes (1, 0) in the case of "accessory 155c", and the logic of (EXT1, COM) becomes (1, 1) in each of the cases of "accessory 155o", "accessory 155b", "accessory 155f", "accessory 155g", "accessory 155h" and "accessory 155i".

In the mode 4, the logic of (EXT0, COM) becomes (0, 0) in the case of "accessory 155a", the logic of (EXT0, COM) becomes (0, 1) in each of the cases of "accessory 155d", "accessory 155e" and "accessory 155i", the logic of (EXT0, COM) becomes (1, 0) in the case of "accessory 155b", and the logic of (EXT0, COM) becomes (1, 1) in each of the cases of "accessory 155o", "accessory 155c", "accessory 155f", "accessory 155g" and "accessory 155h".

Accordingly, in accordance with a combination of detection results obtained in the respective modes, it is possible to detect which accessory among the nine kinds of accessories has been connected to the apparatus 1.

Referring to FIG. 17, an explanation is made about a case where the accessory 155e has been connected to the apparatus 1 in the mode 1 (with the terminal COM connected to the ground GND and the terminals EXT0 and EXT1 connected to the pull-up resistors).

An input voltage Vin of the input circuits 11 and 17 is decided by a turning-on voltage VLon of the FET 24 and a forward voltage VF of the diode 26a in a value of current i obtained by adding a current caused by a composite resistance of the resistance (Rpfet9) of the FET 9 and the resistance (R10) of the pull-up resistor 10 and a current caused by a composite resistance of the resistance (Rpfet15) of the FET 15 and the resistance (R16) of the pull-up resistor 16.

Input voltage $Vin=VLon+VF$

{Condition: $i=(V_{DD}-VLon-VF) \times (Rpfet9+R10+Rpfet15+R16)/((Rpfet9+R10) \times (Rpfet15+R16))$}

In this instance, taking into consideration the voltage drop caused by the wiring resistance, the voltage fluctuation caused by the noise or the like, it is necessary to make a maximum input low-level voltage (when the voltage of an input signal is lower than the maximum input low-level voltage, the logic of the input signal is determined to be "0") VIL of the input circuits 11 and 17 higher than the above-mentioned voltage Vin. This is for the purpose of preventing the conventional apparatus from determining that there is no accessory, when such a diode as to cause a large drop of voltage is used.

Figure 18:
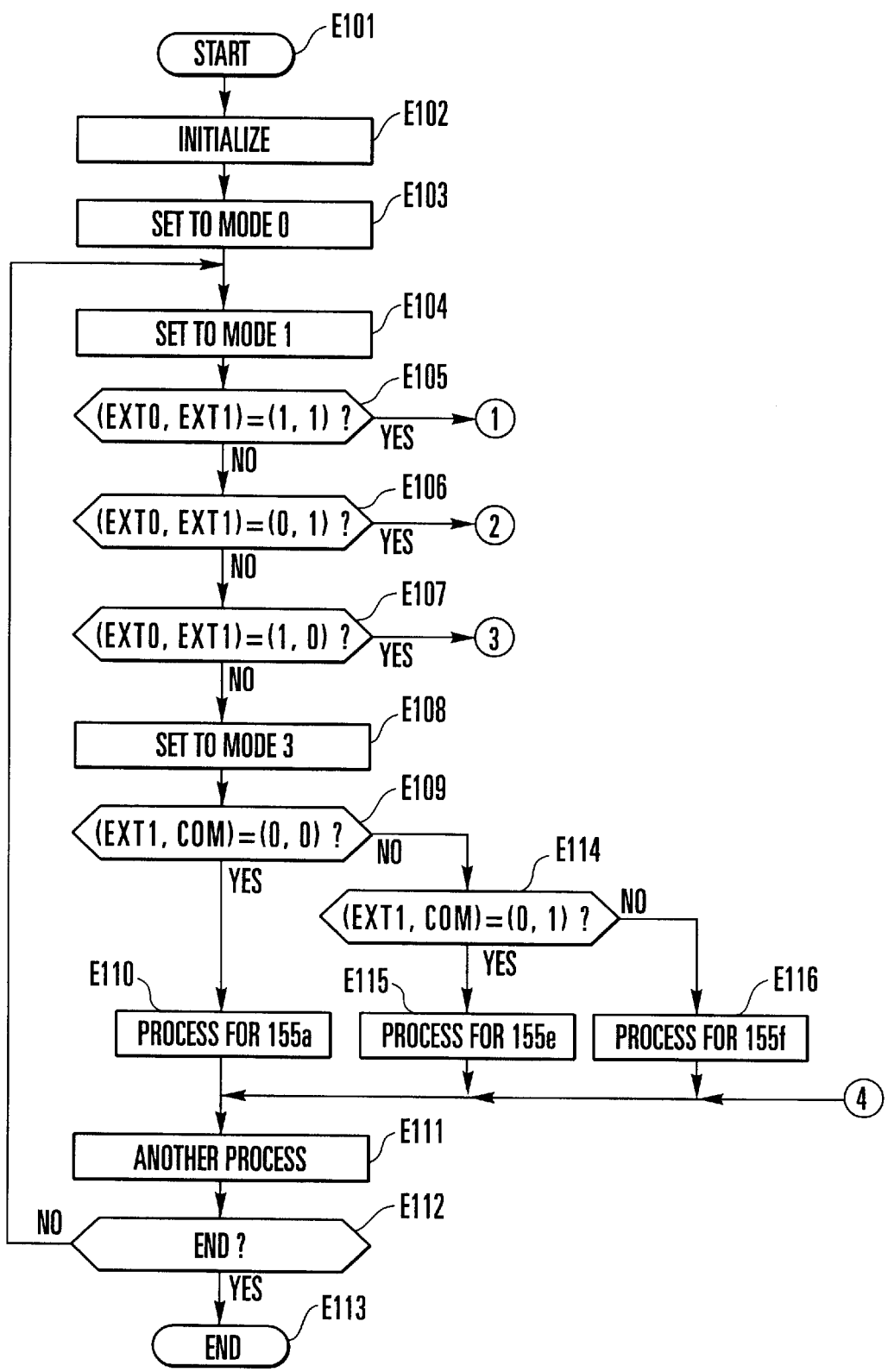
FIG. 18 is a flow chart showing a part of the operation of the apparatus according to the fourth embodiment of the invention.
Figure 19:
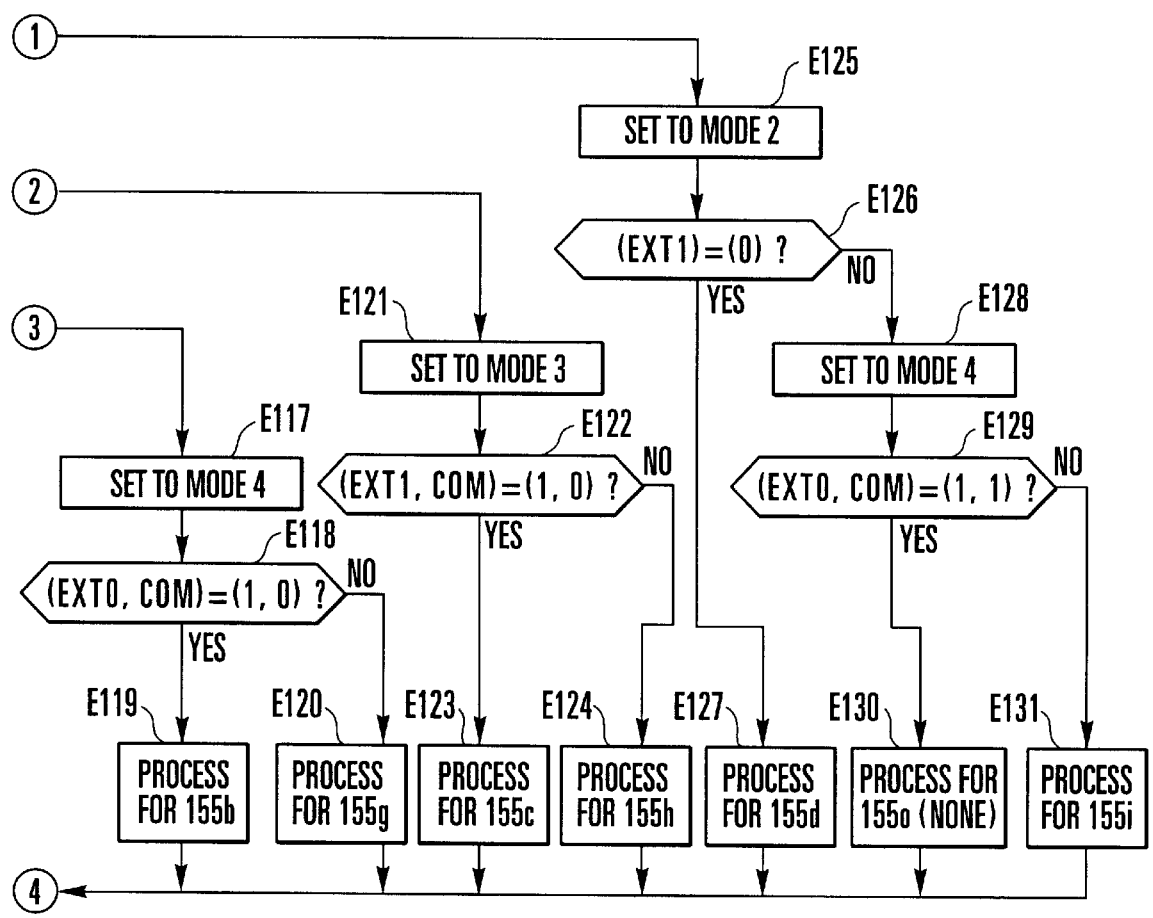
FIG. 19 is a flow chart showing the operation continuing from the operation shown in the flow chart of FIG. 18.

FIGS. 18 and 19 are flow charts showing the operation of the control circuit 2 in the fourth embodiment.

In step E101, the operation is started.

In step E102, an initializing operation upon turning-on of the power supply is performed.

In step E103, the terminals EXT0, EXT1 and COM are set to the mode 0, as a part related to the fourth embodiment of the initializing operation upon turning-on of the power supply.

In step S104, next, the terminals EXT0/, EXT1 and COM are set to the mode 1.

In step E105, a check is made to find if the logic of the terminals EXT0 and EXT1 is (1, 1). If so, as it is determined that there is no accessory (155o) or one of the accessories 155d and 155i is connected, the flow proceeds to step E125 of FIG. 19. If not, as it is determined that one of the accessories 155a, 155b, 155c, 155e, 155f, 155g and 155h is connected, the flow proceeds to step E106.

In step E106, a check is made to find if the logic of the terminals EXT0 and EXT1 is (0, 1). If so, as it is determined that one of the accessories 155c and 155h is connected, the flow proceeds to step E121 of FIG. 19. If not, as it is determined that one of the accessories 155a, 155b, 155e, 155f and 155g is connected, the flow proceeds to step E107.

In step E107, a check is made to find if the logic of the terminals EXT0 and EXT1 is (1, 0). If so, as it is determined that one of the accessories 155b and 155g is connected, the flow proceeds to step E117 of FIG. 19. If not, as it is determined that one of the accessories 155a, 155e and 155f is connected, the flow proceeds to step E108.

In step E108, the terminals EXT0, EXT1 and COM are set to the mode 3.

In the next step E109, a check is made to find if the logic of the terminals EXT0 and COM is (0, 0). If not, as it is determined that one of the accessories 155e and 155f is connected, the flow proceeds to step E114. If so, as it is determined that the accessory 155a is connected, the flow proceeds to step E110.

In step E110, a process corresponding to the accessory 155a is performed.

In the next step E111, a process unrelated to any accessory is performed.

In step E112, a check is made to find if the flow is to be ended, on the basis of communication from the outside, or the like. If so, the flow proceeds to step E113 to be brought to an end. If not, the flow returns to step E104.

In a case where the flow has proceeded to step E114 upon determining that one of the accessories 155e and 155f is connected, as the logic of the terminals EXT1 and COM is not (0, 0) in the above step E109, a check is made in the step E114 to find if the logic of the terminals EXT1 and COM is (0, 1). If so, as it is determined that the accessory 155e is connected, the flow proceeds to step E115. In step E115, a process corresponding to the accessory 155e is performed. If not, as it is determined that the accessory 155f is connected, the flow proceeds to step E116. In step E116, a process corresponding to the accessory 155f is performed.

Further, in a case where the flow has proceeded to step E117 of FIG. 19 upon determining that one of the accessories 155b and 155g is connected, as the logic of the terminals EXT0 and EXT1 is (1, 0) in the above step E107, the terminals EXT0, EXT1 and COM are set to the mode 4 in the step E117.

In the next step E118, a check is made to find if the logic of the terminals EXT0 and COM is (1, 0). If so, as it is determined that the accessory 155b is connected, the flow proceeds to step E119. In step E119, a process corresponding to the accessory 155b is performed. If not, as it is determined that the accessory 155g is connected, the flow proceeds to step E120. In step E120, a process corresponding to the accessory 155g is performed.

Further, in a case where the flow has proceeded to step E121 of FIG. 19 upon determining that one of the accessories 155c and 155h is connected, as the logic of the terminals EXT0 and EXT1 is (0, 1) in the above step E106, the terminals EXT0, EXT1 and COM are set to the mode 3 in the step E121.

In the next step E122, a check is made to find if the logic of the terminals EXT0 and COM is (1, 0). If so, as it is determined that the accessory 155c is connected, the flow proceeds to step E123. In step E123, a process corresponding to the accessory 155c is performed. If not, as it is determined that the accessory 155h is connected, the flow proceeds to step E124. In step E124, a process corresponding to the accessory 155h is performed.

Further, in a case where the flow has proceeded to step E125 of FIG. 19 upon determining that there is no accessory (155o) or one of the accessories 155d and 155i is connected, as the logic of the terminals EXT0 and EXT1 is (1, 1) in the above step E105, the terminals EXT0, EXT1 and COM are set to the mode 2 in the step E125.

In the next step E126, a check is made to find if the logic of the terminal EXT1 is (0). If so, as it is determined that the accessory 155d is connected, the flow proceeds to step E127. In step E127, a process corresponding to the accessory 155d is performed.

If the logic of the terminal EXT1 is not (0) in the above step E126, as it is determined that there is no accessory (155o) or the accessory 155i is connected, the flow proceeds to step E128. In step E128, the terminals EXT0, EXT1 and COM are set to the mode 4.

In the next step E129, a check is made to find if the logic of the terminals EXT0 and COM is (1, 1). If so, as it is determined that there is no accessory (155o), the flow proceeds to step E130. In step E130, a process corresponding to the absence of accessory (155o) is performed. If not, as it is determined that the accessory 155i is connected, the flow proceeds to step E131. In step E131, a process corresponding to the accessory 155i is performed.

After completing the process in each of the steps E115, E115, E119, E120, E123, E124, E127, E130 and E131, the operations in the step E111 and subsequent steps are performed.

FIGS. 20(a) to 20(d) are diagrams showing examples of replacement of the diode 26 (26a to 26f) shown in FIG. 15.

FIG. 20(a) shows the diode (silicon diode or germanium diode) 26 shown in FIG. 15, FIG. 20(b) shows the connection state in which the diode 26 is replaced by a Schottky diode 27 having a smaller forward voltage VF than that of the silicon diode 26, and FIGS. 20(c) and 20(d) respectively show the connection states in which the diode 26 is replaced by a Schottky diode 27 and Zener diodes 28a and 28b.

Further, FIGS. 21(a) to 21(h) are diagrams showing examples in which the diode 26 shown in FIG. 15 is replaced by a bipolar transistor. FIGS. 21(a) to 21(d) respectively show the connection states in which the diode 26 is replaced by an NPN transistor 29a, and FIGS. 21(e) to 21(h) respectively show the connection states in which the diode 26 is replaced by a PNP transistor 29b.

(Fifth Embodiment)

FIGS. 22 to 25 relate to a fifth embodiment of the invention, in which a camera system composed of a camera body and an interchangeable lens which are able to communicate with each other and a lens adapter connected between the camera body and the interchangeable lens will be described.

Figure 22:
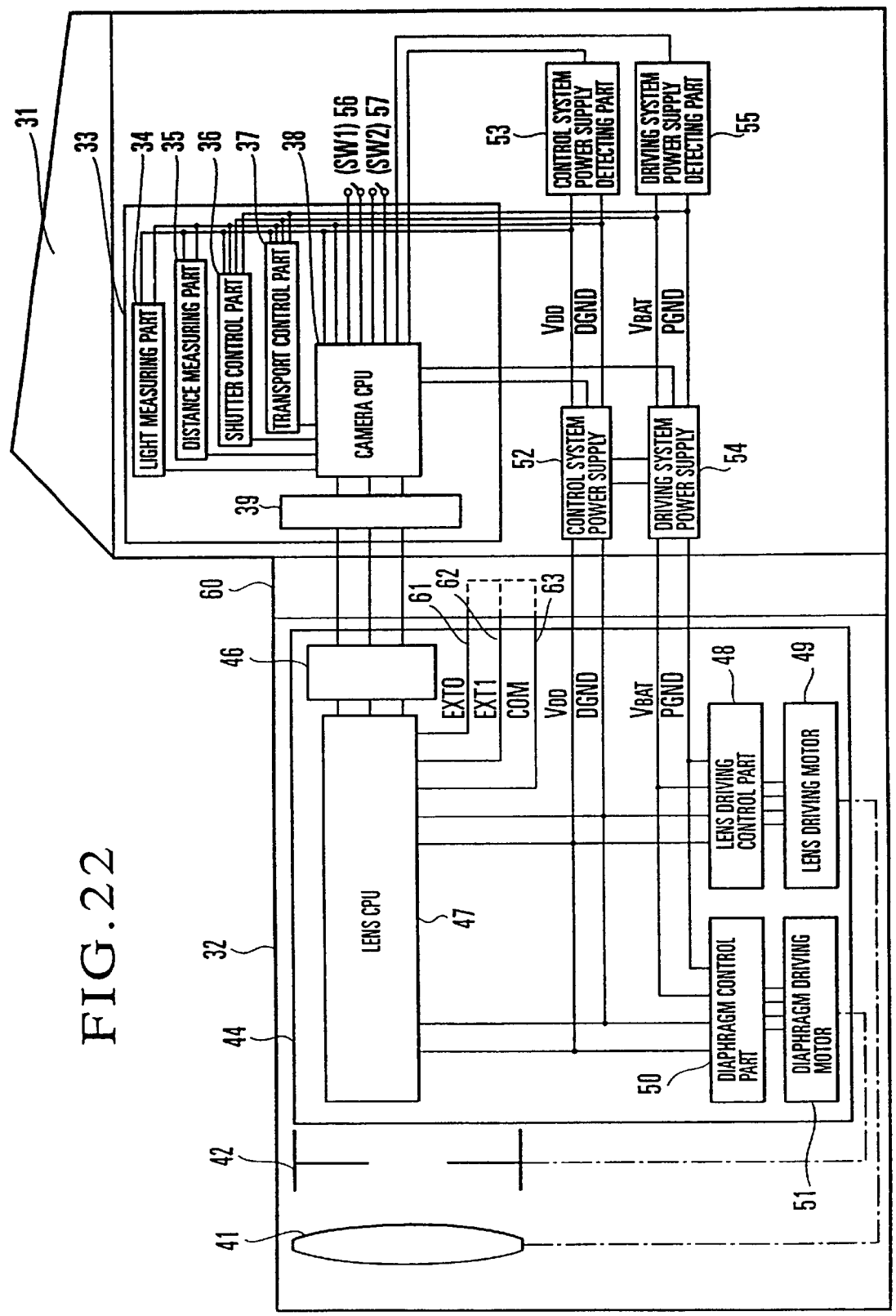
FIG. 22 is a block diagram showing the arrangement of each of a camera, an interchangeable lens and an accessory according to a fifth embodiment of the invention.

FIG. 22 is a block diagram showing the circuit arrangement of a camera system according to the fifth embodiment of the invention. In FIG. 22, reference numeral 31 denotes a camera body, reference numeral 32 denotes a photo-taking lens, and reference numeral 60 denotes a lens adapter such as an extender or an intermediate tube.

There is an electric circuit part 33 within the camera body 31. The electric circuit part 33 includes a light measuring part 34 for measuring the amount of light having passed through the photo-taking lens 32, a distance measuring part 35 for measuring the distance from a surface of film to an object to be photographed, a shutter control part 36 for exposing the film for an appropriate period of time, a transport control part 37 for winding or rewinding the film, a camera CPU 38 for controlling the various parts of the camera body 31, and a communication means 39 for performing serial communication with the photo-taking lens 32.

Further, in the photo-taking lens 32, there are disposed a focusing lens 41, a diaphragm 42 and an electric circuit part 44. The electric circuit part 44 of the photo-taking lens 32 includes a communication means 46 for performing serial communication with the camera body 31, a lens CPU 47 for controlling the various parts of the photo-taking lens 32, a lens driving control part 48 for controlling the driving of the focusing lens 41, a lens driving motor 49 for driving the focusing lens 41, a diaphragm control part 50 for controlling the driving of the diaphragm 42, and a diaphragm driving motor 51 for driving the diaphragm 42.

Reference numeral 52 denotes a control system power supply for supplying, in accordance with the output of the camera CPU 38, electric power to circuits of the control system, such as the light measuring part 34, the distance measuring part 35, the camera CPU 38 and the lens CPU 47, the amount of consumption of electric power of which is relatively small and which require stable output voltages. Reference numeral 53 denotes a control system power supply detecting part for detecting the voltage and electric power of the control system power supply 52.

Reference numeral 54 denotes a driving system power supply for supplying, in accordance with the output of the camera CPU 38, electric power to circuits of the driving system, such as the shutter control part 36, the transport control part 37, the lens driving control part 48 and the diaphragm control part 50, the amount of consumption of electric power of which is relatively large. Reference numeral 55 denotes a driving system power supply detecting part for detecting the voltage and electric power of the driving system power supply 54.

Reference numeral 56 denotes a switch (SW1) for starting the operation of the light measuring part 34, and reference numeral 57 denotes a switch (SW2) for starting the operation of the distance measuring part 35 and the shutter opening/closing operation of the shutter control part 36.

Reference numeral 60 denotes, as described above, the lens adapter, such as an extender or an intermediate tube, reference numeral 61 denotes a lens-adapter detecting terminal (EXT0) of the lens CPU 47, reference numeral 62 denotes a lens-adapter detecting terminal (EXT1) of the lens CPU 47, and reference numeral 63 denotes a lens-adapter detecting terminal (COM) of the lens CPU 47.

Figure 23:
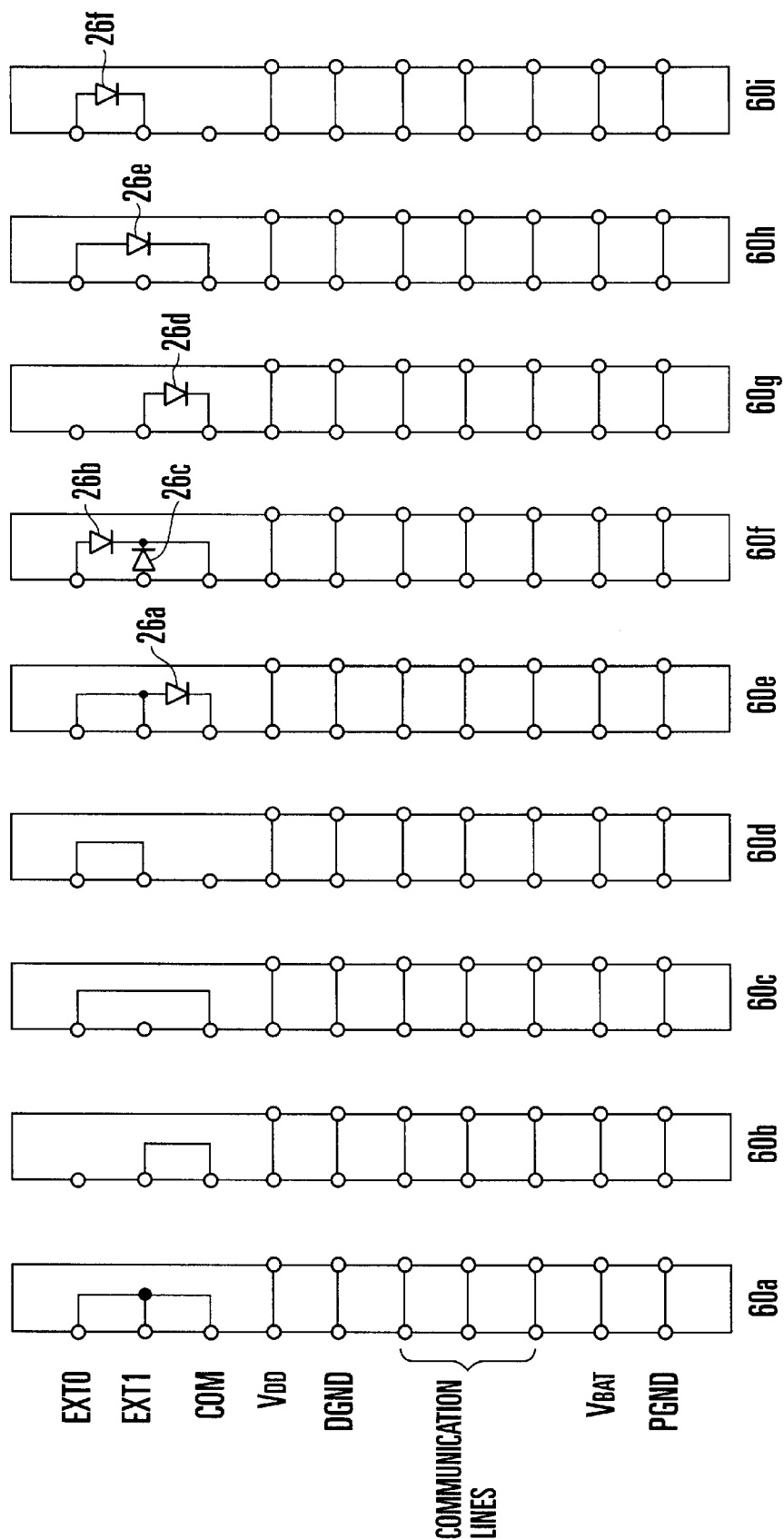
FIG. 23 is a diagram showing the kinds of accessories which are mountable on the camera in the fifth embodiment of the invention.

FIG. 23 is a diagram showing the kinds of lens adapters 60, in which nine kinds of lens adapters 60a to 60i are illustrated by way of example. The manners of connection of terminals of the lens adapters 60a to 60i for the terminals EXT0, EXT1 and COM are the same as those of the accessories 155a to 155i shown in FIG. 15.

Next, the operations of the various parts of the camera system according to the fifth embodiment will be described with reference to FIGS. 24 and 25.

Figure 24:
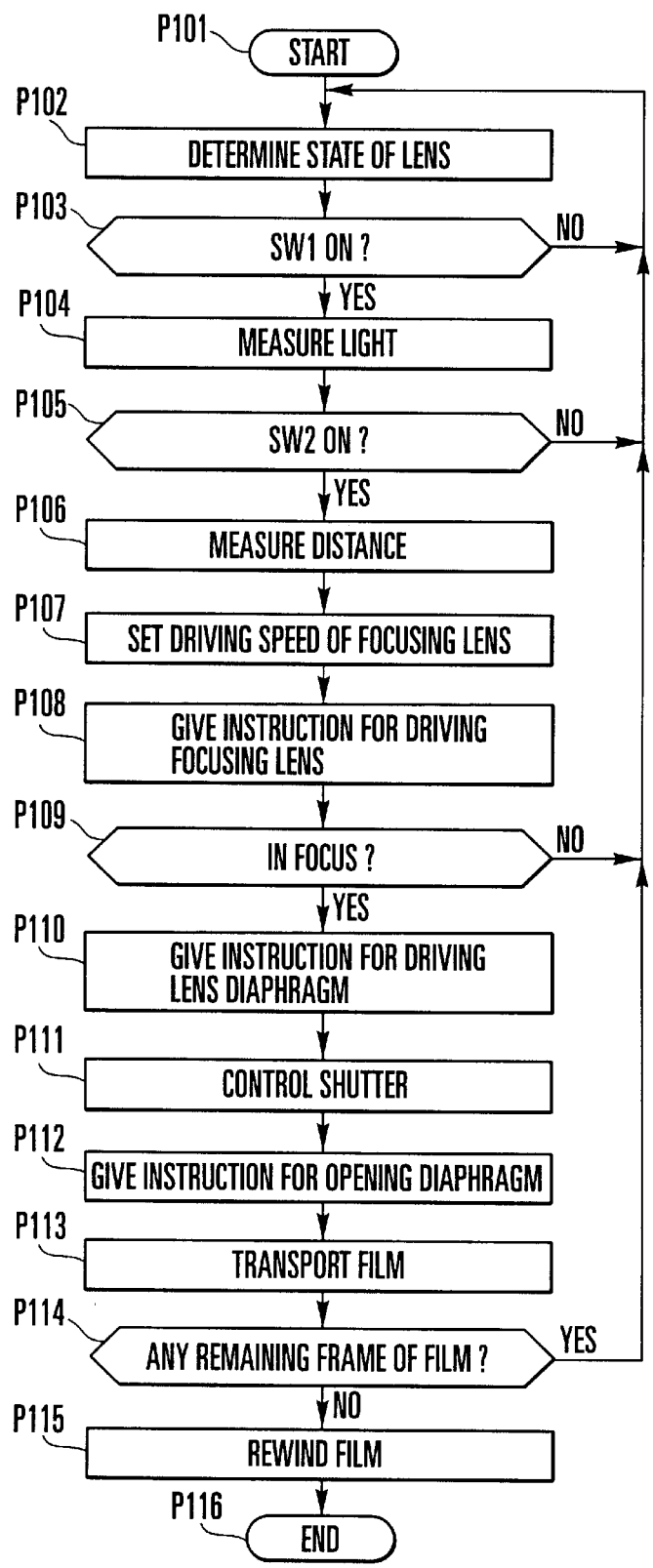
FIG. 24 is a flow chart showing the operation on the camera side in the fifth embodiment of the invention.

FIG. 24 is a flow chart showing the operation of the camera body 31. In step P101 of FIG. 24, with a power supply switch (not shown) turned on, the operation starts.

In step P102, the camera body 31 and the photo-taking lens 32 start eight-bit serial communication through the communication means 39 and the communication means 46. In synchronism with a serial clock signal, which is supplied from the side of the camera body 31, a communication instruction is transmitted from the camera body 31 to the photo-taking lens 32, and data responsive to the communication instruction received at the time of the preceding communication is transmitted from the photo-taking lens 32 to the camera body 31. Here, data to be transmitted from the photo-taking lens 32 is varied according to the presence or absence of the lens adapter 60.

In the next step P103, a check is made to find if the switch SW1 (56) is turned on. If so, the flow proceeds to step P104. In step P104, a shutter speed and an aperture value are decided on the basis of the output of the light measuring part 34 and the F-number of the photo-taking lens 32. It is to be noted that the F-number of the photo-taking lens 32 is varied according to the various kinds of lens adapter 60. As will be described later, the kind of lens adapter connected is detected on the side of the photo-taking lens 32, and the F-number corresponding to the detected kind is communicated, as one piece of optical information, from the photo-taking lens 32 to the camera body 31.

In step P105, a check is made to find if the switch SW2 (57) is turned on. If so, the flow proceeds to step P106. In step P106, the amount of movement of the focusing lens 41 of the photo-taking lens 32 is decided on the basis of the output of the distance measuring part 35 and optical information of the photo-taking lens 32, and is then transmitted to the photo-taking lens 32. It is to be noted that, while the optical information of the photo-taking lens 32 varies according to the kind of lens adapter 60, optical information corresponding to the lens adapter connected to the camera body is communicated from the photo-taking lens 32 to the camera body 31, as described above.

In the next step P107, the maximum driving speed of the focusing lens 41 is decided on the basis of the output of the distance measuring part 35 and the optical information of the photo-taking lens 32, and is then transmitted to the photo-taking lens 32. In step P108, an instruction is transmitted to the photo-taking lens 32 for starting the movement of the focusing lens 41 by the amount of movement of the focusing lens 41 decided in step P106 and within the maximum driving speed of the focusing lens 41 decided in step P107.

In step P109, a check is made to find if the focusing lens 41 of the photo-taking lens 32 mounted on the camera body 31 is in an in-focus position, on the basis of the output of the distance measuring part 35 and the optical information of the photo-taking lens 32. If so, the flow proceeds to step P110. If not, the flow returns to step P102 to perform light measuring and distance measuring operations again.

In step P110, an instruction is transmitted to the photo-taking lens 32 for driving the diaphragm 42 up to the aperture value decided in step P104. In step P111, the shutter is opened and closed by the shutter control part 36 at the shutter speed decided in step P104. In step P112, an instruction is transmitted to the photo-taking lens 32 for driving the diaphragm 42 up to the full-opened state.

In step P113, a film (not shown) is transported for one frame portion thereof by the transport control part 37.

In step P114, a check is made to find if there is any remaining frame of the film (not shown). If not, i.e., if it is impossible for the transport control part 37 to transport the film in step P113, as it is determined that there remains no exposable frame, the flow proceeds to step P115. If there remains any exposable frame, the flow returns to step P102.

In step P115, the film is rewound. Then, the flow is brought to an end in step P116.

Figure 25:
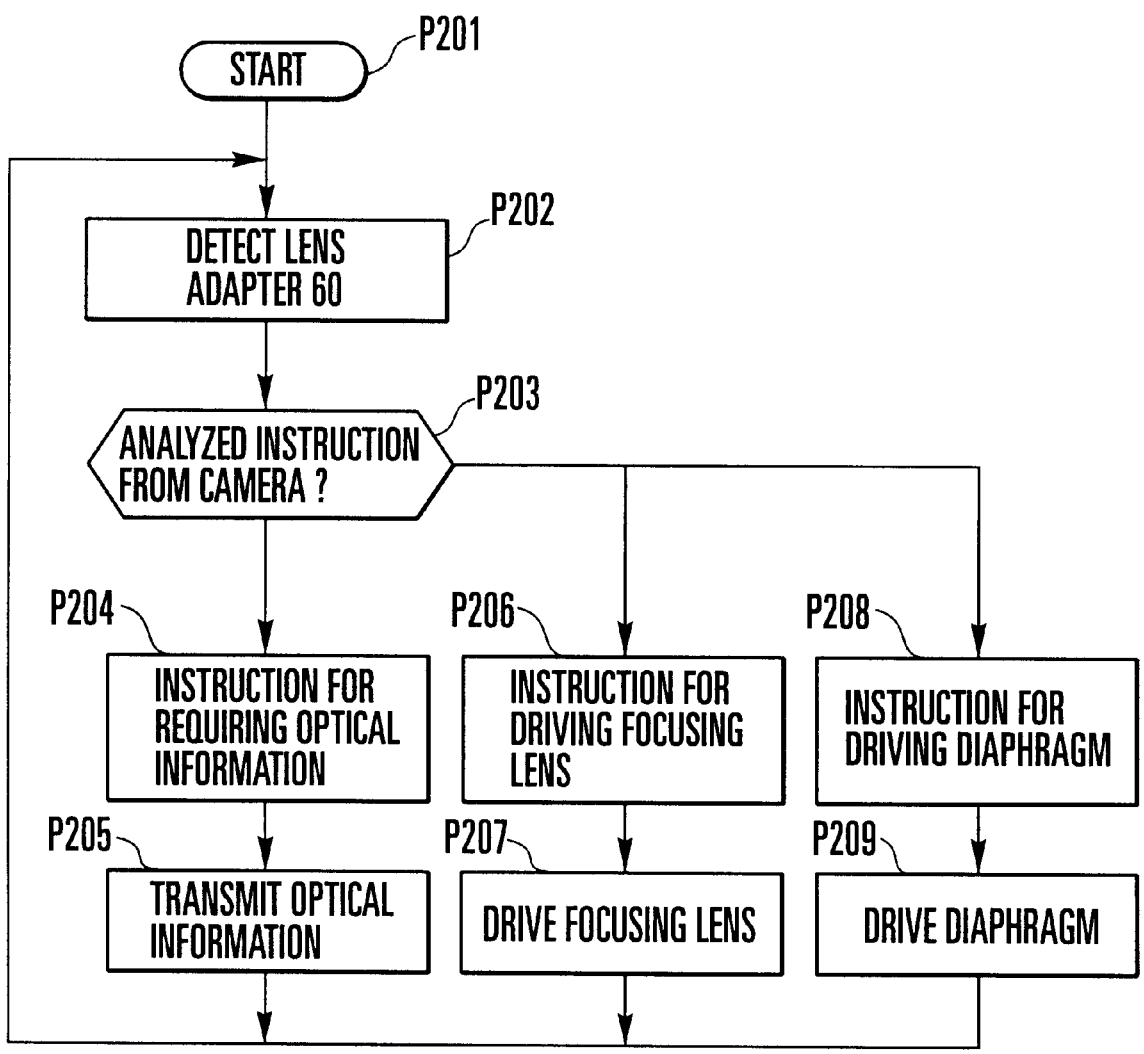
FIG. 25 is a flow chart showing the operation on the lens side in the fifth embodiment of the invention.
Figure 26:
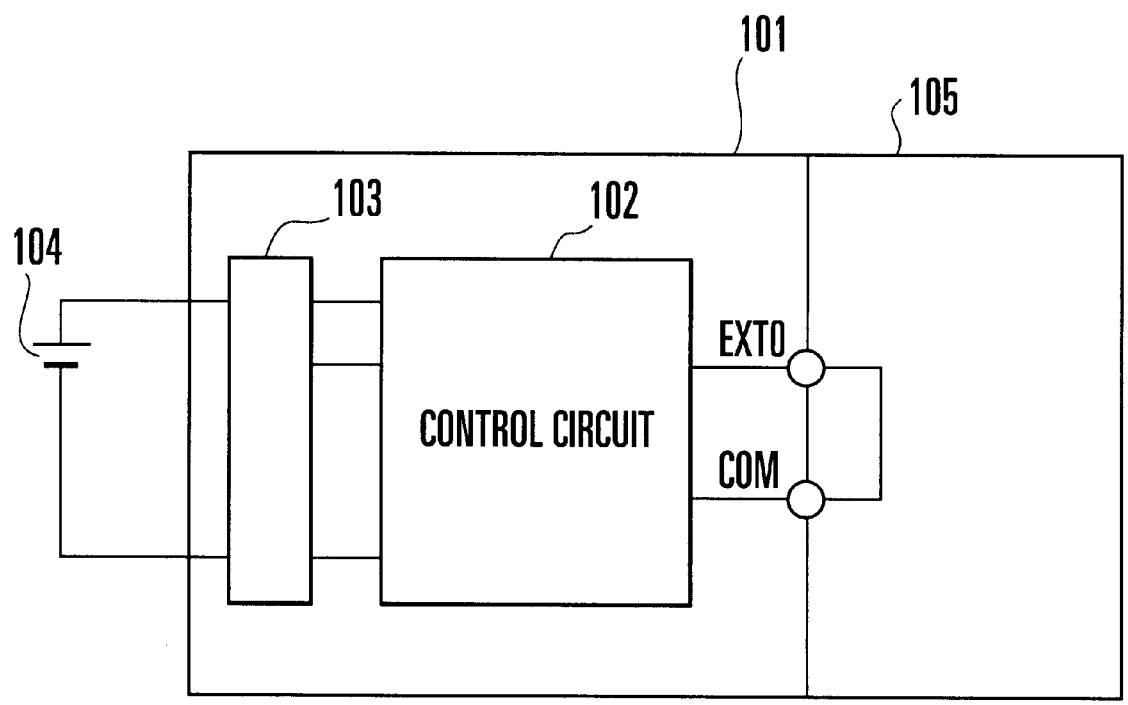
FIG. 26 is a block diagram showing the arrangement of a conventional apparatus and an accessory.

Next, the flow chart of FIG. 25 showing the operation of the photo-taking lens 32 is described.

In step P201 of FIG. 25, the operation of the photo-taking lens 32 starts in association with the mounting thereof on the camera body 31, or starts in response to an instruction from the camera body 31 through communication.

In step P202, the kind of lens adapter 60 attached to the photo-taking lens 32 is detected. The method for this detection is the same as that described in the above fourth embodiment, and is, therefore, omitted from the description here.

In the next step P203, an instruction from the camera body 31 is analyzed. For example, if the instruction from the camera body 31 is an instruction for driving the focusing lens 41, the flow proceeds to step P206. If the instruction from the camera body 31 is an instruction for driving the diaphragm 42, the flow proceeds to step P208. If the instruction from the camera body 31 is an instruction for requiring optical information, the flow proceeds to step P204.

In step P204, the instruction for requiring optical information is received. In step P205, in response to the instruction for requiring optical information, optical information corresponding to the lens adapter 60 connected to the photo-taking lens 32 is transmitted to the camera body 31.

In step P206, the instruction for driving the focusing lens 41 is received. In step P207, the focusing lens 41 is driven in accordance with the instruction, from the camera body 31, indicative of the amount of movement and the direction of movement of the focusing lens 41.

In step P208, the instruction for driving the diaphragm 42 is received. In step P209, the diaphragm 42 is driven in accordance with the instruction, from the camera body 31, indicative of the amount of aperture reduction and the direction of aperture change of the diaphragm 42.

According to each of the above-described third to fifth embodiments, since the relation in input and output terminals among the terminals EXT0, EXT1 and COM for detecting the accessory (lens adapter) is changed, it is possible to increase the number of kinds of accessories detectable.

While, in the above-described third to fifth embodiments, two or three terminals are provided for detecting the kind of accessory, the number of terminals may be increased correspondingly with an increase in the number of kinds of accessories, so that it becomes possible to detect the kind of the accessory with case.

(Sixth Embodiment)

Figure 28:
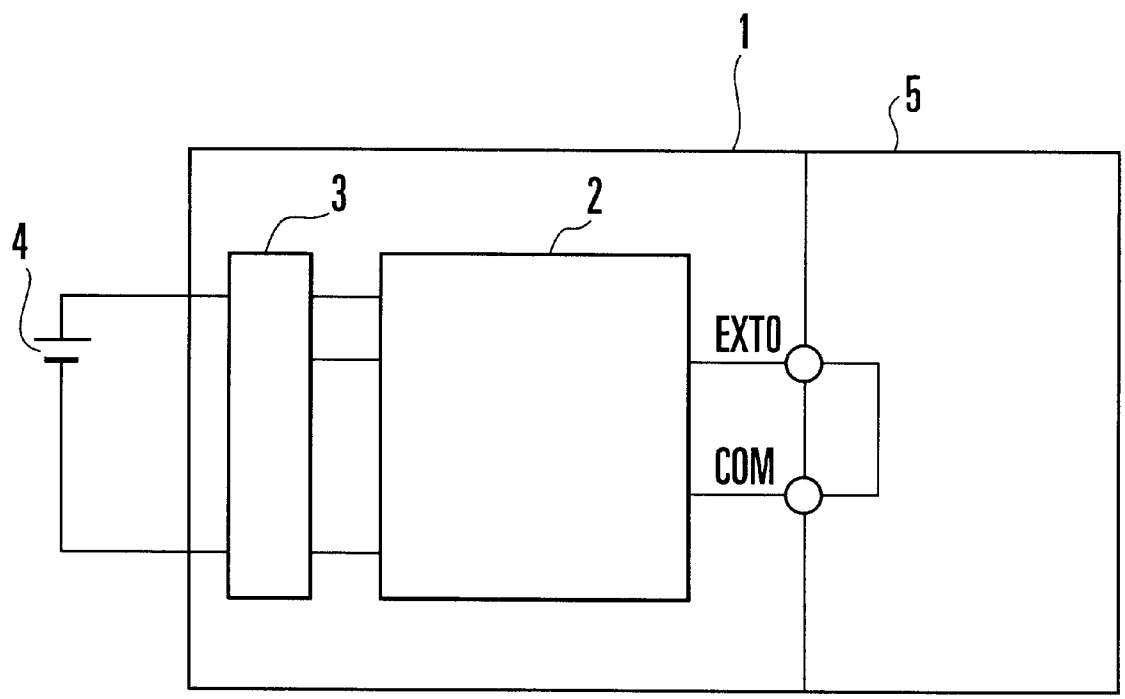
FIG. 28 is a block diagram showing the arrangement of a control apparatus and an accessory in a control apparatus system according to a sixth embodiment of the invention.

FIG. 28 is a diagram showing in outline the arrangement of a control apparatus system according to a sixth embodiment of the invention. The control apparatus system is composed of a combination of a control apparatus having a control circuit such as a microcomputer and an accessory connected to the control apparatus.

In FIG. 28, reference numeral 1 denotes a control apparatus having a control circuit 2, such as a microcomputer, reference numeral 3 denotes a controlled circuit which is to be controlled by the control circuit 2, and reference numeral 4 denotes a battery serving as a power supply. Reference numeral 5 denotes an accessory which is connected to the control apparatus 1. The control circuit 2 and the accessory 5 are connected to each other at two terminals EXT0 and COM.

Figure 29:
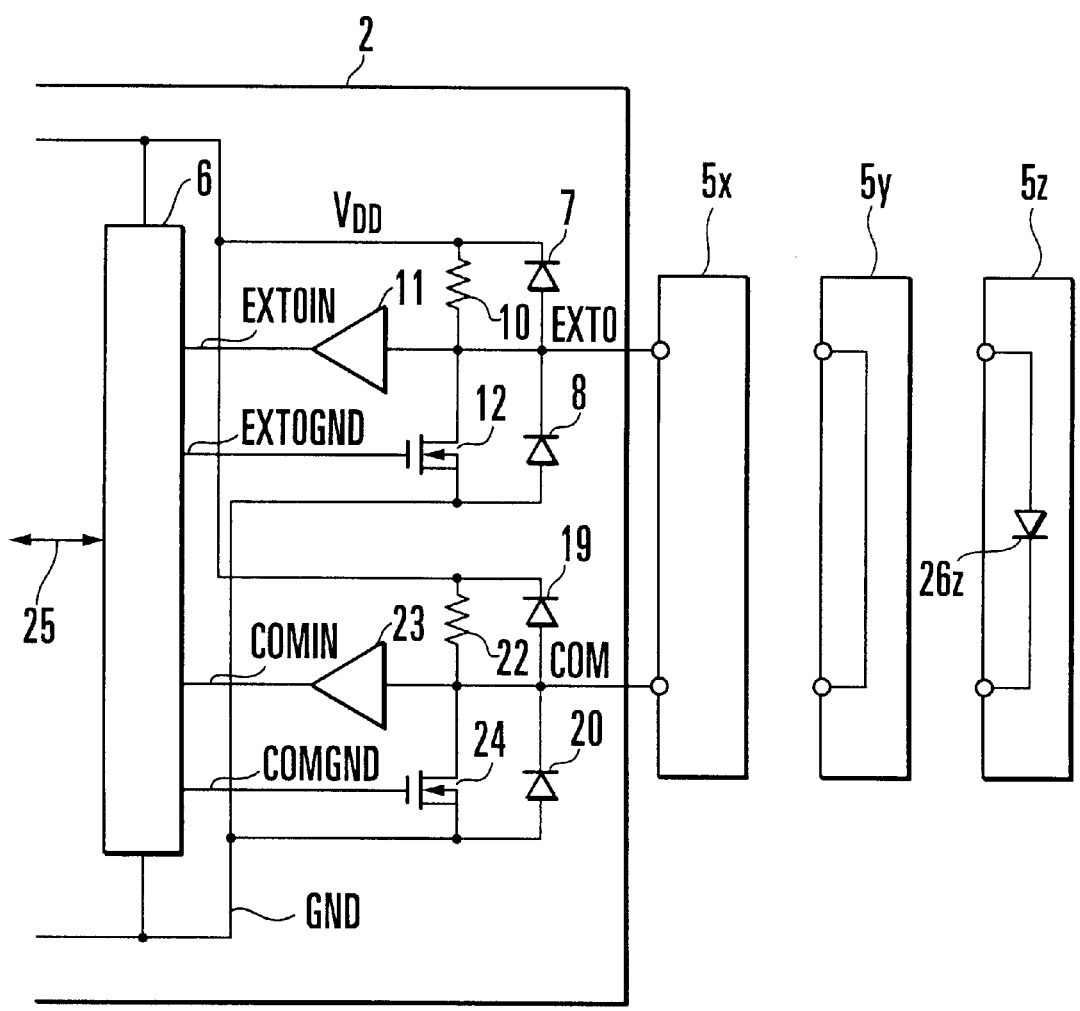
FIG. 29 is a circuit diagram showing the details of the arrangement of an essential portion of the control apparatus shown in FIG. 28 and the arrangement of each of a plurality of kinds of accessories.

FIG. 29 is a circuit diagram showing the details of the control circuit 2. In FIG. 29, reference numeral 6 denotes a control part of the control circuit 2, and reference numerals 7, 8, 19 and 20 denote diodes for protecting the terminals EXT0 and COM. Reference numerals 10 and 22 denote resistors connected to a power supply $V_{DD}$ to pull up the terminals EXT0 and COM, respectively, and reference numerals 11 and 23 denote input circuits.

Reference numerals 12 and 24 denote N-channel FETs (field-effect transistors) arranged to connect the terminals EXT0 and COM to the ground GND, respectively. Reference numeral 25 denotes a connection line for connecting the control part 6 to another circuit.

Reference numerals 5x, 5y and 5z denote three different kinds of the accessory 5, which are connectable to the apparatus 1.

Figure 27:
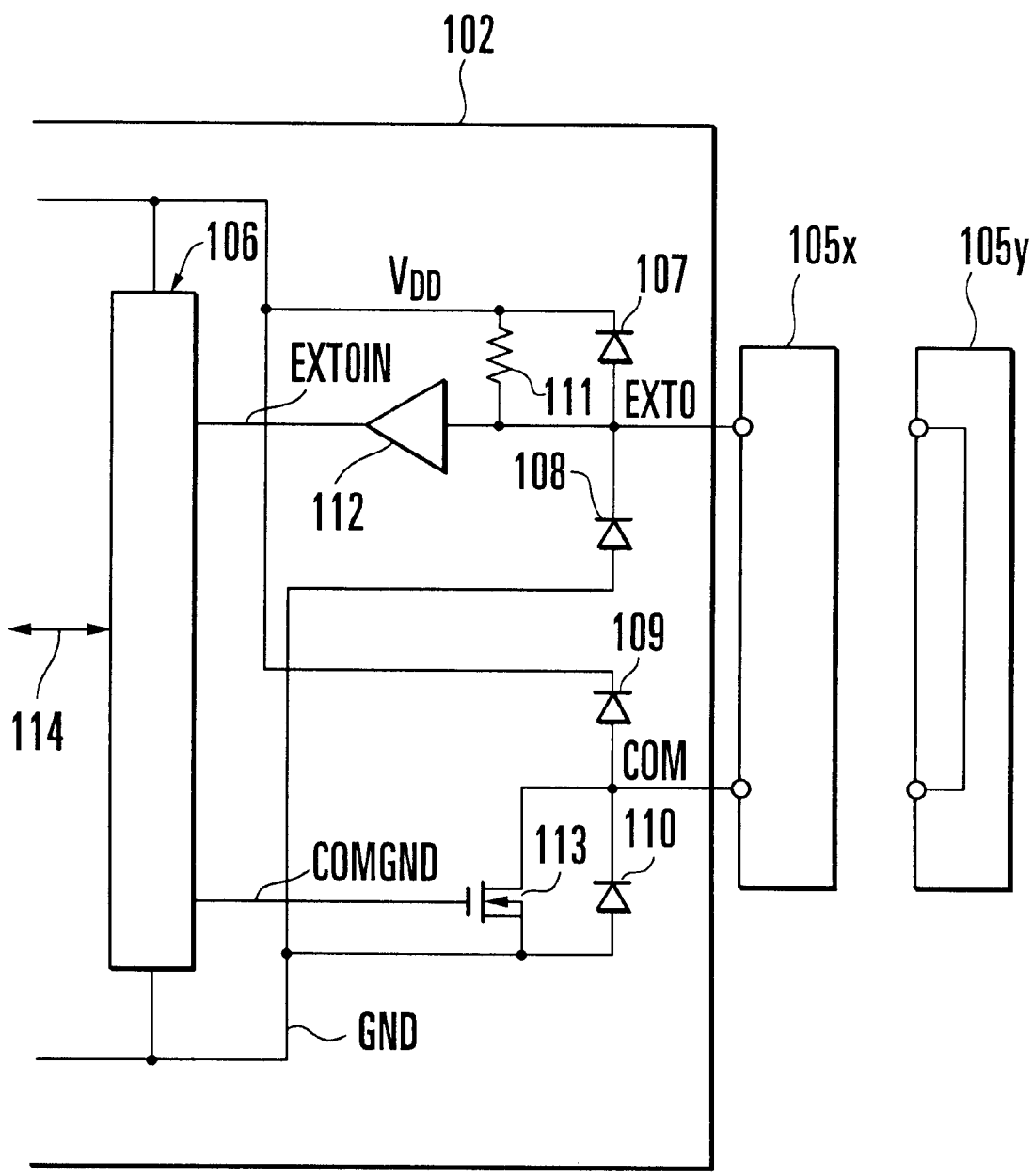
FIG. 27 is a circuit diagram showing the details of the arrangement of an essential portion of the apparatus shown in FIG. 26 and the arrangement of each of a plurality of kinds of accessories.

Here, the accessories 5x and 5y are assumed to be the same as the accessories 105x and 105y shown in FIG. 27. On the other hand, the accessory 5z has an arrangement such that a diode 26z which allows a current to flow only in one direction is connected between two terminals of the accessory 5z.

With the control apparatus system arranged as described above, when the accessory 5x is connected to the control apparatus 1, as two terminals of the accessory 5x corresponding to the terminals EXT0 and COM are in no short-circuited state, if the terminal EXT0 is used as an input terminal and the terminal COM is used as an output terminal, the logic of (EXT0, COM) becomes (1, 0), and, next, if the terminal EXT0 is used as an output terminal and the terminal COM is used as an input terminal, the logic of (EXT0, COM) becomes (0, 1).

When the accessory 5y is connected to the control apparatus 1, as two terminals of the accessory 5y corresponding to the terminals EXT0 and COM are in a short-circuited state, if the terminal EXT0 is used as an input terminal and the terminal COM is used as an output terminal, the logic of (EXT0, COM) becomes (0, 0), and, next, if the terminal EXT0 is used as an output terminal and the terminal COM is used as an input terminal, the logic of (EXT0, COM) becomes also (0, 0).

Further, when the accessory 5z in which the diode 26z allowing a current to flow only in one direction is connected between two terminals thereof is connected to the control apparatus 1, if the terminal EXT0 is used as an input terminal and the terminal COM is used as an output terminal, the logic of (EXT0, COM) becomes (0, 0), and, next, if the terminal EXT0 is used as an output terminal and the terminal COM is used as an input terminal, the logic of (EXT0, COM) becomes (1, 0).

As is apparent from the above description, by changing the relation in input and output terminals between the terminal EXT0 and the terminal COM and examining the results of detection of the logic of the terminal EXT0 and the terminal COM, it is possible to discriminate which accessory has been connected to the control apparatus 1. However, there is a possibility that the control apparatus 1 may make erroneous detection as to which of the accessory 5y and the accessory 5z has been connected to the control apparatus 1.

In order to prevent such erroneous detection, according to the sixth embodiment, the characteristic of apparatus control in the control apparatus 1 in a case where the accessory 5y has been connected and the characteristic of apparatus control in the control apparatus 1 in a case where the accessory 5z has been connected are arranged to approximately coincide with each other.

Figure 30:
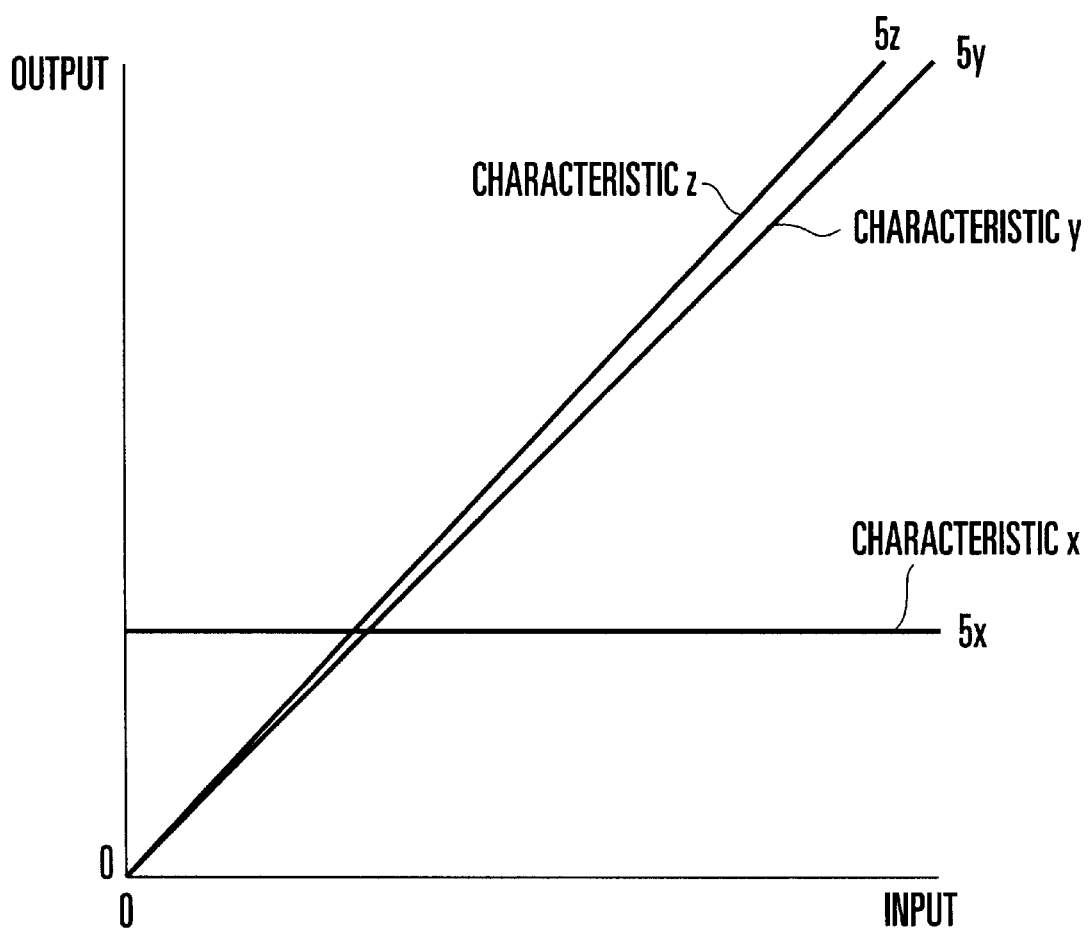
FIG. 30 is a diagram showing the control characteristics of the control apparatus obtained when each of the accessories shown in FIG. 29 is mounted thereon.

FIG. 30 shows control characteristics (input-output characteristics) in the control apparatus 1 in cases where the above three accessories 5x to 5z each are connected to the control apparatus 1. In FIG. 30, in a case where the accessory 5x has been connected, the input-output characteristic (characteristic of output operation relative to input operation) of the control apparatus 1 becomes a characteristic x. Similarly, in a case where the accessory 5y or the accessory 5z has been connected, the input-output characteristic (characteristic of output operation relative to input operation) of the control apparatus 1 becomes a characteristic y or a characteristic z.

Then, as will be apparent from FIG. 30, the input-output characteristic of the control apparatus 1 in a case where the accessory 5y has been connected and that in a case where the accessory 5z has been connected approximately coincide with each other. Accordingly, even if the control apparatus 1 erroneously detects that the accessory 5z has been connected in a case where, in fact, the accessory 5y has been connected to the control apparatus 1, or even if the control apparatus 1 erroneously detects that the accessory 5y has been connected in a case where, in fact, the accessory 5y has been connected to the control apparatus 1, no large difference occurs in the input-output characteristic of the control apparatus 1. As a result, almost appropriate apparatus control can be performed on the accessory as connected.

Incidentally, the sixth embodiment can be applied to not only optical apparatuses, such as a camera and a lens device, but also various control apparatuses other than the optical apparatuses.

(Seventh Embodiment)

While, in the case of the sixth embodiment described above, there are three kinds of accessories connectable to the control apparatus, a seventh embodiment of the invention is described below concerning a control apparatus capable of detecting which accessory has been connected to the control apparatus in a case where the number of kinds of accessories connectable as a system is increased (for example, in a case where there are nine kinds of accessories).

Figure 31:
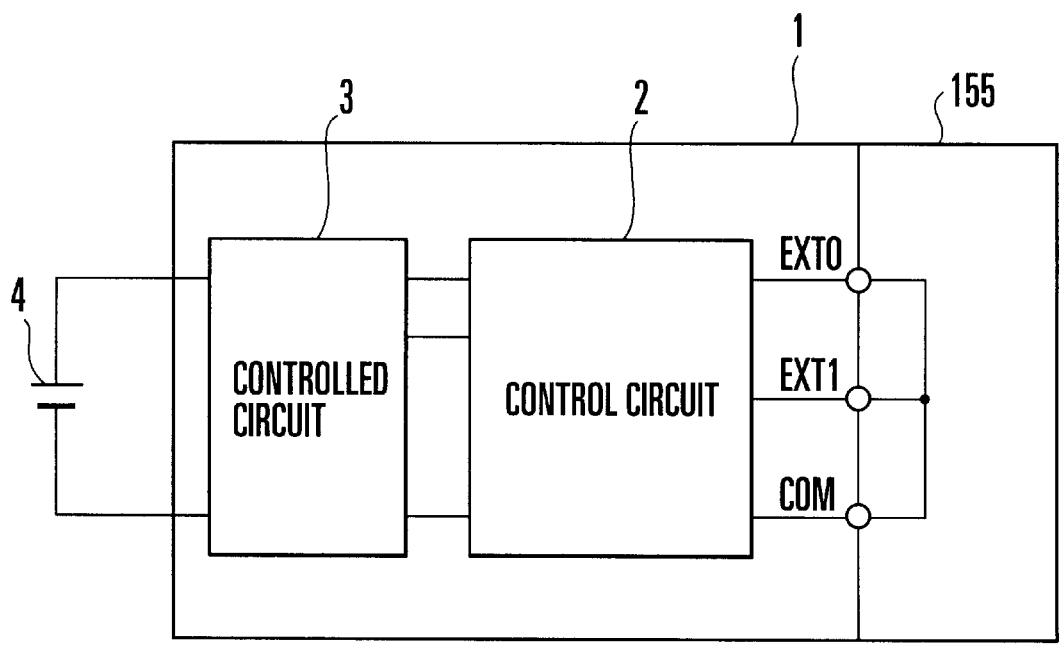
FIG. 31 is a block diagram showing the arrangement of a control apparatus and an accessory in a control apparatus system according to a seventh embodiment of the invention.

FIG. 31 is a diagram showing in outline the arrangement of a control apparatus system according to the seventh embodiment of the invention. In FIG. 31, constituent components common to those in the sixth embodiment are denoted by the same reference numerals as in the sixth embodiment, and the description thereof is omitted here.

In FIG. 31, reference numeral 155 denotes an accessory to be connected to the control apparatus 1. The accessory 155 is connected to a control circuit 2 at three terminals EXT0, EXT1 and COM.

Figure 32:
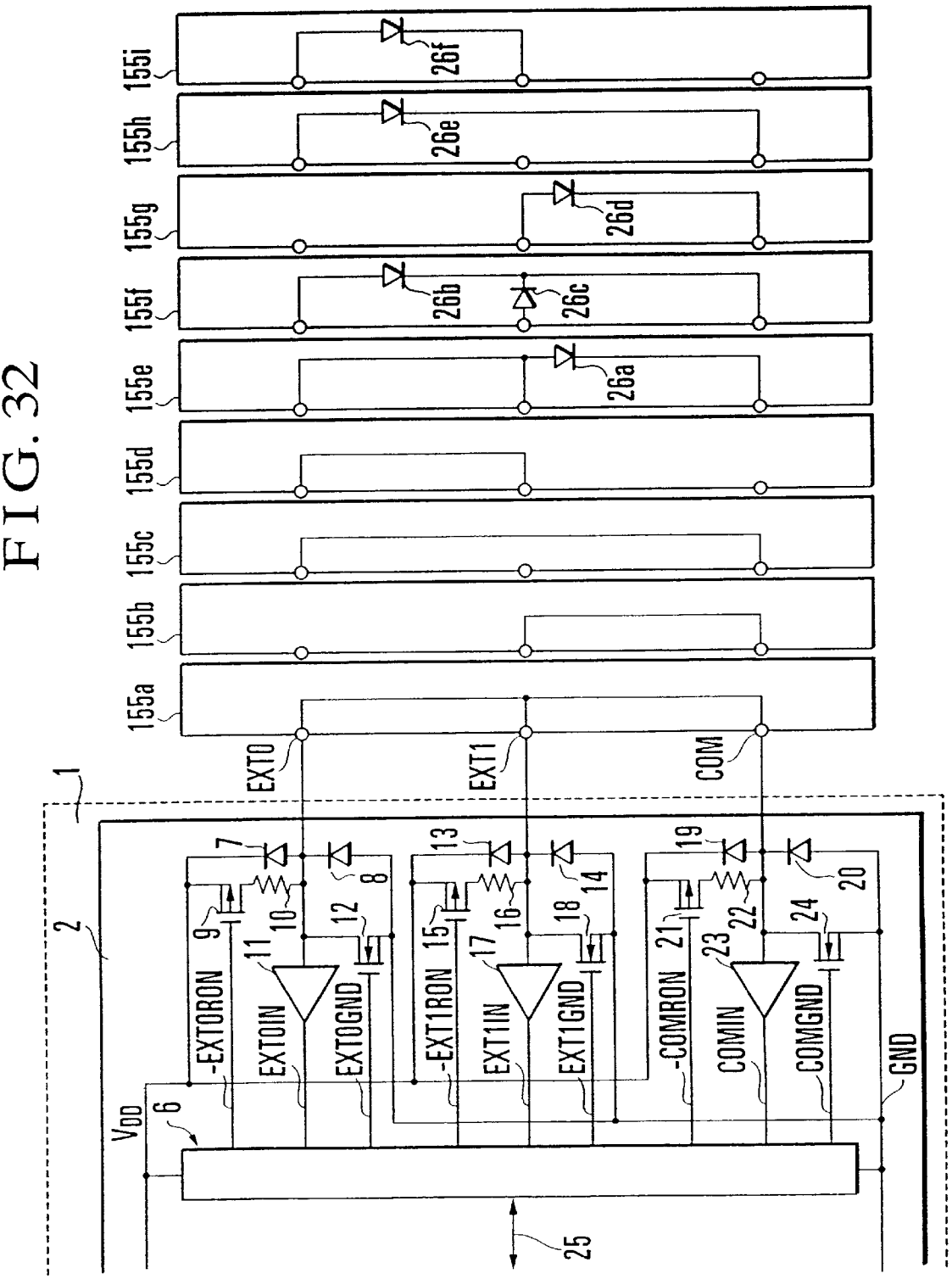
FIG. 32 is a circuit diagram showing the details of the arrangement of an essential portion of the control apparatus shown in FIG. 31 and the arrangement of each of a plurality of kinds of accessories.

FIG. 32 is an electric circuit diagram showing the arrangement of the control circuit 2 and the arrangement of the accessory 155 shown in the block diagram of FIG. 31. Referring to FIG. 32, in the control circuit 2, there are included a control part 6, diodes 7, 8, 13, 14, 19 and 20 for protecting the terminals EXT0, EXT1 and COM, P-channel FETs 9, 15 and 21, pull-up resistors 10, 16 and 22 for pulling up the terminals EXT0, EXT1 and COM by connecting the terminals EXT0, EXT1 and COM to a power supply $V_{DD}$, respectively, input circuits 11, 17 and 23, N-channel FETs 12, 18 and 24 for connecting the terminals EXT0, EXT1 and COM to the ground GND, respectively, and a connection line 25 for connecting the control part 6 to another circuit.

Reference numerals 155a to 155i respectively denote the different kinds of accessories connectable to the control apparatus 1. In each of the accessories 155e to 155i, one or two of diodes 26a to 26f each of which allows a current to flow only in one direction are connected between terminals thereof, as shown in FIG. 32.

FIG. 33 shows a list of the setting states of control pins of the control part 6 and modes to be set thereby.

When the control pin –EXT0RON is set to "0", the FET 9 is turned on, so that the terminal EXT0 is connected to the pull-up resistor 10.

The control pin EXT0IN indicates the state of the terminal EXT0.

When the control pin EXT0GND is set to "1", the terminal EXT0 is set to the ground (logic "0").

Accordingly, "STATE OF EXT0" in FIG. 33 indicates whether the terminal EXT0 is connected to the ground GND (logic "0") so as to be used as an output terminal or whether the terminal EXT0 is connected to the pull-up resistor 10 so as to be used as an input terminal.

The function of each of the control pin –EXTR1ON and the control pin –COMRON is the same as that of the control pin –EXT0RON.

The function of each of the control pin EXT1IN and the control pin COMIN is the same as that of the control pin EXT0IN.

The function of each of the control pin EXT1GND and the control pin COMGND is the same as that of the control pin EXT0GND.

"STATE OF EXT1" in FIG. 33 indicates whether the terminal EXT1 is connected to the ground GND (logic "0") so as to be used as an output terminal or whether the terminal EXT1 is connected to the pull-up resistor 16 so as to be used as an input terminal.

"STATE OF COM" in FIG. 33 indicates whether the terminal COM is connected to the ground GND (logic "0") so as to be used as an output terminal or whether the terminal COM is connected to the pull-up resistor 22 so as to be used as an input terminal.

In the case of a mode 0, each of the terminals EXT0, EXT1 and COM is connected to the ground GND (logic "0") to be used as an output terminal.

In the case of a mode 1, each of the terminals EXT0 and EXT1 is connected to the pull-up resistor to be used as an input terminal, while the terminal COM is connected to the ground GND to be used as an output terminal.

In the case of a mode 2, the terminal EXT1 is connected to the pull-up resistor to be used as an input terminal, while each of the terminals EXT0 and COM is connected to the ground GND to be used as an output terminal.

In the case of a mode 3, each of the terminals EXT1 and COM is connected to the pull-up resistor to be used as an input terminal, while the terminal EXT0 is connected to the ground GND to be used as an output terminal.

In the case of a mode 4, each of the terminals EXT0 and COM is connected to the pull-up resistor to be used as an input terminal, while the terminal EXT1 is connected to the ground GND to be used as an output terminal.

FIG. 34 shows the logic of each of the terminals EXT0, EXT1 and COM in the cases of "no accessory" (hereinafter referred to as accessory 155o), "accessory 155a", "accessory 155b", "accessory 155c", "accessory 155d", "accessory 155e", "accessory 155f", "accessory 155g", "accessory 155h" and "accessory 155i", in each of the modes 1, 2, 3 and 4.

In the mode 1, the logic of (EXT0, EXT1) becomes (0, 0) in each of the cases of "accessory 155a", "accessory 155e" and "accessory 155f", the logic of (EXT0, EXT1) becomes (0, 1) in each of the cases of "accessory 155c" and "accessory 155h", the logic of (EXT0, EXT1) becomes (1, 0) in each of the cases of "accessory 155b" and "accessory 155g", and the logic of (EXT0, EXT1) becomes (1, 1) in each of the cases of "accessory 155o", "accessory 155d" and "accessory 155i".

In the mode 2, the logic of (EXT1) becomes (0) in each of the cases of "accessory 155a", "accessory 155b", "accessory 155d", "accessory 155e", "accessory 155f" and "accessory 155g", and the logic of (EXT1) becomes (1) in each of the cases of "accessory 155o", "accessory 155c", "accessory 155h" and "accessory 155i".

In the mode 3, the logic of (EXT1, COM) becomes (0, 0) in the case of "accessory 155a", the logic of (EXT1, COM) becomes (0, 1) in each of the cases of "accessory 155d" and "accessory 155e", the logic of (EXT1, COM) becomes (1, 0) in the case of "accessory 155c", and the logic of (EXT1, COM) becomes (1, 1) in each of the cases of "accessory 155o", "accessory 155b", "accessory 155f", "accessory 155g", "accessory 155h" and "accessory 155i".

In the mode 4, the logic of (EXT0, COM) becomes (0, 0) in the case of "accessory 155a", the logic of (EXT0, COM) becomes (0, 1) in each of the cases of "accessory 155d", "accessory 155e" and "accessory 155i", the logic of (EXT0, COM) becomes (1, 0) in the case of "accessory 155b", and the logic of (EXT0, COM) becomes (1, 1) in each of the cases of "accessory 155o", "accessory 155c", "accessory 155f", "accessory 155g" and "accessory 155h".

Accordingly, in accordance with a combination of detection results obtained in the respective modes, it is possible to detect which accessory among the nine kinds of accessories has been connected to the control apparatus 1.

Here, referring to FIG. 34, an explanation is made about a case where the accessory 155e has been connected to the control apparatus 1 in the mode 1 (with the terminal COM connected to the ground GND and the terminals EXT0 and EXT1 connected to the pull-up resistors).

An input voltage Vin of the input circuits 11 and 17 is decided by a turning-on voltage VLon of the FET 24 and a forward voltage VF of the diode 26a in a value of current i obtained by adding a current caused by a composite resistance of the resistance (Rpfet9) of the FET 9 and the resistance (R10) of the pull-up resistor 10 and a current caused by a composite resistance of the resistance (Rpfet15) of the FET 15 and the resistance (R16) of the pull-up resistor 16.

Input voltage $Vin = VLon + VF$

{Condition: $i(V_{DD} - VLon - VF) \times (Rpfet9 + R10 + Rpfet15 + R16) / ((Rpfet9 + R10) \times (Rpfet15 + R16))$}

In this instance, taking into consideration the voltage drop caused by the wiring resistance, the voltage fluctuation caused by noise or the like, it is necessary to make a maximum input low-level voltage (when the voltage of an input signal is lower than the maximum input low-level voltage, the logic of the input signal is determined to be "0") VIL of the input circuits 11 and 17 higher than the above-mentioned voltage Vin.

Figure 35:
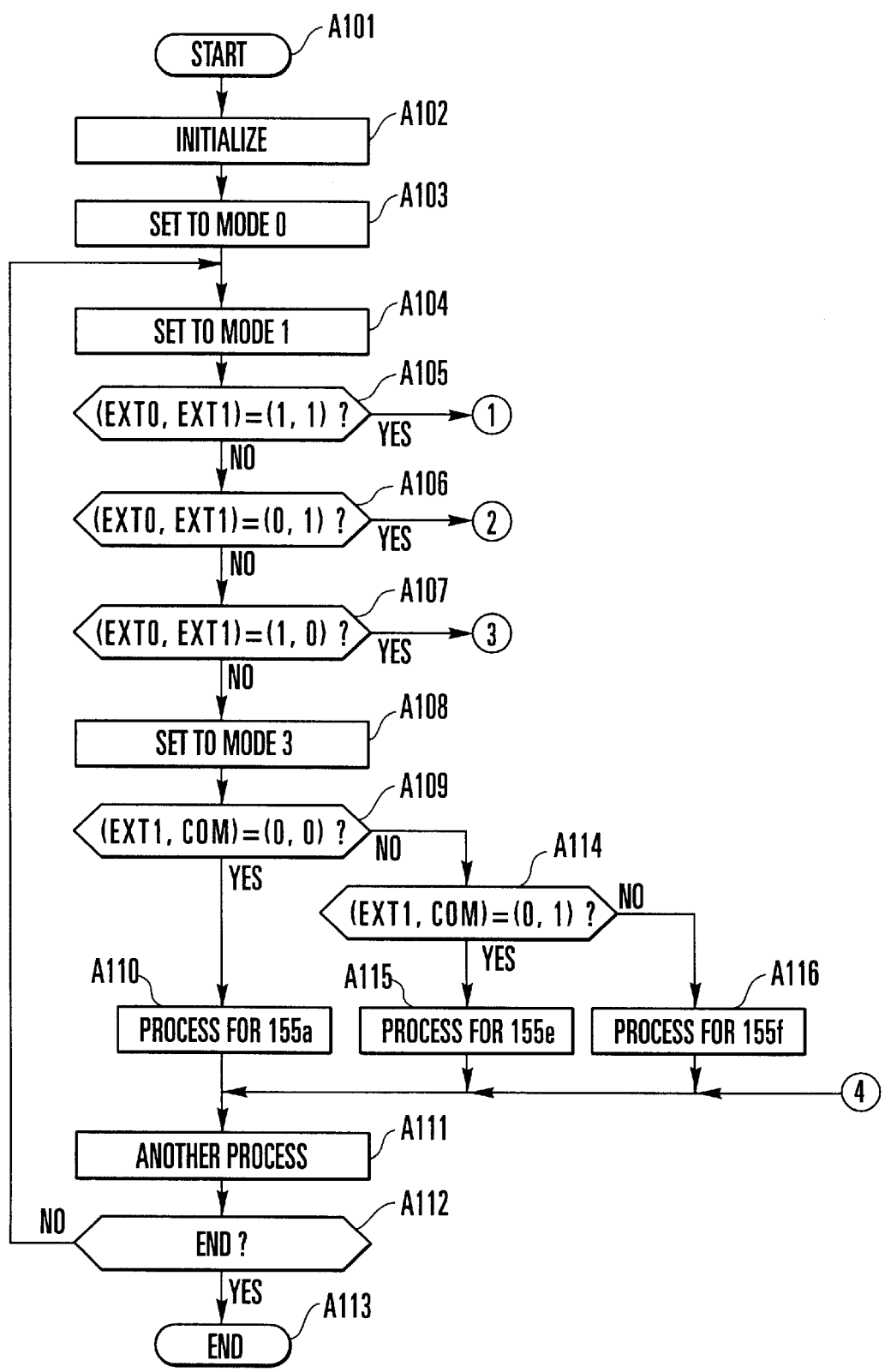
FIG. 35 is a flow chart showing the operation to be performed by the control apparatus shown in FIG. 31.
Figure 36:
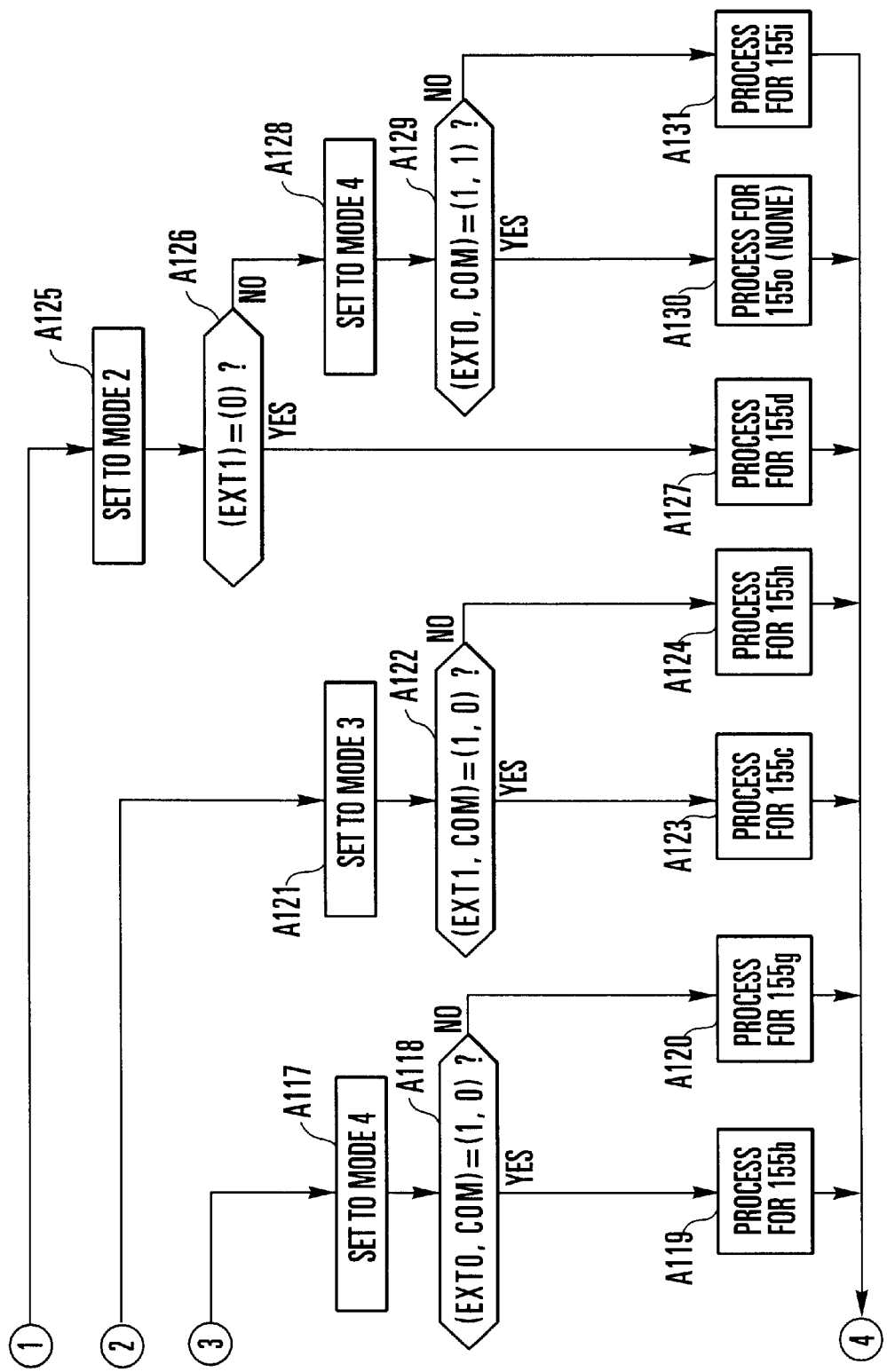
FIG. 36 is a flow chart showing the operation to be performed by the control apparatus shown in FIG. 31.

FIGS. 35 and 36 are flow charts showing the operation of the control circuit 2 in the seventh embodiment.

In step A101, the operation is started.

In step A102, an initializing operation upon turning-on of the power supply is performed.

In step A103, the terminals EXT0, EXT1 and COM are set to the mode 0, as a part related to the seventh embodiment of the initializing operation upon turning-on of the power supply.

In step S104, next, the terminals EXT0, EXT1 and COM are set to the mode 1.

In step A105, a check is made to find if the logic of the terminals EXT0 and EXT1 is (1, 1). If so, as it is determined that there is no accessory (155o) or one of the accessories 155d and 155i is connected, the flow proceeds to step A125 of FIG. 36. If not, as it is determined that one of the accessories 155a, 155b, 155 c, 155e, 155f, 155g and 155h is connected, the flow proceeds to step A106.

In step A106, a check is made to find if the logic of the terminals EXT0 and EXT1 is (0, 1). If so, as it is determined that one of the accessories 155c and 155h is connected, the flow proceeds to step A121 of FIG. 36. If not, as it is determined that one of the accessories 155a, 155b, 155e, 155f and 155g is connected, the flow proceeds to step A107.

In step A107, a check is made to find if the logic of the terminals EXT0 and EXT1 is (1, 0). If so, as it is determined that one of the accessories 155b and 155g is connected, the flow proceeds to step A117 of FIG. 36. If not, as it is determined that one of the accessories 155a, 155e and 155f is connected, the flow proceeds to step A108.

In step A108, the terminals EXT0, EXT1 and COM are set to the mode 3.

In the next step A109, a check is made to find if the logic of the terminals EXT0 and COM is (0, 0). If not, as it is determined that one of the accessories 155e and 155f is connected, the flow proceeds to step A114. If so, as it is determined that the accessory 155a is connected, the flow proceeds to step A110.

In step A110, a process corresponding to the accessory 155a is performed.

In the next step A111, a process unrelated to any accessory is performed.

In step A112, a check is made to find if the flow is to be ended, on the basis of communication from the outside, or the like. If so, the flow proceeds to step A113 to be brought to an end. If not, the flow returns to step A104.

In a case where the flow has proceeded to step A114 upon determining that one of the accessories 155e and 155f is connected, as the logic of the terminals EXT1 and COM is not (0, 0) in the above step A109, a check is made in the step A114 to find if the logic of the terminals EXT1 and COM is (0, 1). If so, as it is determined that the accessory 155e is connected, the flow proceeds to step A115. In step A115, a process corresponding to the accessory 155e is performed. If not, as it is determined that the accessory 155f is connected, the flow proceeds to step A116. In step A116, a process corresponding to the accessory 155f is performed.

Further, in a case where the flow has proceeded to step A117 of FIG. 36 upon determining that one of the accessories 155b and 155g is connected, as the logic of the terminals EXT0 and EXT1 is (1, 0) in the above step A107, the terminals EXT0, EXT1 and COM are set to the mode 4 in the step A117.

In the next step A118, a check is made to find if the logic of the terminals EXT0 and COM is (1, 0). If so, as it is determined that the accessory 155b is connected, the flow proceeds to step A119. In step A119, a process corresponding to the accessory 155b is performed. If not, as it is determined that the accessory 155g is connected, the flow proceeds to step A120. In step A120, a process corresponding to the accessory 155g is performed.

Further, in a case where the flow has proceeded to step A121 of FIG. 36 upon determining that one of the accessories 155c and 155h is connected, as the logic of the terminals EXT0 and EXT1 is (0, 1) in the above step A106, the terminals EXT0, EXT1 and COM are set to the mode 3 in the step A121.

In the next step A122, a check is made to find if the logic of the terminals EXT0 and COM is (1, 0). If so, as it is determined that the accessory 155c is connected, the flow proceeds to step A123. In step A123, a process corresponding to the accessory 155c is performed. If not, as it is determined that the accessory 155 h is connected, the flow proceeds to step A124. In step A124, a process corresponding to the accessory 155 h is performed.

Further, in a case where the flow has proceeded to step A125 of FIG. 36 upon determining that there is no accessory (155o) or one of the accessories 155d and 155i is connected, as the logic of the terminals EXT0 and EXT1 is (1, 1) in the above step A105, the terminals EXT0, EXT1 and COM are set to the mode 2 in the step A125.

In the next step A126, a check is made to find if the logic of the terminal EXT1 is (0). If so, as it is determined that the accessory 155d is connected, the flow proceeds to step A127. In step A127, a process corresponding to the accessory 155d is performed.

If the logic of the terminal EXT1 is not (0) in the above step A126, as it is determined that there is no accessory (155o) or the accessory 155i is connected, the flow proceeds to step A128. In step A128, the terminals EXT0, EXT1 and COM are set to the mode 4.

In the next step A129, a check is made to find if the logic of the terminals EXT0 and COM is (1, 1). If so, as it is determined that there is no accessory (155o), the flow proceeds to step A130. In step A130, a process corresponding to the absence of accessory (155o) is performed. If not, as it is determined that the accessory 155i is connected, the flow proceeds to step A131. In step A131, a process corresponding to the accessory 155i is performed.

After completing the process in each of the steps A115, A115, A119, A120, A123, A124, A127, A130 and A131, the operations in the step A111 and subsequent steps are performed.

Figure 37:
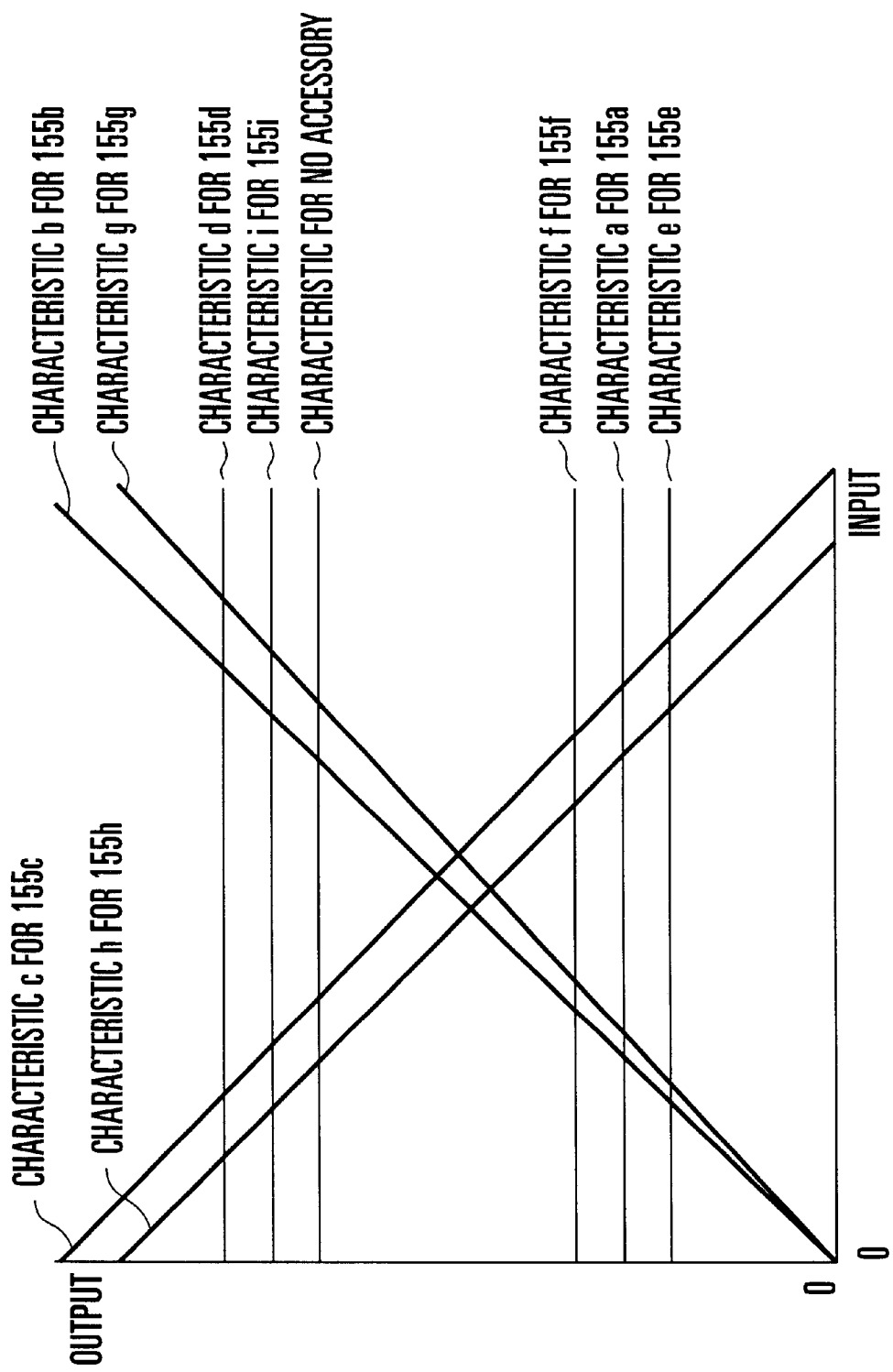
FIG. 37 is a diagram showing the control characteristics of the control apparatus obtained when each of the accessories shown in FIG. 32 is mounted thereon.

FIG. 37 shows schematically the characteristics of control (the input-output characteristics) of the control apparatus 1 in cases where the accessories 155a to 155i each are connected to the control apparatus 1. The input-output characteristic of the control apparatus 1 in a case where the accessory 155a is connected becomes a characteristic a, and the input-output characteristic of the control apparatus 1 in a case where the accessory 155b is connected becomes a characteristic b. Similarly, the input-output characteristics of the control apparatus 1 in cases where the accessories 155c to 155i each are connected become characteristics c to i, respectively.

Here, in a case where the kind of accessory connected is to be detected by the control circuit 2 which operates only in mode 1 shown in FIG. 33, it is impossible to discriminate among the accessories 155a, 155e and 155f, it is impossible to discriminate between the accessories 155b and 155g, and it is impossible to discriminate between the accessories 155c and 155h. Further, it is impossible to discriminate among the absence of any accessory and the accessories 155d and 155i. Therefore, the control apparatus 1 tends to make erroneous detection of the kind of accessory connected, in these respective groups of accessories which can not be discriminated.

According to the seventh embodiment, as shown in FIG. 37, the characteristics a, e and f, i.e., the input-output characteristics of the control apparatus 1 in cases where the accessories 155a, 155e and 155f each are connected, are arranged to approximately coincide with one another. Similarly, the characteristics b and g are arranged to approximately coincide with each other, and the characteristics c and h are arranged to approximately coincide with each other. Further, the characteristic in the case of the absence of the accessory and the characteristics d and i are arranged to approximately coincide with one another.

Accordingly, even if the control apparatus 1 makes erroneous detection of the kind of accessory connected or is unable to detect the kind of accessory connected, no large difference occurs in the input-output characteristic of the control apparatus 1. As a result, almost appropriate apparatus control can be performed on the accessory connected.

Incidentally, the seventh embodiment can be applied to not only optical apparatuses, such as a camera and a lens device, but also various control apparatuses other than the optical apparatuses.

Figures 38A, 38B, 38C, 38D:
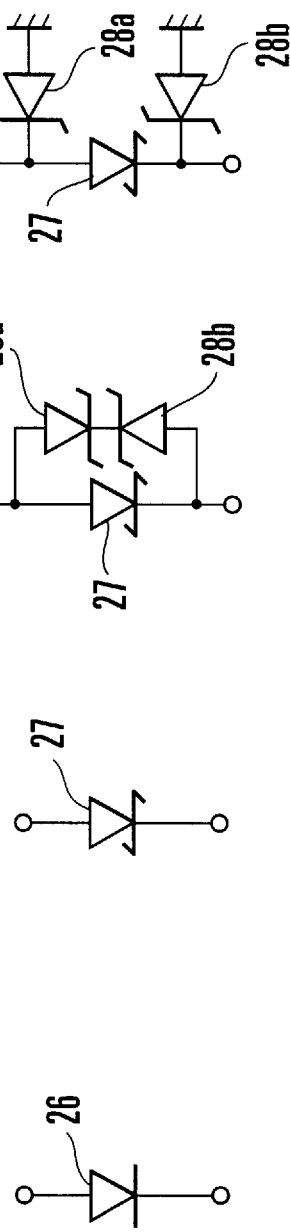
FIGS. 38(a) to 38(d) are diagrams showing examples of replacement of a diode provided in the accessory shown in FIG. 32.
Figures 39A, 39B, 39C, 39D, 39E, 39F, 39G, 39H:
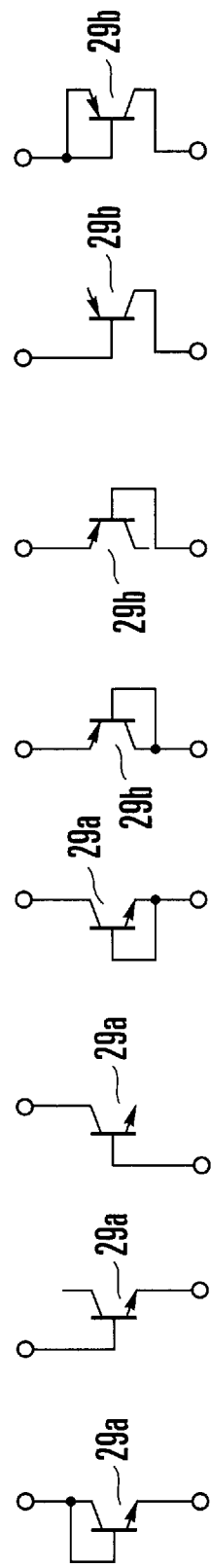
FIGS. 39(a) to 39(h) are diagrams showing other examples of replacement of the diode provided in the accessory shown in FIG. 32.

FIGS. 38(a) to 38(d) are diagrams showing examples of replacement of the diode 26 (26a to 26f) shown in FIG. 32. FIG. 38(a) shows the diode (silicon diode or germanium diode) 26 shown in FIG. 32, FIG. 38(b) shows the connection state in which the diode 26 is replaced by a Schottky diode 27 having a smaller forward voltage VF than that of the silicon diode 26, and FIGS. 38(c) and 38(d) respectively show the connection states in which the diode 26 is replaced by a Schottky diode 27 and Zener diodes 28a and 28b.

Further, FIGS. 39(a) to 39(h) are diagrams showing examples in which the diode 26 shown in FIG. 32 is replaced by a bipolar transistor. FIGS. 39(a) to 39(d) respectively show the connection states in which the diode 26 is replaced by an NPN transistor 29a, and FIGS. 39(e) to 39(h) respectively show the connection states in which the diode 26 is replaced by a PNP transistor 29b.

(Eighth Embodiment)

FIGS. 40 to 43 show a camera system according to an eighth embodiment of the invention. The camera system is composed of a camera body and a photo-taking lens which are able to communicate with each other and a lens adapter connected between the camera body and the photo-taking lens.

In FIG. 40, reference numeral 31 denotes a camera body, reference numeral 32 denotes a photo-taking lens, and reference numeral 60 denotes a lens adapter such as an extender or an intermediate tube.

There is an electric circuit part 33 within the camera body 31. The electric circuit part 33 includes a light measuring part 34 for measuring the amount of light having passed through the photo-taking lens 32, a distance measuring part 35 for measuring the distance from a surface of film to an object to be photographed, a shutter control part 36 for exposing the film for an appropriate period of time, a transport control part 37 for winding or rewinding the film, a camera CPU 38 for controlling the various parts of the camera body 31, and a communication means 39 for performing serial communication with the photo-taking lens 32.

Further, in the photo-taking lens 32, there are disposed a focusing lens 41, a diaphragm 42 and an electric circuit part 44. The electric circuit part 44 of the photo-taking lens 32 includes a communication means 46 for performing serial communication with the camera body 31, a lens CPU 47 for controlling the various parts of the photo-taking lens 32, a lens driving control part 48 for controlling the driving of the focusing lens 41, a lens driving motor 49 for driving the focusing lens 41, a diaphragm control part 50 for controlling the driving of the diaphragm 42, and a diaphragm driving motor 51 for driving the diaphragm 42.

Reference numeral 52 denotes a control system power supply for supplying, in accordance with the output of the camera CPU 38, electric power to circuits of the control system, such as the light measuring part 34, the distance measuring part 35, the camera CPU 38 and the lens CPU 47, the amount of consumption of electric power of which is relatively small and which require stable output voltages. Reference numeral 53 denotes a control system power supply detecting part for detecting the voltage and electric power of the control system power supply 52.

Reference numeral 54 denotes a driving system power supply for supplying, in accordance with the output of the camera CPU 38, electric power to circuits of the driving system, such as the shutter control part 36, the transport control part 37, the lens driving control part 48 and the diaphragm control part 50, the amount of consumption of electric power of which is relatively large. Reference numeral 55 denotes a driving system power supply detecting part for detecting the voltage and electric power of the driving system power supply 54.

Reference numeral 56 denotes a switch (SW1) for starting the operation of the light measuring part 34, and reference numeral 57 denotes a switch (SW2) for starting the operation of the distance measuring part 35 and the shutter opening/closing operation of the shutter control part 36.

Reference numeral 60 denotes, as described above, the lens adapter, such as an extender or an intermediate tube, reference numeral 61 denotes a lens-adapter detecting terminal (EXT0) of the lens CPU 47, reference numeral 62 denotes a lens-adapter detecting terminal (EXT1) of the lens CPU 47, and reference numeral 63 denotes a lens-adapter detecting terminal (COM) of the lens CPU 47.

Figure 41:
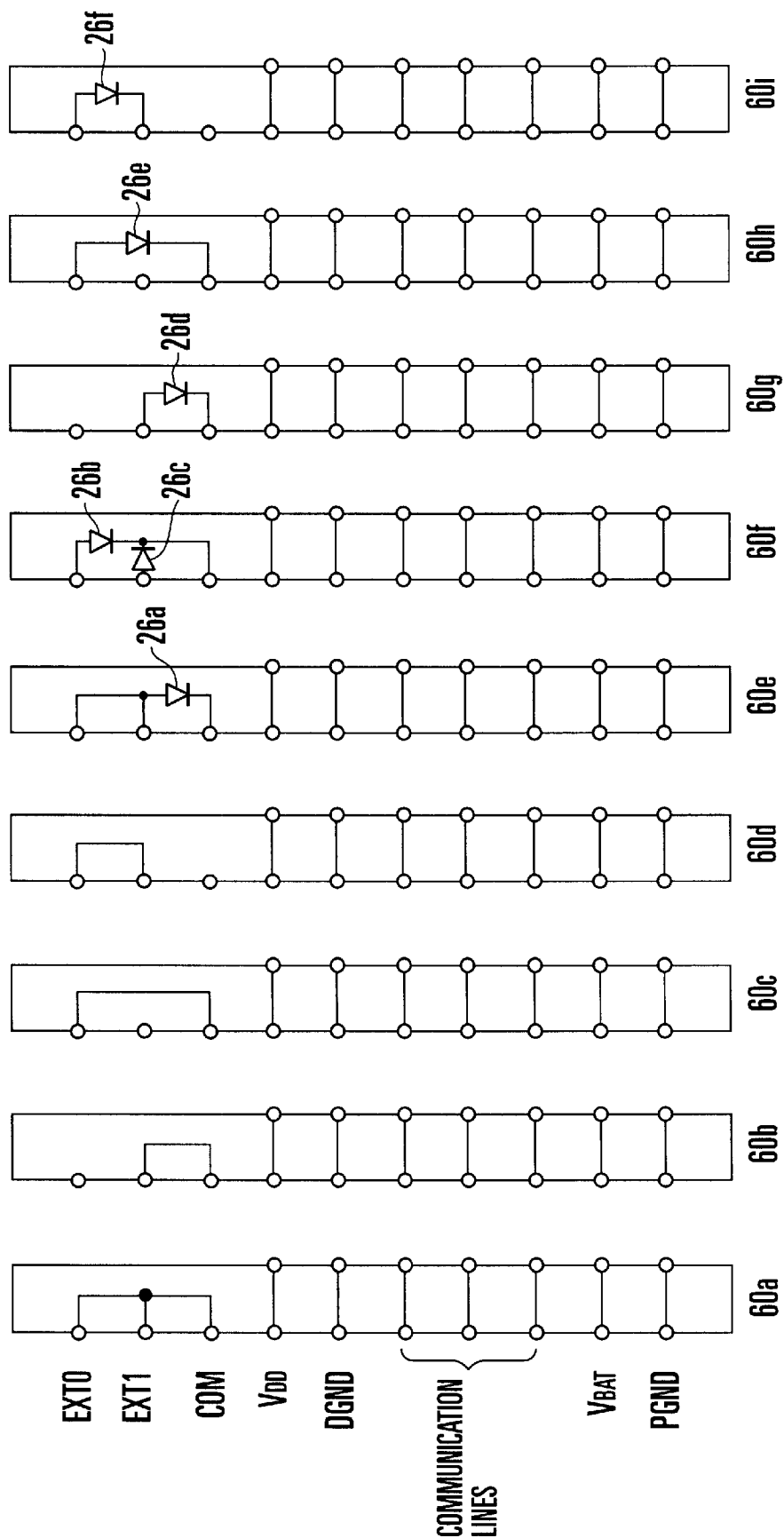
FIG. 41 is a diagram showing the kinds of accessories to be used with the camera system shown in FIG. 40.

FIG. 41 is a diagram showing the kinds of lens adapters 60, in which nine kinds of lens adapters 60a to 60i are illustrated by way of example. The manners of connection of terminals of the lens adapters 60a to 60i for the terminals EXT0, EXT1 and COM are the same as those of the accessories 155a to 155i shown in FIG. 32.

Next, the operations of the various parts of the camera system according to the eighth embodiment will be described with reference to FIGS. 42 and 43.

Figure 42:
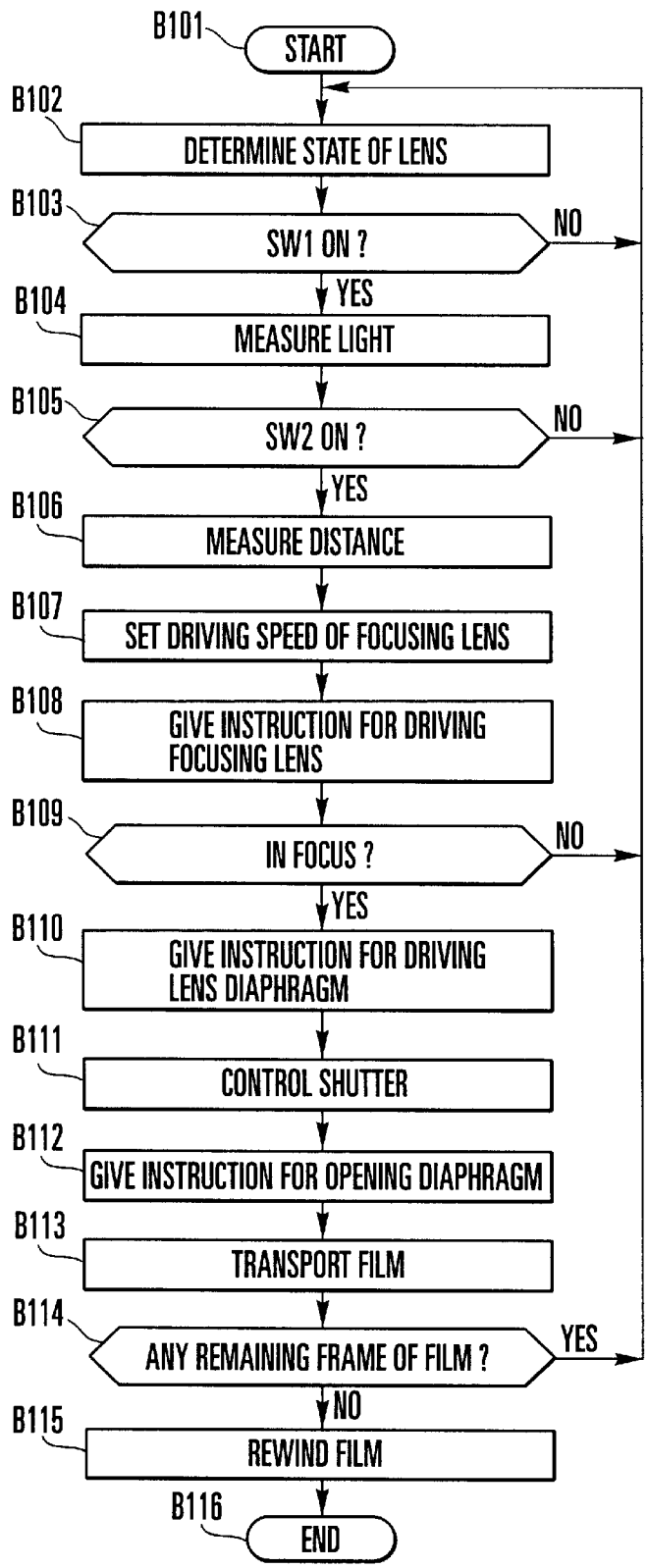
FIG. 42 is a flow chart showing operation on the camera side in the camera system shown in FIG. 40.

FIG. 42 is a flow chart showing the operation of the camera body 31 (mainly, the camera CPU 38). In step B101 of FIG. 42, with a power supply switch (not shown) turned on, the camera body 31 starts its operation.

In step B102, the camera body 31 and the photo-taking lens 32 start eight-bit serial communication through the communication means 39 and the communication means 46. In synchronism with a serial clock signal, which is supplied from the side of the camera body 31, a communication instruction is transmitted from the camera body 31 to the photo-taking lens 32, and data responsive to the communication instruction received at the time of the preceding communication is transmitted from the photo-taking lens 32 to the camera body 31. Here, data to be transmitted from the photo-taking lens 32 is varied according to the presence or absence of the lens adapter 60.

In the next step B103, a check is made to find if the switch SW1 (56) is turned on. If so, the flow proceeds to step B104. In step B104, a shutter speed and an aperture value are decided on the basis of the output of the light measuring part 34 and the F-number of the photo-taking lens 32. It is to be noted that the F-number of the photo-taking lens 32 varies according to the kind of lens adapter 60. As will be described later, the kind of lens adapter connected is detected on the side of the photo-taking lens 32, and the F-number corresponding to the detected kind is communicated, as one piece of optical information, from the photo-taking lens 32 to the camera body 31.

In step B105, a check is made to find if the switch SW2 (57) is turned on. If so, the flow proceeds to step B106. In step B106, the amount of movement of the focusing lens 41 of the photo-taking lens 32 is decided on the basis of the output of the distance measuring part 35 and optical information of the photo-taking lens 32, and is then transmitted to the photo-taking lens 32. It is to be noted that, while the optical information of the photo-taking lens 32 varies according to the kind of lens adapter 60, optical information corresponding to the lens adapter connected is communicated from the photo-taking lens 32 to the camera body 31, as described above.

In the next step B107, the maximum driving speed of the focusing lens 41 is decided on the basis of the output of the distance measuring part 35 and the optical information of the photo-taking lens 32, and is then transmitted to the photo-taking lens 32. In step B108, an instruction is transmitted to the photo-taking lens 32 for starting the movement of the focusing lens 41 by the amount of movement of the focusing lens 41 decided in step B106 and within the maximum driving speed of the focusing lens 41 decided in step B107.

In step B109, a check is made to find if the focusing lens 41 of the photo-taking lens 32 mounted on the camera body 31 is in an in-focus position, on the basis of the output of the distance measuring part 35 and the optical information of the photo-taking lens 32. If so, the flow proceeds to step B110. If not, the flow returns to step B102 to perform light measuring and distance measuring operations again.

In step B110, an instruction is transmitted to the photo-taking lens 32 for driving the diaphragm 42 up to the aperture value decided in step B104. In step B111, the shutter is opened and closed by the shutter control part 36 at the shutter speed decided in step B104. In step B112, an instruction is transmitted to the photo-taking lens 32 for driving the diaphragm 42 up to the full-opened state.

In step B113, a film (not shown) is transported for one frame portion thereof by the transport control part 37.

In step B114, a check is made to find if there is any remaining frame of the film (not shown). If not, i.e., if it is impossible for the transport control part 37 to transport the film in step B113, as it is determined that there remains no exposable frame, the flow proceeds to step B115. If there remains any exposable frame, the flow returns to step B102.

In step B115, the film is rewound. Then, the flow is brought to an end in step B116.

Figure 43:
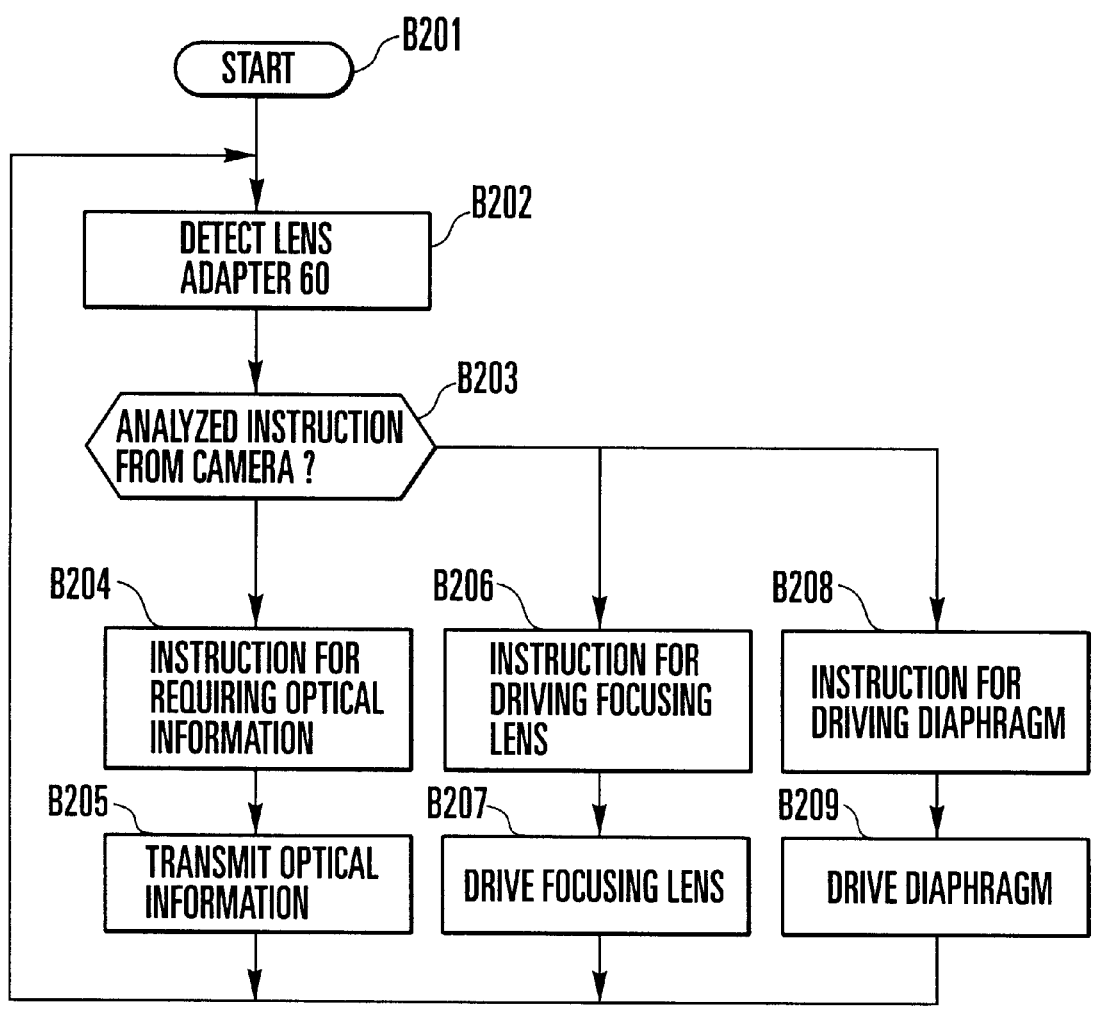
FIG. 43 is a flow chart showing operation on the lens side in the camera system shown in FIG. 40.

Next, the flow chart of FIG. 43 showing the operation of the photo-taking lens 32 (mainly, the lens CPU 47) is described.

In step B201 of FIG. 43, the operation of the photo-taking lens 32 starts in association with the mounting thereof on the camera body 31, or starts in response to an instruction from the camera body 31 through communication.

In step B202, the kind of lens adapter 60 attached to the photo-taking lens 32 is detected. The method for this detection is the same as that described in the above seventh embodiment.

In the next step B203, an instruction from the camera body 31 is analyzed. For example, if the instruction from the camera body 31 is an instruction for driving the focusing lens 41, the flow proceeds to step B206. If the instruction from the camera body 31 is an instruction for driving the diaphragm 42, the flow proceeds to step B208. If the instruction from the camera body 31 is an instruction for requiring optical information, the flow proceeds to step B204.

In step B204, the instruction for requiring optical information is received. In step B205, in response to the instruction for requiring optical information, optical information corresponding to the lens adapter 60 connected to the photo-taking lens 32 is transmitted to the camera body 31.

In step B206, the instruction for driving the focusing lens 41 is received. In step B207, the focusing lens 41 is driven in accordance with the instruction, from the camera body 31, indicative of the amount of movement and the direction of movement of the focusing lens 41.

In step B208, the instruction for driving the diaphragm 42 is received. In step B209, the diaphragm 42 is driven in accordance with the instruction, from the camera body 31, indicative of the amount of aperture reduction and the direction of aperture change of the diaphragm 42.

Here, the lens adapter of the kind 60a is assumed to be a 1.4× extender, the lens adapter of the kind 60b is assumed to be a 2.0× extender, the lens adapter of the kind 60c is assumed to be an intermediate tube, and the lens adapters of the kinds 60d to 60i are assumed to be new-type lens adapters d to i.

Then, if only the detection in the mode 1 shown in FIG. 33 is performed, it is impossible to distinguish the lens adapters 60e and 60f from the lens adapter 60a. Therefore, each of the lens adapters 60e and 60f is made to be a lens adapter having the same magnification as that of the 1.4× extender which is the lens adapter 60a.

Similarly, if only the detection in the mode 1 is performed, it is impossible to distinguish the lens adapter 60g from the lens adapter 60b. Therefore, the lens adapter 60g is made to be a lens adapter having the same magnification as that of the 2.0× extender which is the lens adapter 60b.

Similarly, if only the detection in mode 1 is performed, it is impossible to distinguish the lens adapter 60h from the lens adapter 60c. Therefore, the lens adapter 60h is made to be a lens adapter having a characteristic similar to that of the intermediate tube.

Similarly, in order to cope with the occurrence of any erroneous detection, the lens adapter 60i is made to be a lens adapter having a characteristic similar to that of lens adapter 60d.

As described above, the characteristics or magnifications of the lens adapters which tend to be erroneously detected are made to approximately coincide with each other, so that, even if the lens CPU 47 erroneously detects the kind of the lens adapter, the operation control in the photo-taking lens 32 is effected with no large different manners.

While, in the above-described sixth to eighth embodiments, two or three terminals are provided for detecting the accessory (lens adapter), the number of terminals may be increased so as to further increase the number of kinds of accessories which are to be detected.

Further, while, in the above-described sixth to eighth embodiments, the photo-taking lens detects the kind of the accessory to perform the lens control operation according to the detected kind, the camera body may detect the kind of the accessory to perform a control operation related to photo-taking (including the control of the photo-taking lens) according to the detected kind.

(Ninth Embodiment)

Figure 44:
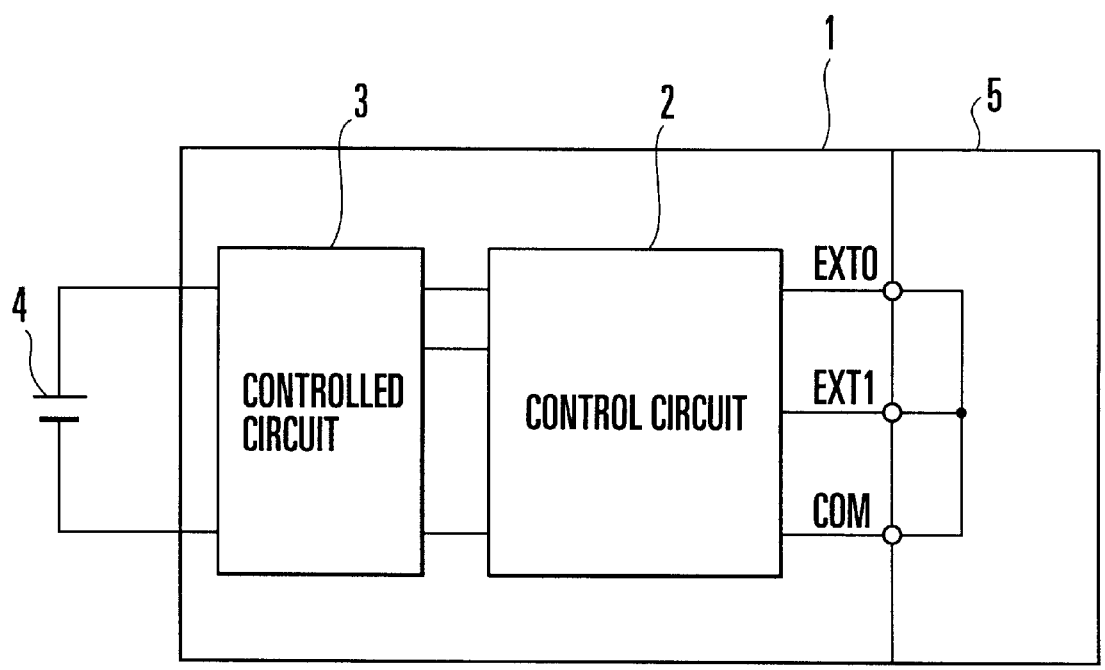
FIG. 44 is a block diagram showing the arrangement of an apparatus and an accessory according to a ninth embodiment of the invention.

FIG. 44 is a diagram showing in outline the arrangement of a system composed of a combination of an apparatus having a control circuit such as a microcomputer and an accessory having no control circuit and connected to the apparatus, according to a ninth embodiment of the invention.

In FIG. 44, reference numeral 1 denotes an apparatus having a control circuit, such as a microcomputer, reference numeral 2 denotes the control circuit, such as a microcomputer, reference numeral 3 denotes a controlled circuit which is to be controlled by the control circuit 2, reference numeral 4 denotes a battery serving as a power supply, and reference numeral 5 denotes an accessory which is connected to the apparatus 1.

The control circuit 2 and the accessory 5 are connected to each other at three terminals EXT0, EXT1 and COM.

Figure 45:
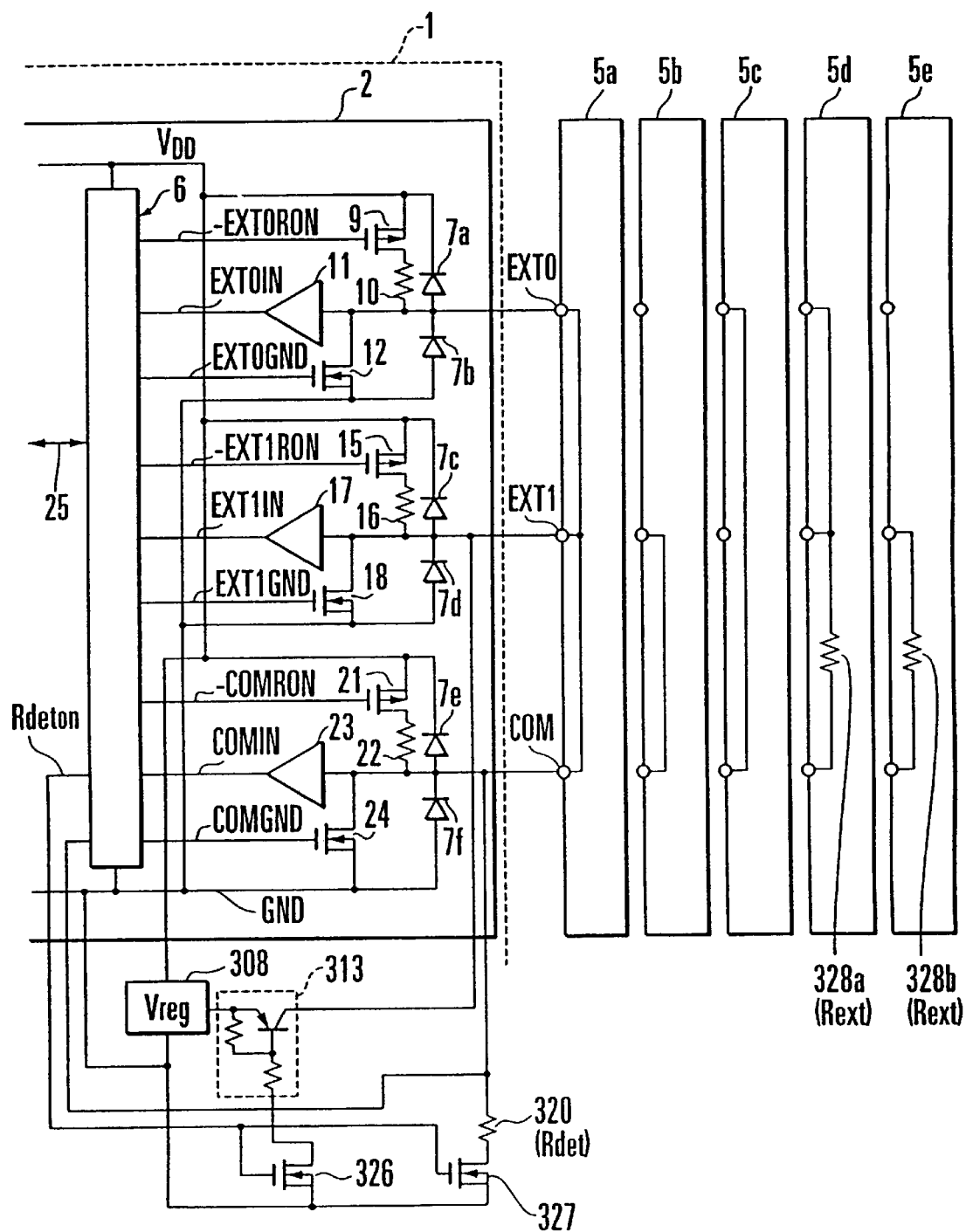
FIG. 45 is a circuit diagram showing the details of the arrangement of an essential portion of the apparatus shown in FIG. 44 and the arrangement of each of a plurality of kinds of accessories.

FIG. 45 is an electric circuit diagram for explaining the condition of connection between the control circuit 2 and the accessory 5 shown in FIG. 44. In FIG. 45, the same parts as those shown in FIG. 44 are denoted by the same reference numerals as in FIG. 44.

Referring to FIG. 45, in the control circuit 2, there are included a control part 6, diodes 7a, 7b, 7c, 7d, 7e and 7f for protecting the terminals EXT0, EXT1 and COM, a constant voltage circuit 308 (having an output voltage Vreg), P-channel FETs 9, 15 and 21 for pulling up the terminals EXT0, EXT1 and COM by connecting the terminals EXT0, EXT1 and COM to a power supply $V_{DD}$ via resistors 10, 16 and 22, respectively, input circuits 11, 17 and 23, N-channel FETs 12, 18 and 24 for connecting the terminals EXT0, EXT1 and COM to the ground GND, respectively, a PNP transistor 313 for switching to send out the output of the constant voltage circuit 308 to the terminal EXT1, a resistor 320 for detecting a current, a connection line 25 for connecting the control part 6 to another circuit, and N-channel MOS transistors 326 and 327.

Reference numerals 328a and 328b denote resistors disposed within accessories 5d and 5e, respectively (each having a resistance value Rext). Reference numerals 5a to 5e respectively denote kinds of the accessory 5. The accessory 5a has a characteristic A, the accessory 5b has a characteristic B and the accessory 5c has a characteristic C. The accessories 5d and 5e are new kinds of accessories. The accessory 5d has a characteristic similar to that of the accessory 5a, and the accessory 5e has a characteristic similar to that of the accessory 5b. Therefore, if only the detection in mode 1 shown in FIG. 46, which will be described later, is performed, it is impossible to discriminate between the accessories 5a and 5d or between the accessories 5b and 5e.

It is to be noted that "a characteristic similar" means a characteristic which causes no large variation of the operation of an apparatus having a control circuit, when the discrimination between the accessories 5a and 5d or between the accessories b5 and 5e is erroneous.

FIG. 46 shows a list of the setting states of control pins of the control part 6 and modes to be set thereby.

When the control pin −EXT0RON is set to "0", the FET 9 is turned on, so that the terminal EXT0 is connected to the pull-up resistor 10.

The control pin EXT0IN indicates the state of the terminal EXT0.

When the control pin EXT0GND is set to "1", the terminal EXT0 is set to the ground (logic "0").

Accordingly, "STATE OF EXT0" in FIG. 46 indicates whether the terminal EXT0 is connected to the ground GND (logic "0") so as to be used as an output terminal or whether the terminal EXT0 is connected to the pull-up resistor 10 so as to be used as an input terminal.

When the control pin Rdeton is set to "0", as each of the N-channel MOS transistors 326 and 327 and the switch 313 is in an off-state, the control pin Rdeton has no influence on the logic. When the control pin Rdeton is set to "1", as each of the N-channel MOS transistors 326 and 327 and the switch 313 is in an on-state, the constant voltage Vreg, which is the output of the constant voltage circuit 308, is supplied to the terminal EXT1.

Here, in a case where the accessory 5d is connected to the apparatus 1, a voltage Vdet obtained by dividing the constant voltage Vreg with the resistor 320 (having a resistance value Rdet) and the resistor 328a (Rext) occurs at the terminal COM. The details of the voltage detection, etc., are described later.

In the mode 0, the terminal EXT0 is connected to the ground GND (logic "0") to be used as an output terminal. In the mode 1, the terminal EXT0 is connected to the pull-up resistor 10 to be used as an input terminal, so that if the terminal EXT0 is unconnected to the ground GND, the logic of the terminal EXT0 becomes "1", and if the terminal EXT0 is connected to the ground GND, the logic of the terminal EXT0 becomes "0". The other terminals function in the same manner as that in the terminal EXT0.

FIG. 47 shows the logic of each of the terminals EXT0, EXT1 and COM in the cases of "no accessory (5o)", "accessory 5a", "accessory 5b", "accessory 5c", "accessory 5d" and "accessory 5e" in the mode 1 shown in FIG. 46.

In the mode 1, the logic of (EXT0, EXT1) becomes (0, 0) in each of the cases of "accessory 5a" and "accessory 5d", the logic of (EXT0, EXT1) becomes (0, 1) in the case of "accessory 5c", the logic of (EXT0, EXT1) becomes (1, 0) in each of the cases of "accessory 5b" and "accessory 5e", and the logic of (EXT0, EXT1) becomes (1, 1) in the case of "no accessory (5o)". If only the detection in the mode 1 is performed, it is impossible to discriminate between the accessories 5a and 5d or between the accessories 5b and 5e.

Next, an explanation is made about the mode 2.

In the mode 2, the terminal EXT0 is set to the open state and the terminal EXT1 is set to the constant voltage Vreg. To the terminal COM, are connected the resistor 320 (Rdet) and the N-channel MOS transistor 327 which is in the on-state. Here, when the accessory 5d is connected to the apparatus 1, a voltage Vdet obtained by dividing the constant voltage Vreg with the resistor 320 (Rdet) and the resistor 328a (Rext) occurs at the terminal COM.

Now, the settable value (Rext) of the resistor 328a will be described.

First, a condition on which the logic circuit can make accurate detection is considered. With the sum of the resistance value of the resistor 16 and the resistance value of the P-channel MOS transistor 15 represented by Rpu, assuming that a current Ipu flowing through the resistor 16 and the P-channel MOS transistor 15 is 300 $\mu$A, a level-detectable voltage VIL of the input circuit 17 is 0.58 V, and a maximum voltage V0L during turning-on of the N-channel MOS transistor 24 is 0.1 V, the settable value (Rext) of the resistor 328a becomes as follows:

$$Rext \leq (VIL - V0L)/Ipu = (0.58 - 0.1)/300\mu$$

$$= 1600 \; \Omega$$

Therefore, the maximum value of the resistance value Rext detectable by the logic circuit is 1600Ω.

Next, the settable value of the resistance value Rdet of the resistor 320 is considered.

In order to decrease electric power consumption, a maximum current Idetmax flowing through the resistor 320 is assumed to be 4.0 mA. Assuming that the power supply voltage $V_{DD}$ is assumed to be 4.0 V, the resistance value Rdet is 2000Ω. The maximum value Vdetmax and the minimum value Vdetmin of the voltage Vdet of the terminal COM with the resistance value Rext are as follows:

$$VDetmax = \{(Vreg + \Delta Vreg - V0L) \times Rdet \times (1.05)\} / \{Rdet \times (1.05) + Rext \times (0.95)\} + V0L$$

$$Vdetmin = \{(Vreg - \Delta Vreg) \times Rdet \times (0.95)\} / \{Rdet \times (0.95) + Rext \times (1.05) + 2 \times Rcon\}$$

where ΔVreg is an error in output of the constant voltage circuit 308, an error between the resistance values Rdet and Rext is 5%, and Rcon is a contact resistance value of the connector.

For example, by using the above-mentioned resistance value Rext, it becomes possible to discriminate among four kinds of accessories of side numbers "−4" to "−1" (accessories 5d-4 to 5d-1) shown in FIG. 48. Further, the same arrangement applies also to the resistor 328b, so that it becomes possible to discriminate among four kinds of accessories of side numbers "−4" to "−1" (accessories 5e-4 to 5e-1) shown in FIG. 48.

Figure 49:
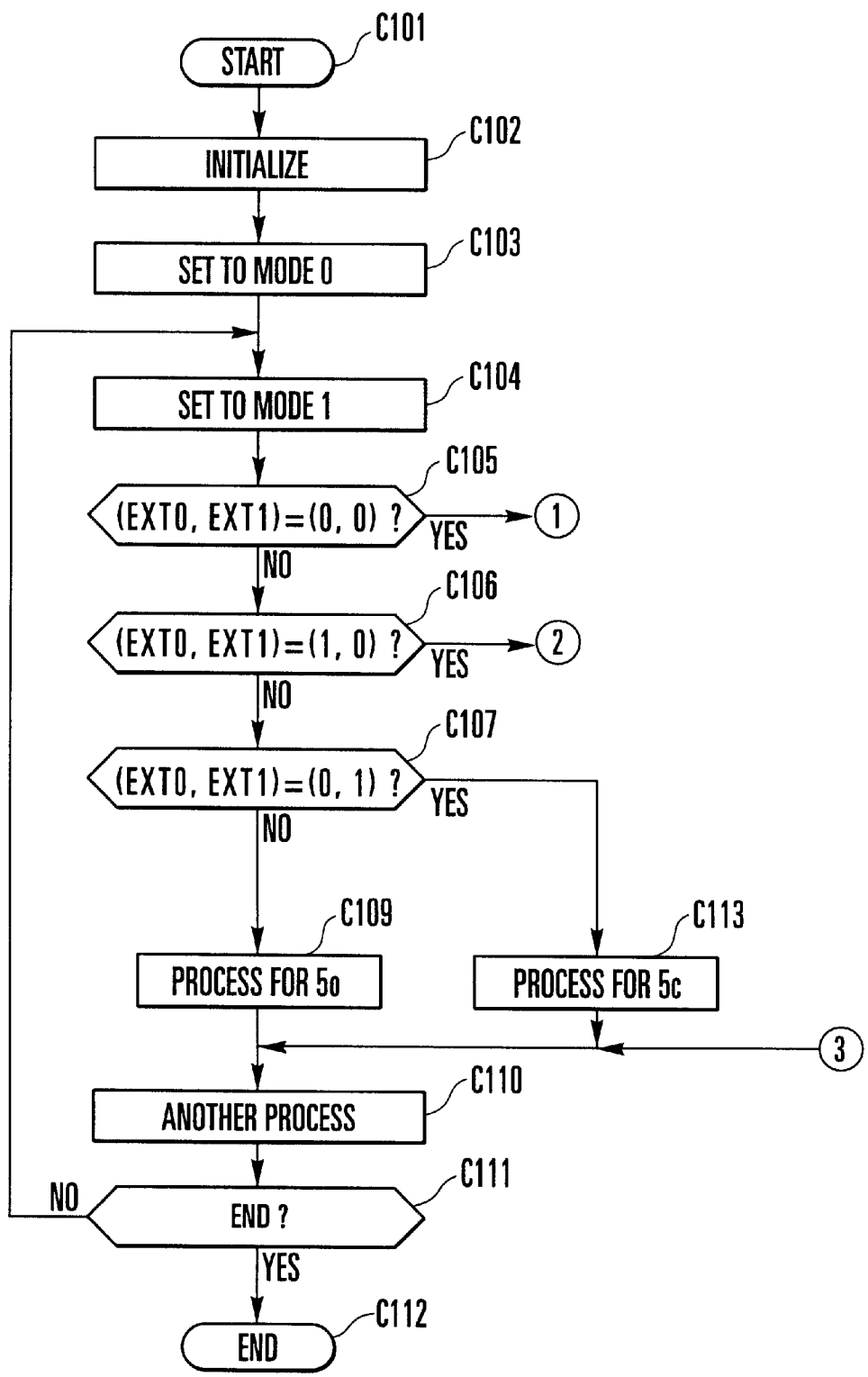
FIG. 49 is a flow chart showing a part of the operation of the apparatus according to the ninth embodiment of the invention.
Figure 50:
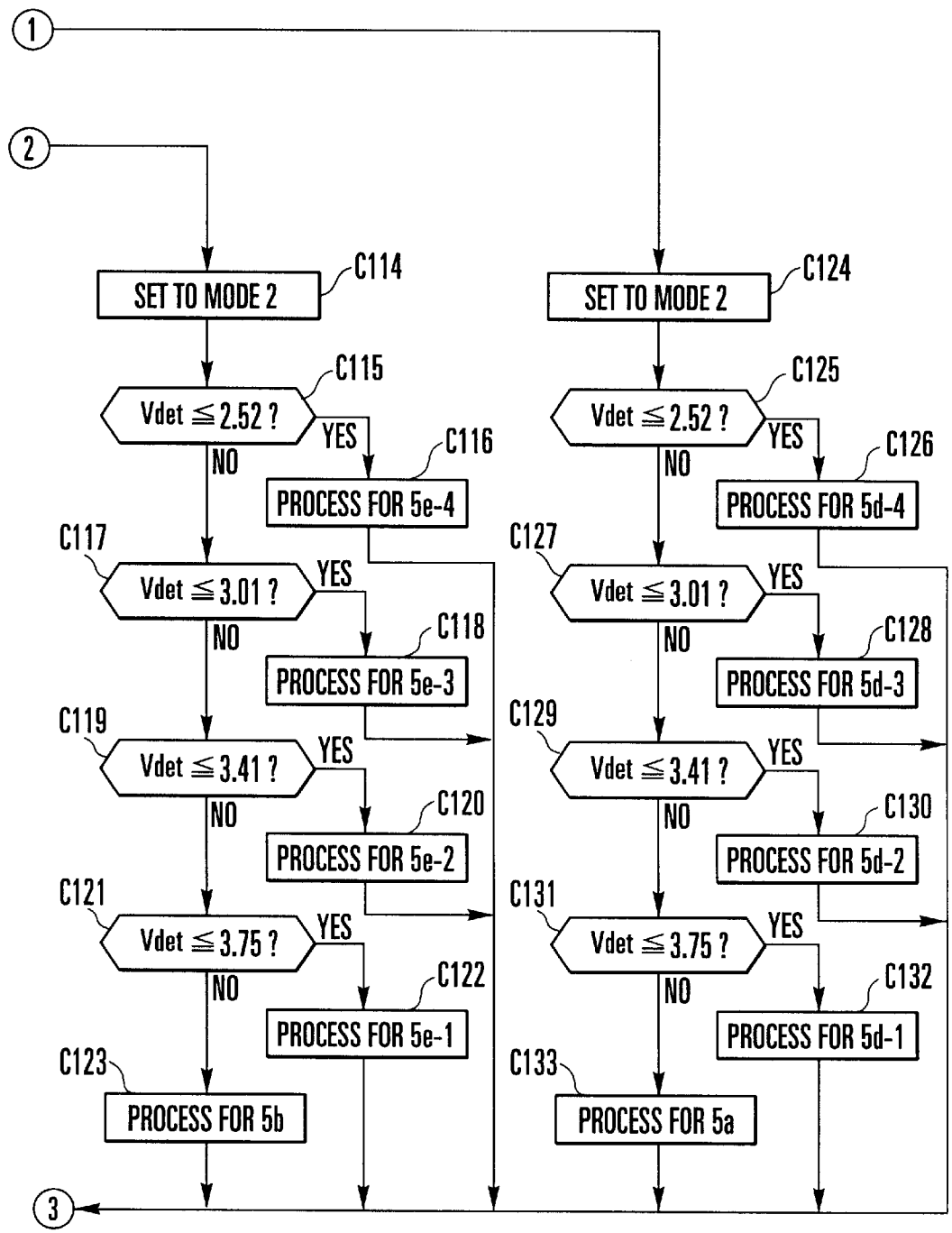
FIG. 50 is a flow chart showing the operation continuing from the operation shown in the flow chart of FIG. 49.

FIGS. 49 and 50 are flow charts for explaining the operation of the control circuit 2 in the ninth embodiment of the invention.

In step C101, the operation is started. First, in step C102, an initializing operation upon turning-on of the power supply is performed. In the next step C103, the terminals EXT0, EXT1 and COM are set to the mode 0, as a part related to the ninth embodiment of the initializing operation upon turning-on of the power supply. In step C104, next, the terminals EXT0, EXT1 and COM are set to the mode 1.

In step C105, a check is made to find if the logic of the terminals EXT0 and EXT1 is (0, 0). If so, as it is determined that one of the accessories 5a and 5d is connected, as shown in FIG. 47, the flow proceeds to step C124 of FIG. 50. If not, the flow proceeds to step C106. In step C106, a check is made to find if the logic of the terminals EXT0 and EXT1 is (1, 0). If so, as it is determined that one of the accessories 5b and 5e is connected, the flow proceeds to step C114 of FIG. 50. If not, the flow proceeds to step C107. In step C107, a check is made to find if the logic of the terminals EXT0 and EXT1 is (0, 1). If so, as it is determined that the accessory 5c is connected, the flow proceeds to step C113. In step C113, a process corresponding to the accessory 5c is performed. If not, as it is determined that there is no accessory (5o), the flow proceeds to step C109. In step C109, a process corresponding to the absence of the accessory (5o) is performed.

In the next step C110, a process unrelated to any accessory is performed. In step C111, a check is made to find if the flow is to be ended, on the basis of time, communication from the outside, or the like. If so, the flow proceeds to step C112 to bring a series of operations to an end. If not, the flow returns to step C104, repeating the above operation.

In a case where the flow has proceeded from the above step C106 to step C114, the terminals EXT0, EXT1 and COM are set to the mode 2 in the step C114. In the next step C115, a check is made to find if "Vdet≦2.52 V". If so, as it is determined that the accessory 5e-4 is connected, as shown in FIG. 48, the flow proceeds to step C116. In step C116, a process corresponding to the accessory 5e-4 is performed. If not, the flow proceeds to step C117. In step C117, a check is made to find if "Vdet≦3.01 V". If so, as it is determined that the accessory 5e-3 is connected, the flow proceeds to step C117. In step C118, a process corresponding to the accessory 5e-3 is performed. If not, the flow proceeds to step C119. In step C119, a check is made to find if "Vdet≦3.41 V". If so, as it is determined that the accessory 5e-2 is connected, the flow proceeds to step C120. In step C120, a process corresponding to the accessory 5e-2 is performed. If not, the flow proceeds to step C121. In step C121, a check is made to find if "Vdet≦3.75 V". If so, as it is determined that the accessory 5e-1 is connected, the flow proceeds to step C122. In step C122, a process corresponding to the accessory 5e-1 is performed. If not, the flow proceeds to step C123. In step C123, a process corresponding to the accessory 5b is performed. Then, the operations in the above step C110 and subsequent steps are performed.

Further, in a case where the flow has proceeded from the above step C105 to step C124, the terminals EXT0, EXT1 and COM are set to the mode 2 in the step C124. In the next step C125, a check is made to find if "Vdet≦2.52 V". If so, as it is determined that the accessory 5d-4 is connected, the flow proceeds to step C126. In step C126, a process corresponding to the accessory 5d-4 is performed. If not, the flow proceeds to step C127. In step C127, a check is made to find if "Vdet≦3.01 V". If so, as it is determined that the accessory 5d-3 is connected, the flow proceeds to step C128. In step C128, a process corresponding to the accessory 5d-3 is performed. If not, the flow proceeds to step C129. In step C129, a check is made to find if "Vdet≦3.41 V". If so, as it is determined that the accessory 5d-2 is connected, the flow proceeds to step C130. In step C130, a process corresponding to the accessory 5d-2 is performed. If not, the flow proceeds to step C131. In step C131, a check is made to find if "Vdet≦3.75 V". If so, as it is determined that the accessory 5d-1 is connected, the flow proceeds to step C132. In step C132, a process corresponding to the accessory 5d-1 is performed. If not, the flow proceeds to step C133. In step C133, a process corresponding to the accessory 5a is performed. Then, the operations in the above step C110 and subsequent steps are performed.

(Tenth Embodiment)

FIGS. 51 to 54 relate to a tenth embodiment of the invention, in which a camera system composed of a camera body and a lens device which are able to communicate with each other and a lens adapter connected between the camera body and the lens device will be described.

Figure 51:
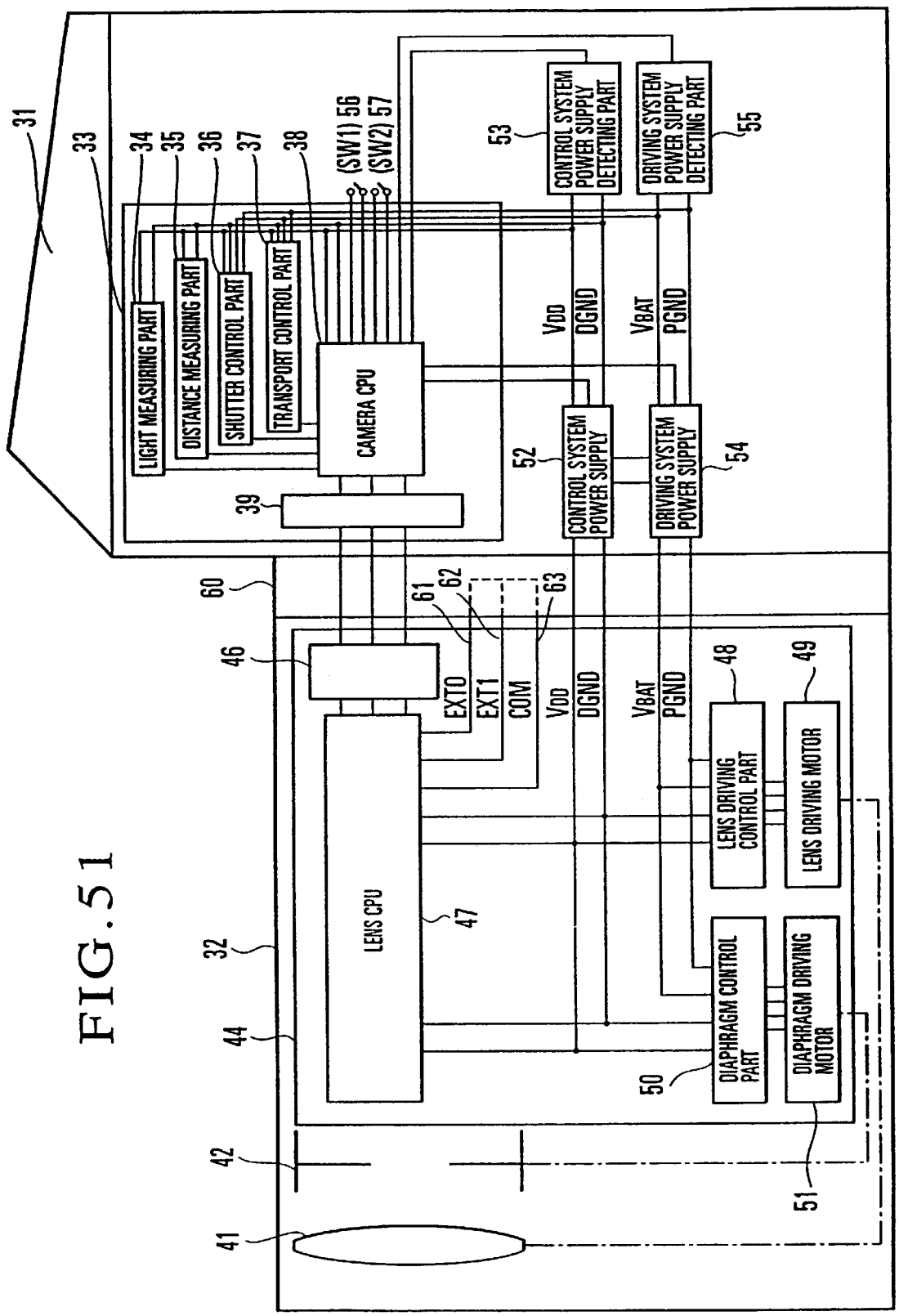
FIG. 51 is a block diagram showing the arrangement of each of a camera, an interchangeable lens and an accessory according to a tenth embodiment of the invention.

FIG. 51 is a block diagram showing the circuit arrangement of a camera system according to the tenth embodiment of the invention. In FIG. 51, reference numeral 31 denotes a camera body, reference numeral 32 denotes a photo-taking lens, and reference numeral 60 denotes a lens adapter such as an extender or an intermediate tube.

There is an electric circuit part 33 within the camera body 31. The electric circuit part 33 includes a light measuring part 34 for measuring the amount of light having passed through the photo-taking lens 32, a distance measuring part 35 for measuring the distance from a surface of film to an object to be photographed, a shutter control part 36 for exposing the film for an appropriate period of time, a transport control part 37 for winding or rewinding the film, a camera CPU 38 for controlling the various parts of the camera body 31, and a communication means 39 for performing serial communication with the photo-taking lens 32.

Further, in the photo-taking lens 32, there are disposed a focusing lens 41, a diaphragm 42 and an electric circuit part 44. The electric circuit part 44 of the photo-taking lens 32 includes a communication means 46 for performing serial communication with the camera body 31, a lens CPU 47 for controlling the various parts of the photo-taking lens 32, a lens driving control part 48 for controlling the driving of the focusing lens 41, a lens driving motor 49 for driving the focusing lens 41, a diaphragm control part 50 for controlling the driving of the diaphragm 42, and a diaphragm driving motor 51 for driving the diaphragm 42.

Reference numeral 52 denotes a control system power supply for supplying, in accordance with the output of the camera CPU 38, electric power to circuits of the control system, such as the light measuring part 34, the distance measuring part 35, the camera CPU 38 and the lens CPU 47, the amount of consumption of electric power of which is relatively small and which require stable output voltages. Reference numeral 53 denotes a control system power supply detecting part for detecting the voltage and electric power of the control system power supply 52.

Reference numeral 54 denotes a driving system power supply for supplying, in accordance with the output of the camera CPU 38, electric power to circuits of the driving system, such as the shutter control part 36, the transport control part 37, the lens driving control part 48 and the diaphragm control part 50, the amount of consumption of electric power of which is relatively large. Reference numeral 55 denotes a driving system power supply detecting part for detecting the voltage and electric power of the driving system power supply 54.

Reference numeral 56 denotes a switch (SW1) for starting the operation of the light measuring part 34, and reference numeral 57 denotes a switch (SW2) for starting the operation of the distance measuring part 35 and the shutter opening/closing operation of the shutter control part 36.

Reference numeral 60 denotes, as described above, the lens adapter, such as an extender or an intermediate tube, reference numeral 61 denotes a lens-adapter detecting terminal (EXT0) of the lens CPU 47, reference numeral 62 denotes a lens-adapter detecting terminal (EXT1) of the lens CPU 47, and reference numeral 63 denotes a lens-adapter detecting terminal (COM) of the lens CPU 47.

Figure 52:
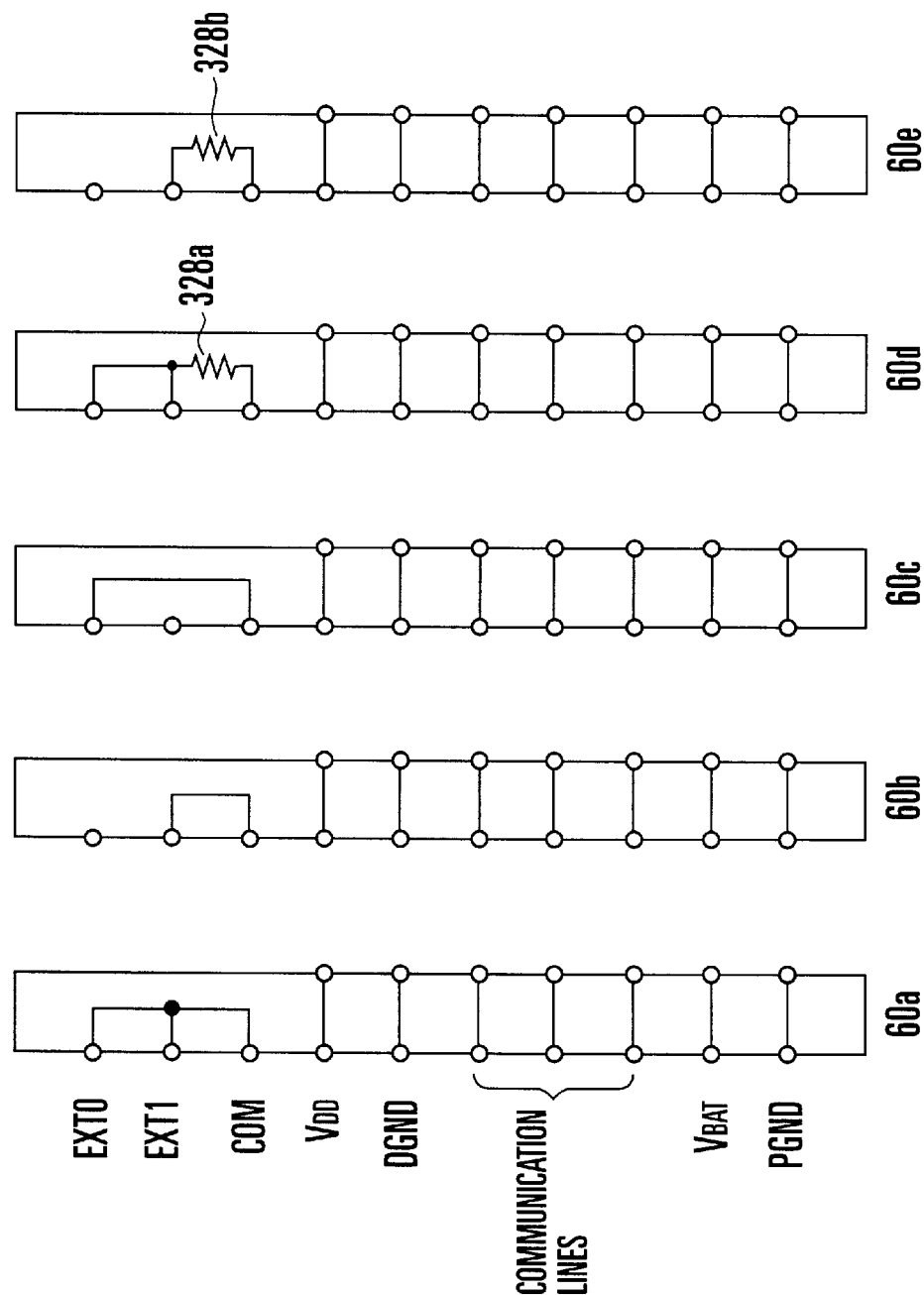
FIG. 52 is a diagram showing the kinds of accessories which are mountable on the camera in the tenth embodiment of the invention.

FIG. 52 is a diagram showing various kinds of lens adapters 60, in which live kinds of lens adapters 60a to 60e are illustrated by way of example. The manners of connection of terminals of the lens adapters 60a to 60e for the terminals EXT0, EXT1 and COM are the same as those of the accessories 5a to 5e shown in FIG. 45.

Next, the operations of the various parts of the camera system according to the tenth embodiment will be described with reference to FIGS. 53 and 54.

Figure 53:
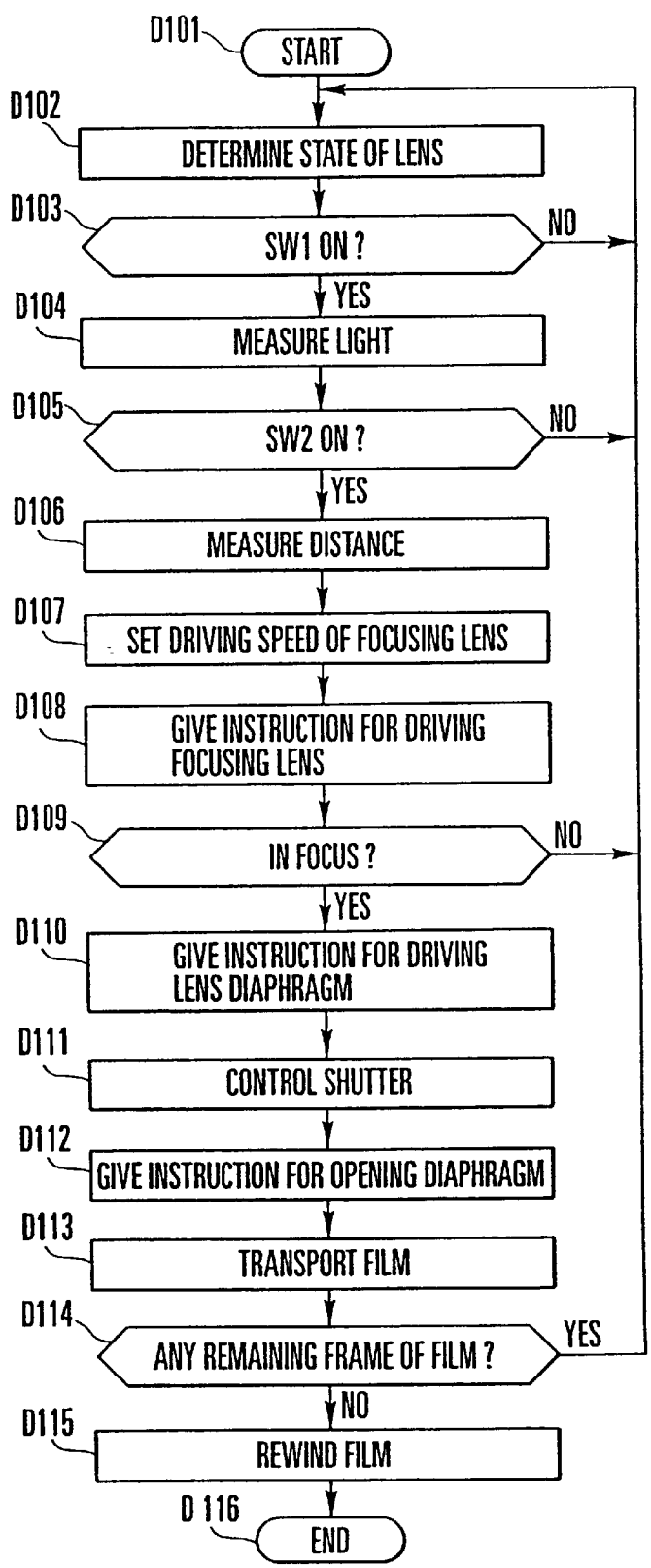
FIG. 53 is a flow chart showing operation on the camera side in the tenth embodiment of the present invention.

FIG. 53 is a flow chart showing the operation of the camera body 31. In step D101 of FIG. 53, with a power supply switch (not shown) turned on, the operation starts.

In step D102, the camera body 31 and the photo-taking lens 32 start eight-bit serial communication through the communication means 39 and the communication means 46.

In synchronism with a serial clock signal, which is supplied from the side of the camera body 31, a communication instruction is transmitted from the camera body 31 to the photo-taking lens 32, and data responsive to the communication instruction received at the time of the preceding communication is transmitted from the photo-taking lens 32 to the camera body 31. Here, data to be transmitted from the photo-taking lens 32 is varied according to the presence or absence of the lens adapter 60.

In the next step D103, a check is made to find if the switch SW1 (56) is turned on. If so, the flow proceeds to step D104. In step D104, a shutter speed and an aperture value are decided on the basis of the output of the light measuring part 34 and the F-number of the photo-taking lens 32. It is to be noted that the F-number of the photo-taking 32 varies according to the kind of lens adapter 60. As will be described later, the kind of lens adapter connected is detected on the side of the photo-taking lens 32, and the F-number corresponding to the detected kind is communicated, as one piece of optical information from the photo-taking lens 32 to the camera body 31.

In step D105, a check is made to find if the switch SW2 (57) is turned on. If so, the flow proceeds to step D106. In step D106, the amount of movement of the focusing lens 41 of the photo-taking lens 32 is decided on the basis of the output of the distance measuring part 35 and optical information of the photo-taking lens 32, and is then transmitted to the photo-taking lens 32. It is to be noted that, while the optical information of the photo-taking lens 32 varies according to the kind of lens adapter 60, optical information corresponding to the lens adapter connected is communicated from the photo-taking lens 32 to the camera body 31, as described above.

In the next step D107, the maximum driving speed of the focusing lens 41 is decided on the basis of the output of the distance measuring part 35 and the optical information of the photo-taking lens 32, and is then transmitted to the photo-taking lens 32. In step D108, an instruction is transmitted to the photo-taking lens 32 for starting the movement of the focusing lens 41 by the amount of movement of the focusing lens 41 decided in step D106 and within the maximum driving speed of the focusing lens 41 decided in step D107.

In step D109, a check is made to find if the focusing lens 41 of the photo-taking lens 32 mounted on the camera body 31 is in an in-focus position, on the basis of the output of the distance measuring part 35 and the optical information of the photo-taking lens 32. If so, the flow proceeds to step D110. If not, the flow returns to step D102 to perform light measuring and distance measuring operations again.

In step D110, an instruction is transmitted to the photo-taking lens 32 for driving the diaphragm 42 up to the aperture value decided in step D104. In step D111, the shutter is opened and closed by the shutter control part 36 at the shutter speed decided in step D104. In step D112, an instruction is transmitted to the photo-taking lens 32 for driving the diaphragm 42 up to the full-opened state.

In step D113, a film (not shown) is transported for one frame portion thereof by the transport control part 37.

In step D114, a check is made to find if there is any remaining frame of the film (not shown). If not, i.e., if it is impossible for the transport control part 37 to transport the film in step D113, as it is determined that there remains no exposable frame, the flow proceeds to step D115. If there remains any exposable frame, the flow returns to step D102.

In step D115, the film is rewound. Then, the flow is brought to an end in step D116.

Figure 54:
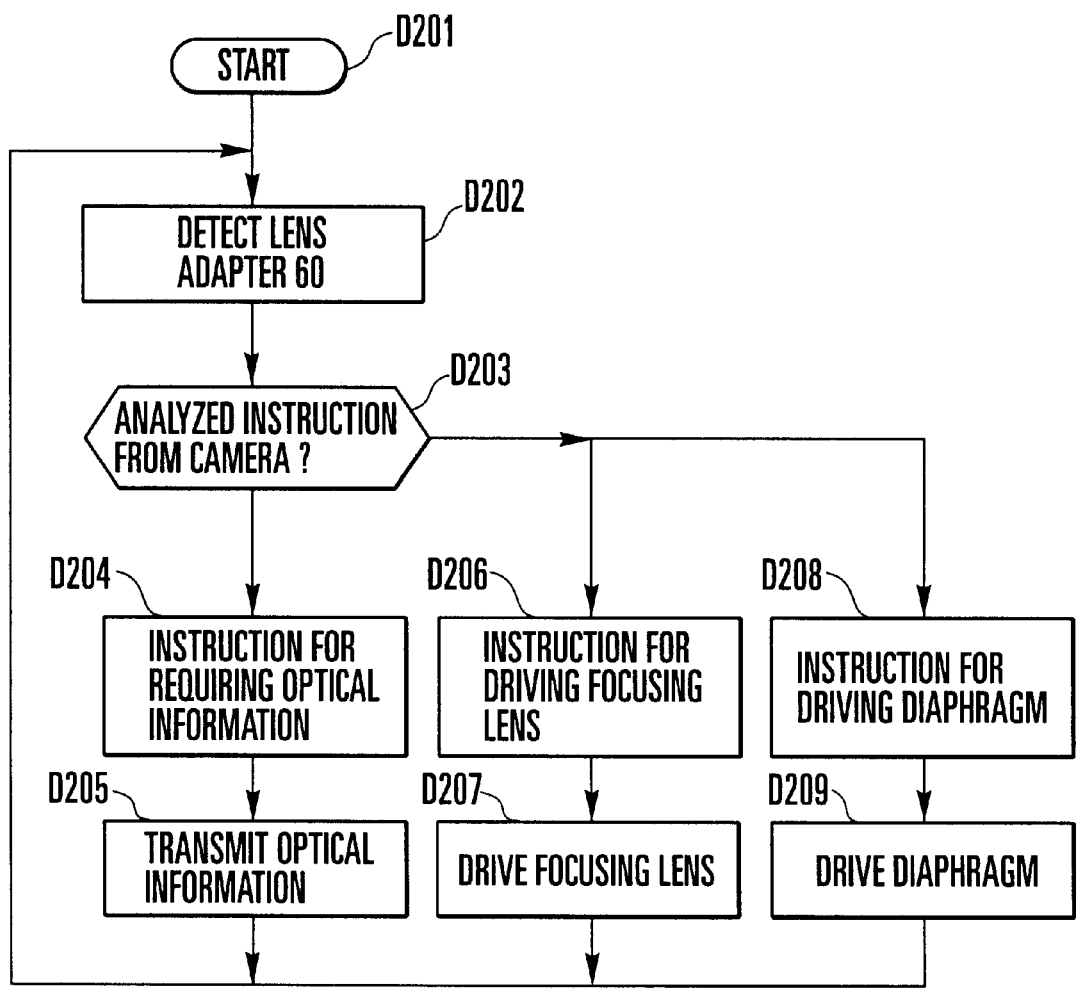
FIG. 54 is a flow chart showing operation on the lens side in the tenth embodiment of the present invention.

Next, the flow chart of FIG. 54 showing the operation of the photo-taking lens 32 is described.

In step D201 of FIG. 54, the operation of the photo-taking lens 32 starts in association with the mounting thereof on the camera body 31, or starts in response to an instruction from the camera body 31 through communication.

In step D202, the kind of the lens adapter 60 attached to the photo-taking lens 32 is detected. The method for this detection is the same as that described in the above fourth embodiment, and is, therefore, omitted from the description here.

In the next step D203, an instruction from the camera body 31 is analyzed. For example, if the instruction from the camera body 31 is an instruction for driving the focusing lens 41, the flow proceeds to step D206. If the instruction from the camera body 31 is an instruction for driving the diaphragm 42, the flow proceeds to step D208. If the instruction from the camera body 31 is an instruction for requiring optical information, the flow proceeds to step D204.

In step D204, the instruction for requiring optical information is received. In step D205, in response to the instruction for requiring optical information, optical information corresponding to the lens adapter 60 connected to the photo-taking lens 32 is transmitted to the camera body 31.

In step D206, the instruction for driving the focusing lens 41 is received. In step D207, the focusing lens 41 is driven in accordance with the instruction, from the camera body 31, indicative of the amount of movement and the direction of movement of the focusing lens 41.

In step D208, the instruction for driving the diaphragm 42 is received. In step D209, the diaphragm 42 is driven in accordance with the instruction, from the camera body 31, indicative of the amount of aperture reduction and the direction of aperture change of the diaphragm 42.

Figure 55:
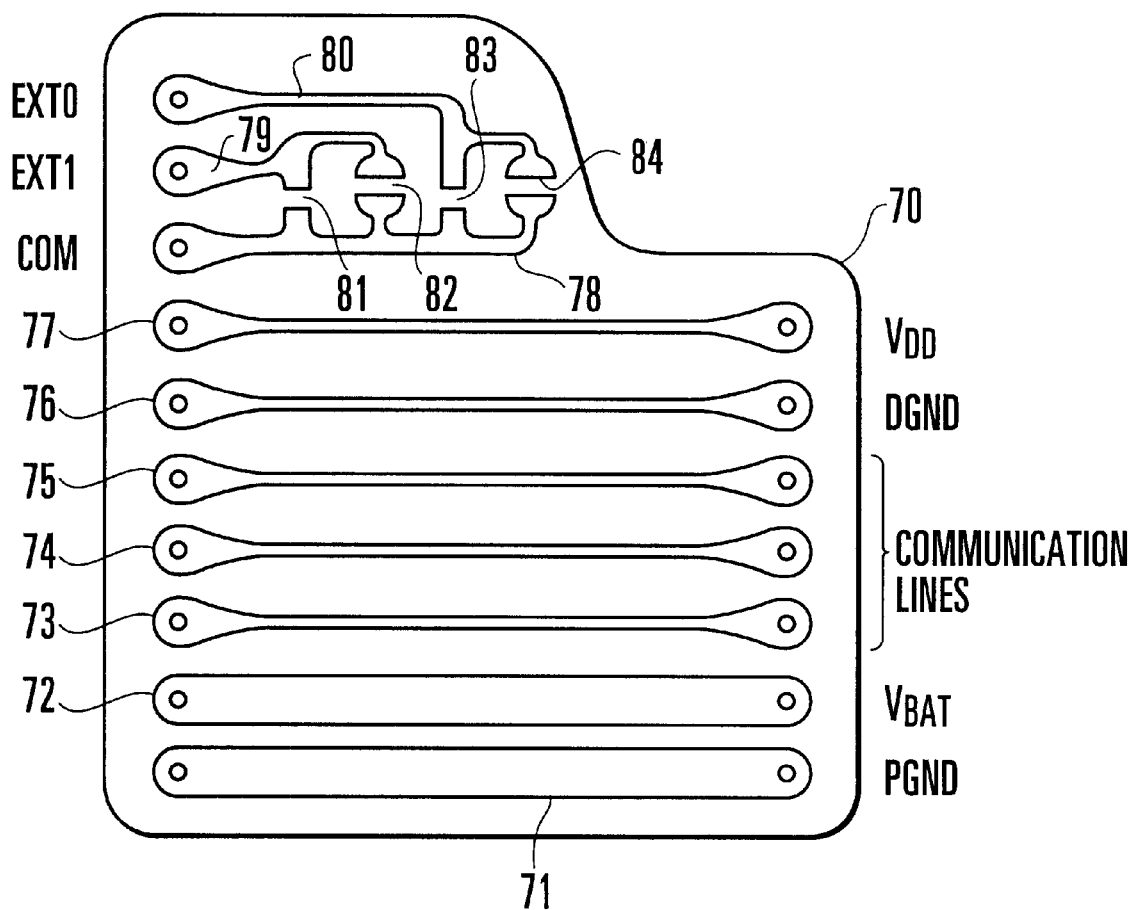
FIG. 55 is a diagram showing a circuit board used for electrical connection in the tenth embodiment of the invention.

FIG. 55 is a diagram showing a circuit board for electrical connection of the lens adapter shown in FIG. 52.

In FIG. 55, reference numeral 70 denotes the circuit board, reference numeral 71 denotes a wiring part for the terminal PGND, reference numeral 72 denotes a wiring part for the terminal $V_{BAT}$, reference numerals 73 to 75 denote wiring parts for the communication lines, reference numeral 76 denotes a wiring part for the terminal DGND, reference numeral 77 denotes a wiring part for the terminal $V_{DD}$, reference numeral 78 denotes a wiring part for the terminal COM, reference numeral 79 denotes a wiring part for the terminal EXT1, and reference numeral 80 denotes a wiring part for the terminal EXT0. Reference numerals 81 and 83 denote portions at which a resistance element is mounted by soldering or a resistance element is formed by printing. Reference numerals 82 and 84 denote solder lands for forming electrical connection for the lens adapter 60a, 60b or 60c by soldering. For example, the electrical connection for the lens adapter 60b can be formed by short-circuiting the solder land 82 by soldering.

Figure 56:
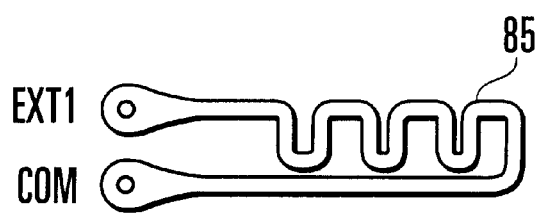
FIG. 56 is another example of circuit board used for electrical connection in the tenth embodiment.

FIG. 56 is a diagram showing the arrangement obtained by modifying the wiring parts for the terminals EXT1 and COM shown in FIG. 55. Referring to FIG. 56, the resistance factor, thickness, width and length of a wiring part 85 are set to match with a required resistance value, so that it becomes possible to easily form the wiring part without mounting any resistance element.

According to the above-described ninth and tenth embodiments, with regard to accessories (lens adapters) having similar characteristics (almost identical characteristics), since, for example, as in the accessory 5e relative to the accessory 5b shown in FIG. 45, two terminals thereof which are connected by a conductive member are made to be connected via a resistor, even if the kind of accessory is erroneously detected, it if possible to perform almost appropriate apparatus control (camera control).

Further, by providing accessories having similar characteristics with respective different resistance values of the resistors, it is possible to appropriately discriminate between the kinds of accessories having similar characteristics, so that an apparatus system more full of variety can be attained. In addition, since an element disposed between the terminals of the accessory is not a diode or the like but a resistor, it is possible to increase the number of kinds of accessories usable with one and the same apparatus (simply by varying the resistance value), with advantage in cost.

While, in the above-described ninth and tenth embodiments, three terminals are provided for detecting the accessory (lens adapter), the number of terminals may be two, or may be four or more. If the number of terminals is made to increase according to an increase in the number of kinds of accessories, it becomes possible to easily detect the various kinds of accessories.

Further, the ninth embodiment can be applied, with the same advantageous effect, to a camera system in which lens devices having the respective different characteristics serve as the accessories and a camera body serves as the control apparatus 1.

What is claimed is:

1. An apparatus to which an accessory is connected, said apparatus comprising:

a plurality of connection terminals at which the accessory is connected;

first detection means for setting at least one connection terminal of said plurality of connection terminals for signal outputting and detecting states of said plurality of connection terminals;

second detection means for setting at least one connection terminal of said plurality of connection terminals for signal outputting and detecting states of said plurality of connection terminals, the at least one connection terminal set for signal outputting by said second detection means being different from the at least one connection terminal set for signal outputting by said first detection means; and determination means for determining a kind of accessory mounted to said apparatus, on the basis of results of detection provided by said first detection means and said second detection means.

2. An apparatus according to claim 1, wherein said accessory is a lens adapter, and said apparatus is an optical apparatus.

3. An apparatus according to claim 1, wherein said first detection means and said second detection means repeatedly detect states of said plurality of connection terminals a plurality of times.

4. An apparatus to which an accessory is connected, said apparatus comprising:

a plurality of connection terminals at which the accessory is connected;

first detection means for setting at least one connection terminal of said plurality of connection terminals for signal outputting and detecting states of said plurality of connection terminals;

second detection means for setting at least one other connection terminal of said plurality of connection terminals for signal outputting, in addition to the at least one connection terminal set for signal outputting by said first detection means and detecting states of said plurality of connection terminals; and determination means for determining a kind of accessory mounted to said apparatus on the basis of results of detection provided by said first detection means and said second detection means.

5. An apparatus according to claim 4, wherein said accessory is a lens adapter, and said apparatus is an optical apparatus.

6. An apparatus according to claim 4, wherein said first detection means and said second detection means repeatedly detect states of said plurality of connection terminals a plurality of times.

7. An apparatus to which an accessory is connected, said apparatus comprising:

a plurality of connection terminals at which the accessory is connected;

first detection means for connecting at least one connection terminal of said plurality of connection terminals to ground and detecting states of said plurality of connection terminals;

second detection means for connecting at least one connection terminal of said plurality of connection terminals to ground and detecting states of said plurality of connection terminals, the at least one connection terminal connected to ground by said second detection means being different from the at least one connection terminal connected to ground by said first detection means; and determination means for determining a kind of accessory mounted to said apparatus on the basis of results of detection provided by said first detection means and said second detection means.

8. An apparatus according to claim 7, wherein said accessory is a lens adapter, and said apparatus is an optical apparatus.

9. An apparatus according to claim 7, wherein said first detection means and said second detection means repeatedly detect states of said plurality of connection terminals a plurality of times.

10. An apparatus to which an accessory is connected, said apparatus comprising:

a plurality of connection terminals at which the accessory is connected;

first detection means for connecting at least one connection terminal of said plurality of connection terminals to ground and detecting states of said plurality of connection terminals;

second detection means for connecting at least one connection terminal of said plurality of connection terminals to ground, in addition to the at least one connection terminal connected to ground by said first detection means, and detecting states of said plurality of connection terminals; and determination means for determining a kind of accessory mounted to said apparatus on the basis of results of detection provided by said first detection means and said second detection means.

11. An apparatus according to claim 10, wherein said accessory is a lens adapter, and said apparatus is an optical apparatus.

12. An apparatus according to claim 10, wherein said first detection means and said second detection means repeatedly detect states of said plurality of connection terminals a plurality of times.

13. An apparatus to which an accessory is connected, said apparatus comprising:

first and second connection terminals at which the accessory is connected;

first detection means for setting said first connection terminal for signal inputting, setting said second connection terminal for signal outputting, and detecting states of said plurality of connection terminals;

second detection means for setting said first connection terminal for signal outputting, setting said second connection terminal for signal inputting, and detecting states of said plurality of connection terminals; and determination means for determining a kind of accessory mounted to said apparatus on the basis of results of detection provided by said first detection means and said second detection means.

14. An apparatus according to claim 13, wherein said accessory is a lens adapter, and said apparatus is an optical apparatus.

15. An apparatus according to claim 13, wherein said first detection means and said second detection means repeatedly detect states of said plurality of connection terminals a plurality of times.

16. An apparatus to which an accessory is connected, said apparatus comprising:

first and second connection terminals at which the accessory is connected;

first detection means for connecting said first connection terminal to a pull-up resistor, connecting said second connection terminal to ground, and detecting states of said plurality of connection terminals;

second detection means for connecting said first connection terminal to ground, connecting said second connection terminal to a pull-up resistor, and detecting states of said plurality of connection terminals; and determination means for determining a kind of accessory mounted to said apparatus on the basis of results of detection provided by said first detection means and said second detection means.

17. An apparatus according to claim 16, wherein said accessory is a lens adapter, and said apparatus is an optical apparatus.

18. An apparatus according to claim 16, wherein said first detection means and said second detection means repeatedly detect states of said plurality of connection terminals a plurality of times.

19. An accessory adapted to be connected to an apparatus capable of determining a kind of accessory mounted to the apparatus by detecting states of first and second connection terminals of the apparatus by setting the first connection terminal for signal inputting and setting the second connection terminal for signal outputting and, after that, by detecting states of the first and second connection terminals by setting the first connection terminal for signal outputting and setting the second connection terminal for signal inputting, said accessory comprising:

first and second terminals at which the apparatus is connected, and an electrical element which allows a current between said first terminal and said second terminal to flow only in one direction.

20. An accessory according to claim 19, wherein said accessory is a lens adapter.

21. An accessory according to claim 19, wherein said electrical element is arranged such that a voltage drop occurring when the current is allowed to flow only in one direction is set within a range of voltage based on which the apparatus can determine the kind of accessory mounted to the apparatus.

22. An accessory according to claim 19, wherein said electrical element is a diode.

23. An accessory according to claim 19, wherein said electrical element is a transistor.

24. An accessory adapted to be connected to an apparatus capable of determining a kind of accessory mounted to the apparatus by detecting states of first and second connection terminals of the apparatus by connecting the first connection terminal to a pull-up resistor and connecting the second connection terminal to ground and, after that, by detecting states of the first and second connection terminals by connecting the first connection terminal to around and connecting the second connection terminals to a pull-up resistor, said accessory comprising:

first and second terminals at which the apparatus is connected, and an electrical element which allows a current between said first terminal and said second terminal to flow only in one direction.

25. An accessory according to claim 24, wherein said accessory is a lens adapter.

26. An accessory according to claim 24, wherein said electrical element is arranged such that a voltage drop occurring when the current is allowed to flow only in one direction is set within a range of voltage based on which the apparatus can determine the kind of accessory mounted to the apparatus.

27. An accessory according to claim 24, wherein said electrical element is a diode.

28. An accessory according to claim 24, wherein said electrical element is a transistor.

29. An accessory system composed of an apparatus having first and second connection terminals at which an accessory is connected and being capable of determining a kind of accessory mounted to the apparatus by detecting states of the first and second connection terminals, and a plurality of accessories each having first and second terminals at which the apparatus is connected, said accessory system comprising:

a first accessory which is set such that, between the first and second terminals thereof, a current is allowed to flow in both directions; and a second accessory which is set such that, between the first and second terminals thereof, a current is allowed to flow only in one direction, wherein said first accessory and said second accessory are set to almost the same characteristic.

30. A lens adapter system composed of an optical apparatus having first and second connection terminals at which a lens adapter is connected and being capable of determining a kind of lens adapter mounted to the optical apparatus by detecting states of the first and second connection terminals, and a plurality of lens adapters each having first and second terminals at which the optical apparatus is connected, said lens adapter system comprising;

a first lens adapter which is set such that, between the first and second terminals thereof, a current is allowed to flow in both directions; and a second lens adapter which is set such that, between the first and second terminals thereof, a current is allowed to flow only in one direction, wherein said first lens adapter and said second lens adapter are set to almost the same magnification.

* * * * *

UNITED STATES PATENT AND TRADEMARK OFFICE
CERTIFICATE OF CORRECTION

| | |
|---|---|
| PATENT NO. | : 6,352,378 B1 |
| DATED | : March 5, 2002 |
| INVENTOR(S) | : Kazuhiro Izukawa |

It is certified that error appears in the above-identified patent and that said Letters Patent is hereby corrected as shown below:

<u>Title page,</u>
Item [56], References Cited, U.S. PATENT DOCUMENTS, "4,921,422  A  *  5/1990 Tanaka et al. …...396/93" should read -- 4,912,494      3/1990 …...354/402 --.

<u>Column 15,</u>
Line 13, "(Rpfet9" should read -- ((Rpfet9 --.

<u>Column 21,</u>
Line 50, "5y" should read -- 5z --.

<u>Column 24,</u>
Line 6, "i($V_{DD}$" should read -- i=($V_{DD}$ --
Line 29, "If·so" should read -- If so --.

<u>Column 25,</u>
Line 34, "155 his" should read -- 155h is --.

<u>Column 26,</u>
Line 18, "can not" should read -- cannot --.

<u>Column 35,</u>
Line 14, "32" should read -- lens 32 --.

UNITED STATES PATENT AND TRADEMARK OFFICE
CERTIFICATE OF CORRECTION

PATENT NO.    : 6,352,378 B1
DATED         : March 5, 2002
INVENTOR(S)   : Kazuhiro Izukawa It is certified that error appears in the above-identified patent and that said Letters Patent is hereby corrected as shown below:

<u>Column 37,</u>
Line 1, "if" should read -- is --.

<u>Column 40,</u>
Line 12, "around" should read -- ground --.
Line 13, "terminals" should read -- terminal --.

Signed and Sealed this

Third Day of September, 2002

*Attest:*

*Attesting Officer*

JAMES E. ROGAN
*Director of the United States Patent and Trademark Office*